(12) United States Patent
Ebbole et al.

(10) Patent No.: US 12,449,947 B2
(45) Date of Patent: Oct. 21, 2025

(54) DEVICES, METHODS, AND GRAPHICAL USER INTERFACES FOR PROCESSING INPUTS TO A THREE-DIMENSIONAL ENVIRONMENT

(71) Applicant: Apple Inc., Cupertino, CA (US)

(72) Inventors: Mark A. Ebbole, San Francisco, CA (US); Leah M. Gum, Sunol, CA (US); Ashwin Kumar Asoka Kumar Shenoi, San Jose, CA (US); Chia-Ling Li, San Jose, CA (US)

(73) Assignee: APPLE INC., Cupertino, CA (US)

( * ) Notice: Subject to any disclaimer, the term of this patent is extended or adjusted under 35 U.S.C. 154(b) by 142 days.

(21) Appl. No.: 18/226,200

(22) Filed: Jul. 25, 2023

(65) Prior Publication Data
US 2024/0036699 A1    Feb. 1, 2024

Related U.S. Application Data

(60) Provisional application No. 63/522,077, filed on Jun. 20, 2023, provisional application No. 63/470,783, (Continued)

(51) Int. Cl.
*G06F 3/04815*  (2022.01)
*G06F 3/01*  (2006.01)

(52) U.S. Cl.
CPC .......... *G06F 3/04815* (2013.01); *G06F 3/012* (2013.01); *G06F 3/013* (2013.01); *G06F 3/014* (2013.01); *G06F 3/017* (2013.01)

(58) Field of Classification Search
CPC ...... G06F 3/04815; G06F 3/012; G06F 3/013; G06F 3/014; G06F 3/017; G06F 3/04842; G06F 3/0304; G06F 3/0482
See application file for complete search history.

(56) References Cited

U.S. PATENT DOCUMENTS 10,394,320 B2    8/2019    Svahn et al.
11,086,475 B1    8/2021    Ravasz et al.
(Continued)

FOREIGN PATENT DOCUMENTS

CN    101627361 A    1/2010
CN    104364734 A    2/2015
(Continued)

OTHER PUBLICATIONS

Anonymous, "Event Handling Guide for iOS", https://github.com/ionfee88/iOSDevelopeLibrary/raw/master/EventHandlingiPhoneOS.pdf, Mar. 9, 2015, 74 pages.
(Continued)

*Primary Examiner* — Vijay Shankar
(74) *Attorney, Agent, or Firm* — Morgan, Lewis & Bockius LLP

(57) ABSTRACT

While a view of an environment is visible via a display generation component of a computer system, the computer system detects a gaze input directed to a first location, corresponding to a first user interface element, in the environment. In response to detecting the gaze input: if a user's hand is in a predefined configuration during the gaze input, the computer system: provides, to the first user interface element, information about the gaze input; and then, in response to detecting the gaze input moving to a different, second location in the environment while the user's hand is maintained in the predefined configuration, provides, to a second user interface element that corresponds to the second location, information about the gaze input. If the user's hand is not in the predefined configuration during the gaze input, the computer system forgoes providing, to the first user interface element, information about the gaze input.

33 Claims, 36 Drawing Sheets

Related U.S. Application Data filed on Jun. 2, 2023, provisional application No. 63/369,749, filed on Jul. 28, 2022.

(56) References Cited

U.S. PATENT DOCUMENTS

| | | |
|---|---|---|
| 2008/0211766 A1 | 9/2008 | Westerman et al. |
| 2009/0066668 A1 | 3/2009 | Kim et al. |
| 2009/0225037 A1 | 9/2009 | Williamson et al. |
| 2009/0228901 A1 | 9/2009 | Beaver et al. |
| 2010/0235118 A1 | 9/2010 | Moore et al. |
| 2011/0175830 A1 | 7/2011 | Miyazawa et al. |
| 2011/0181526 A1 | 7/2011 | Shaffer et al. |
| 2012/0026077 A1 | 2/2012 | Hackborn |
| 2014/0055395 A1 | 2/2014 | Kim |
| 2014/0208260 A1 | 7/2014 | Kawahara et al. |
| 2014/0210756 A1 | 7/2014 | Lee et al. |
| 2015/0067513 A1 | 3/2015 | Zambetti et al. |
| 2015/0067605 A1 | 3/2015 | Zambetti et al. |
| 2016/0048304 A1 | 2/2016 | Niranjani et al. |
| 2016/0062452 A1 | 3/2016 | Kim et al. |
| 2016/0085358 A1 | 3/2016 | Palanisamy et al. |
| 2016/0306431 A1 | 10/2016 | Stafford et al. |
| 2016/0350071 A1 | 12/2016 | Murillo et al. |
| 2017/0123560 A1 | 5/2017 | Kuo |
| 2017/0336884 A1 | 11/2017 | Pavlou et al. |
| 2019/0369829 A1 | 12/2019 | Turner et al. |
| 2021/0132762 A1 | 5/2021 | Turner et al. |
| 2022/0229524 A1 | 7/2022 | McKenzie et al. |
| 2023/0259269 A1 | 8/2023 | Turner et al. |
| 2024/0103614 A1* | 3/2024 | Dryer ............... G06F 3/013 |
| 2024/0103615 A1* | 3/2024 | Huergo Wagner ..... G06F 3/012 |
| 2024/0385858 A1* | 11/2024 | McKenzie ............. G06F 9/451 |
| 2025/0031002 A1* | 1/2025 | Hawkins ................ G06T 15/20 |
| 2025/0103133 A1* | 3/2025 | Pastrana Vicente .... G06F 3/013 |

FOREIGN PATENT DOCUMENTS

| | | |
|---|---|---|
| EP | 2 096 524 A2 | 9/2009 |
| EP | 2 770 422 A2 | 8/2014 |
| KR | 2013-0115037 A | 10/2013 |
| WO | WO 2012/087939 A1 | 6/2012 |
| WO | WO 2023/137402 A1 | 7/2023 |

OTHER PUBLICATIONS

Poupyrev, "The Go Go Interaction Technique: Non Linear Mapping for Direct Manipulation in VR", http://www.ivan poupyrev.com., Nov. 1, 1996, 2 pages.
Office Action, dated Apr. 23, 2020, received in U.S. Appl. No. 16/425,828, 12 pages.
Notice of Allowance, dated Oct. 15, 2020, received in U.S. Appl. No. 16/425,828, 8 pages.
Office Action, dated Nov. 20, 2024, received in Chinese Patent Application No. 2019800321906, which corresponds with U.S. Appl. No. 16/425,828, 2 pages.
Office Action, dated Feb. 23, 2022, received in European Patent Application No. 19732177.1, which corresponds with U.S. Appl. No. 16/425,828, 5 pages.
Office Action, dated Oct. 28, 2022, received in European Patent Application No. 19732177.1, which corresponds with U.S. Appl. No. 16/425,828, 6 pages.
Intent to Grant, dated Nov. 20, 2023, received in European Patent Application No. 19732177.1, which corresponds with U.S. Appl. No. 16/425,828, 9 pages.
Patent, dated Mar. 6, 2024, received in European Patent Application No. 19732177.1, which corresponds with U.S. Appl. No. 16/425,828, 4 pages.
Office Action, dated Aug. 13, 2021, received in U.S. Appl. No. 17/145,168, 11 pages.
Final Office Action, dated Feb. 8, 2022, received in U.S. Appl. No. 17/145,168, 12 pages.
Office Action, dated May 19, 2022, received in U.S. Appl. No. 17/145,168, 13 pages.
Final Office Action, dated Oct. 26, 2022, received in U.S. Appl. No. 17/145,168, 15 pages.
Notice of Allowance, dated May 11, 2023, received in U.S. Appl. No. 17/145,168, 7 pages.
Office Action, dated Apr. 12, 2024, received in U.S. Appl. No. 18/140,544, 16 pages.
Final Office Action, dated Nov. 21, 2024, received in U.S. Appl. No. 18/140,544, 18 pages.
Notice of Allowance, dated Mar. 27, 2025, received in U.S. Appl. No. 18/140,544, 9 pages.
Invitation to Pay Additional Fees, dated Aug. 29, 2019, received in International Patent Application No. PCT/US2019/034846, which corresponds with U.S. Appl. No. 16/425,828, 39 pages.
ISR and Written Opinion, dated Oct. 21, 2019, received in International Patent Application No. PCT/US2019/034846, which corresponds with U.S. Appl. No. 16/425,828, 24 pages.
International Search Report and Written Opinion, dated Nov. 24, 2023, received in International Patent Application No. PCT/US2023/028858, which corresponds with U.S. Appl. No. 18/226,200, 19 pages.
Extended European Search Report, dated Apr. 26, 2024, received in European Patent Application No. 24153387.6, which corresponds with U.S. Appl. No. 18/140,544, 11 pages.
International Search Report and Written Opinion, dated Jan. 2, 2025, received in International Patent Application No. PCT/US2024/047399, which corresponds with U.S. Appl. No. 18/886,891, 15 pages.
Office Action, dated Jun. 3, 2025, received in Chinese Patent Application No. 2019800321906, which corresponds with U.S. Appl. No. 16/425,828, 1 page.
Notice of Allowance, dated Aug. 22, 2025, received in Chinese Patent Application. No. 2019800321906, which corresponds with U.S. Appl. No. 16/425,828, 5 pages.

* cited by examiner

Figure 7C1

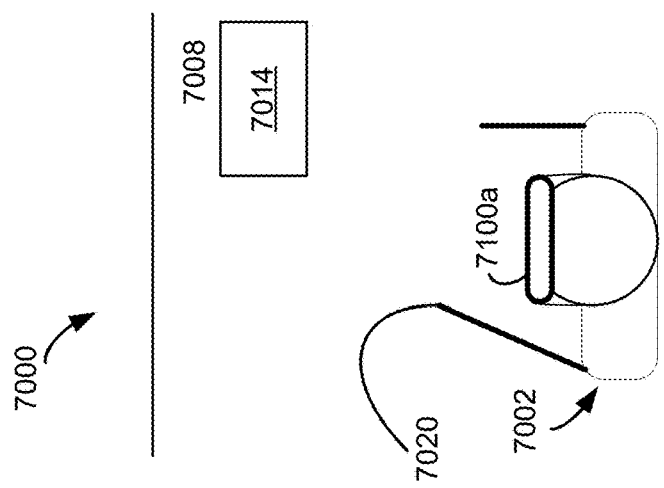
Figure 7C3
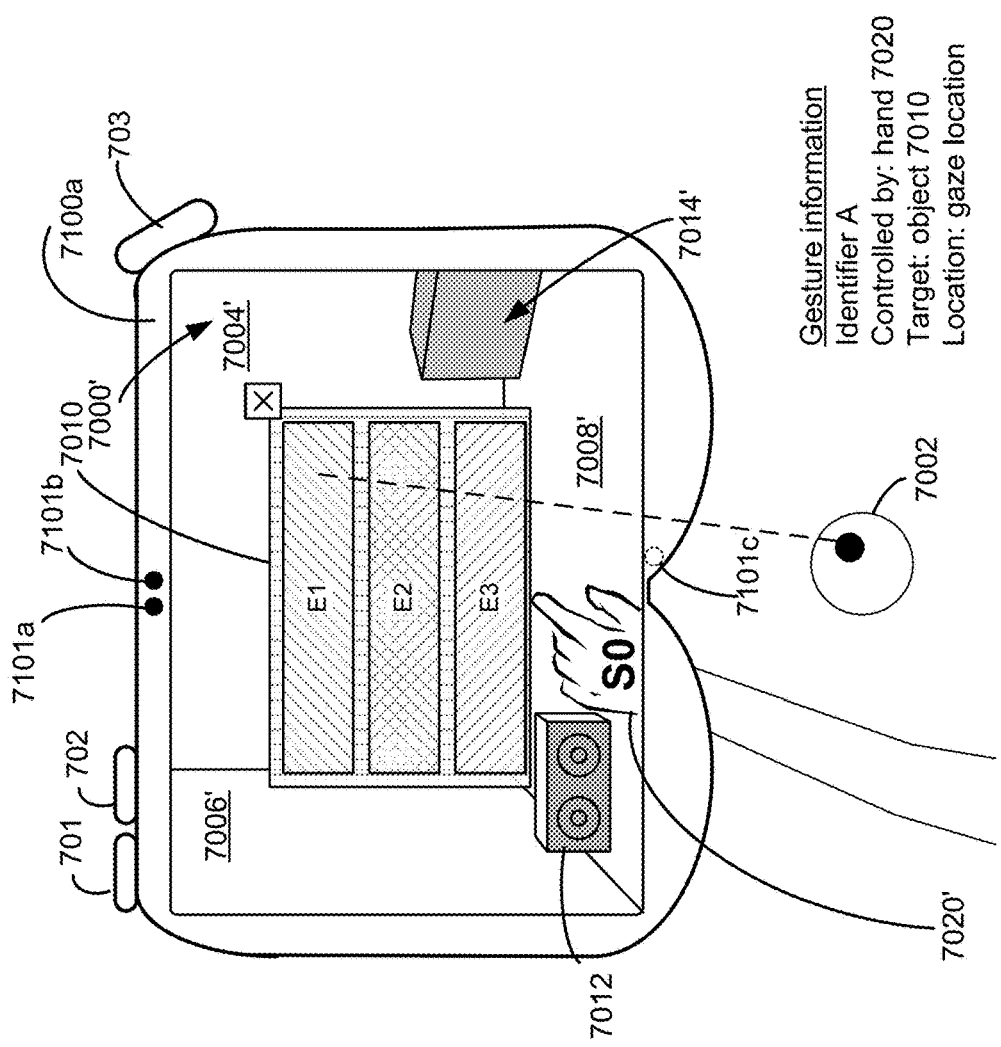
Figure 7C2

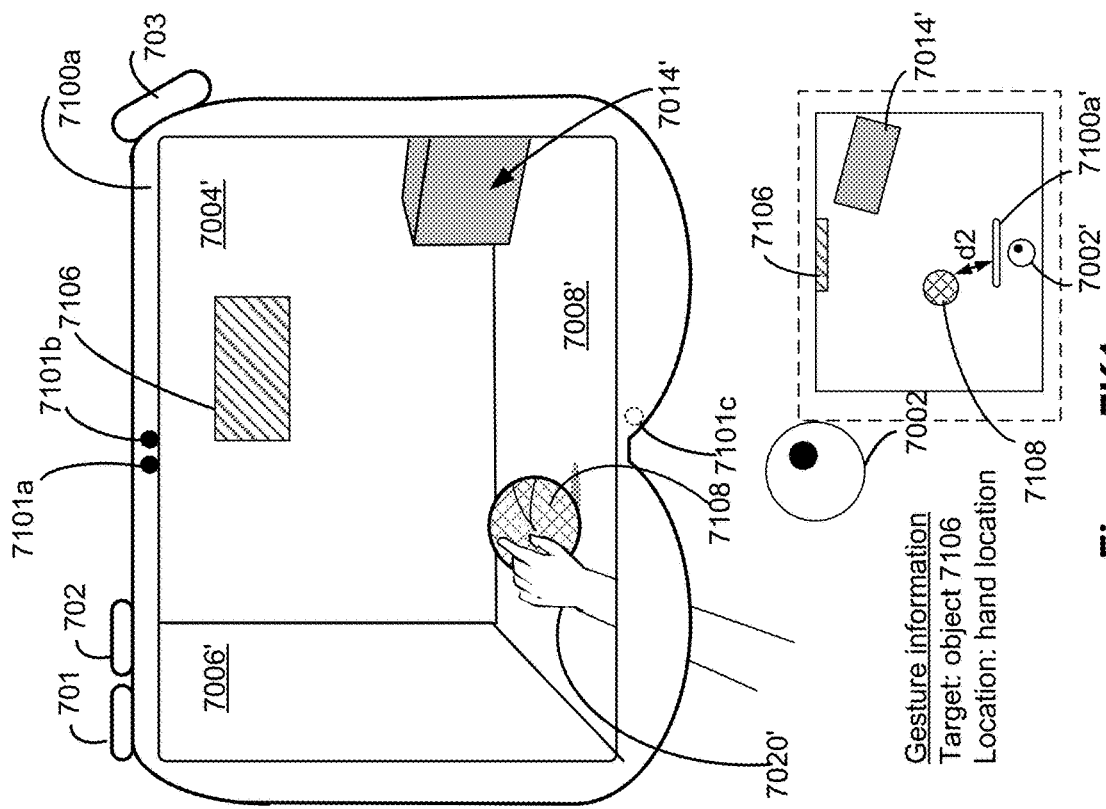
Figure 7K1
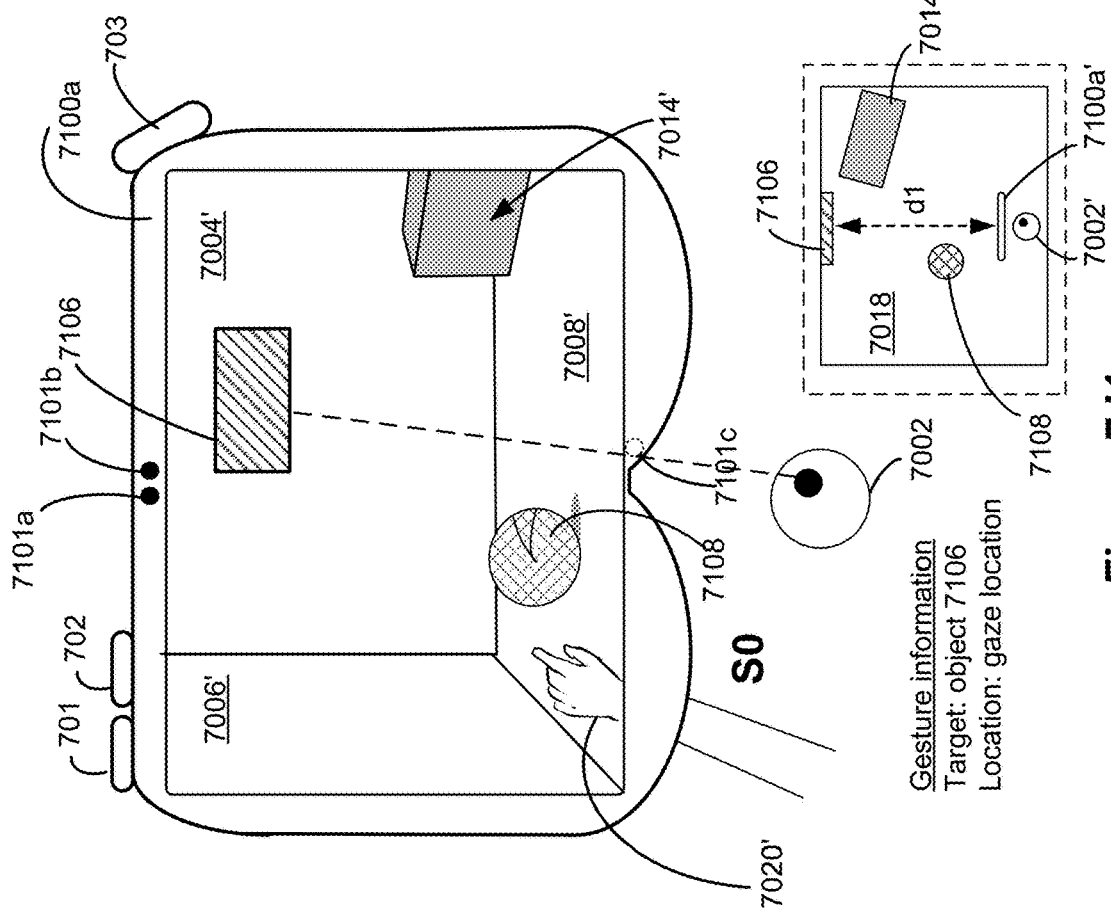
Figure 7J1

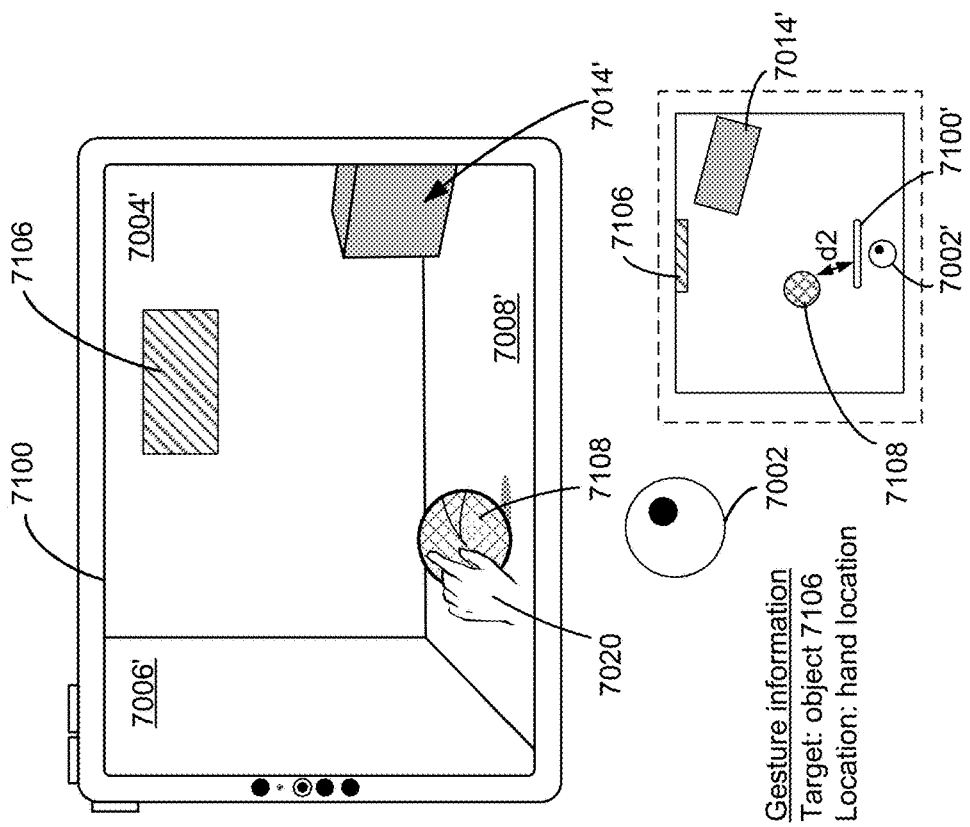
Figure 7K2
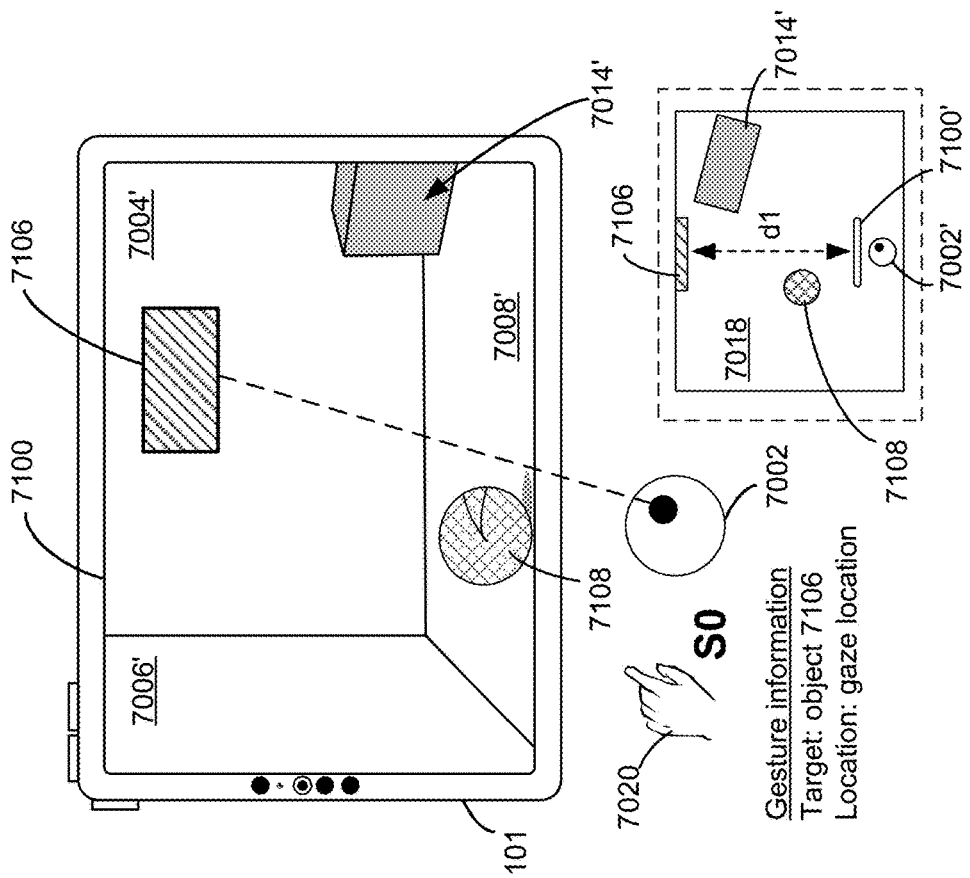
Figure 7J2

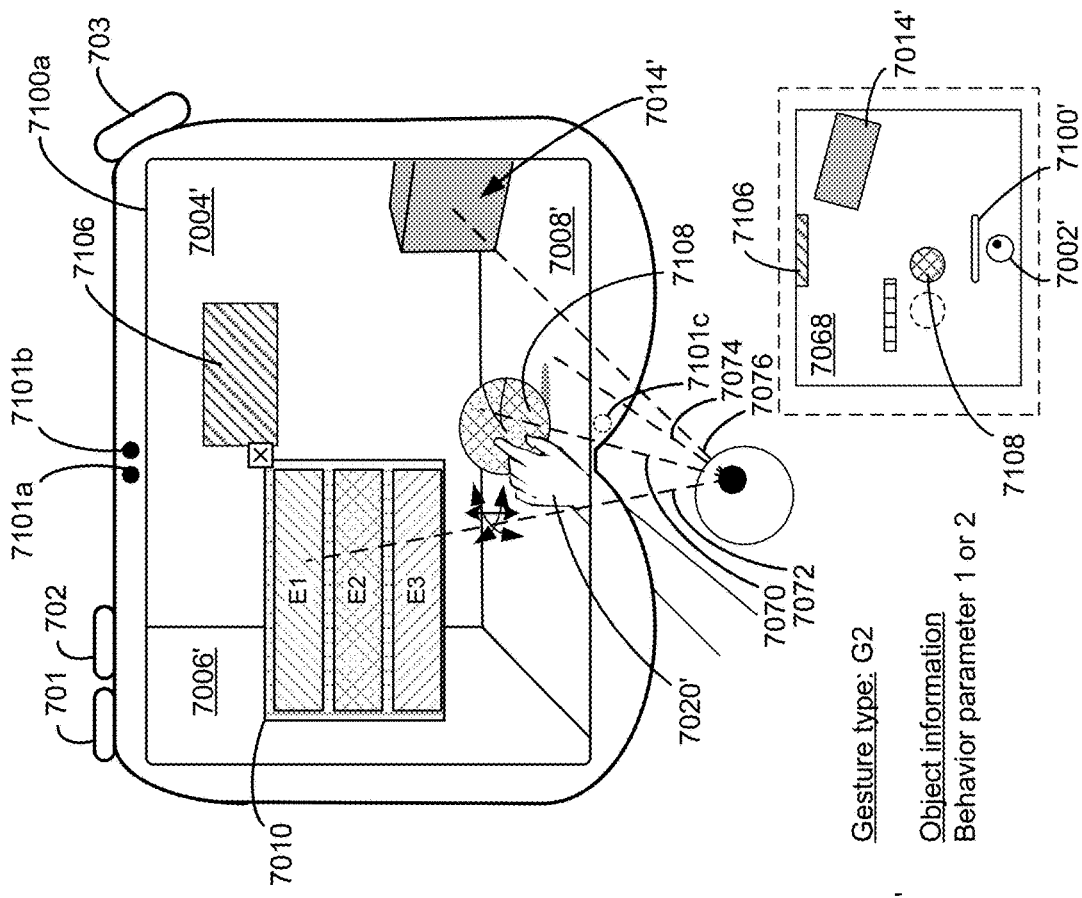
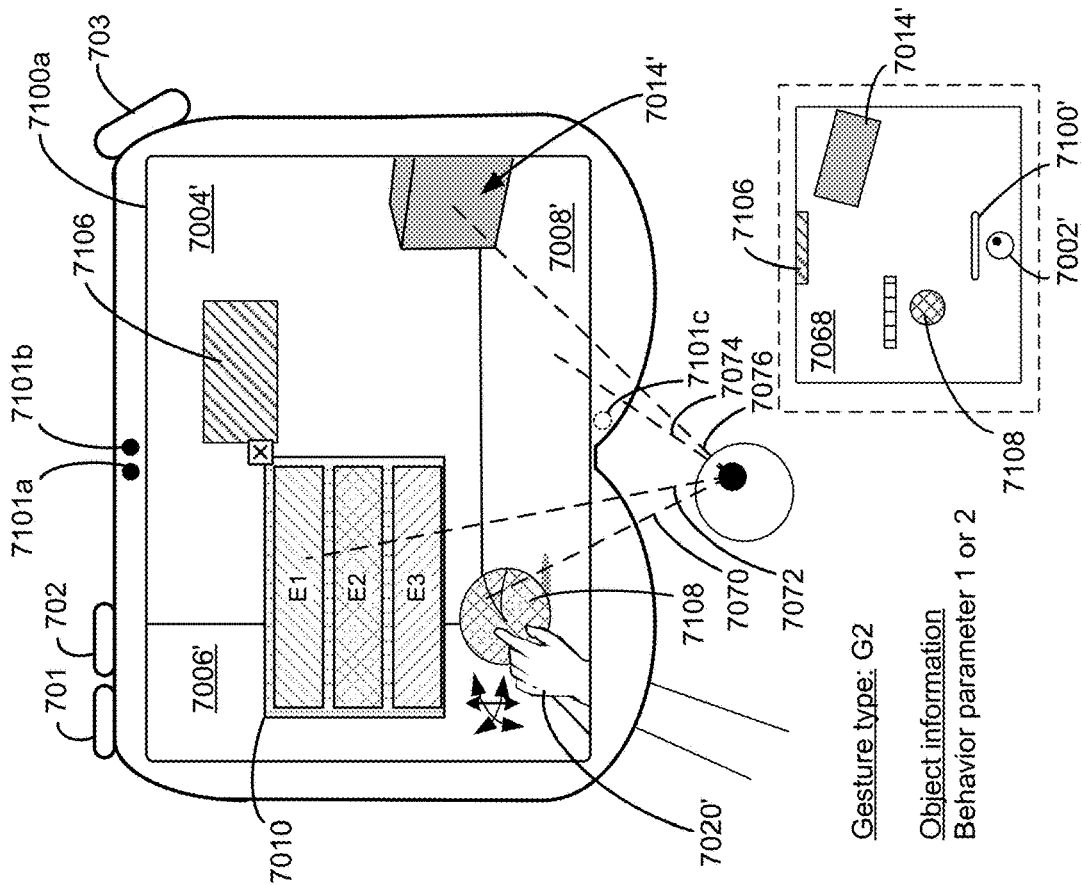

DEVICES, METHODS, AND GRAPHICAL USER INTERFACES FOR PROCESSING INPUTS TO A THREE-DIMENSIONAL ENVIRONMENT

CROSS REFERENCE TO RELATED APPLICATIONS

This application claims priority to U.S. Provisional Application No. 63/522,077, filed Jun. 20, 2023, U.S. Provisional Application Ser. No. 63/470,783, filed Jun. 2, 2023, and U.S. Provisional Application No. 63/369,749, filed Jul. 28, 2022, each of which is hereby incorporated by reference in its entirety.

TECHNICAL FIELD

The present disclosure relates generally to computer systems that are in communication with a display generation component and one or more input devices, and that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for processing inputs to a three-dimensional environment that include at least some virtual elements (e.g., applications, augmented reality environments, mixed reality environments, and virtual reality environments) are cumbersome, inefficient, and limited. For example, systems that provide incomplete support for receiving different types of inputs, systems that deliver input information to software inefficiently, systems that fail to identify consistently inputs that have different portions provided using different input mechanisms, and systems that fail to properly disambiguate between inputs provided using different input mechanisms, are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for processing inputs to computer-generated experiences that make interaction with computer systems that support different input mechanisms more seamless, efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for processing inputs to a three-dimensional environment. Such methods and interfaces may complement or replace conventional methods for processing inputs to a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In accordance with some embodiments, a method is performed at a computer system that is in communication with a display generation component and one or more input devices. The method includes, while a view of an environment is visible via the display generation component, detecting a first gaze input directed to a first location in the environment. The first location corresponds to a first user interface element. The method includes, in response to detecting the first gaze input: in accordance with a determination that a hand of a user is in a predefined configuration during the first gaze input: providing, to the first user interface element, first gesture information that includes first information about the first gaze input; after providing the first gesture information that includes the first information about the first gaze input to the first user interface element, detecting the first gaze input moving to a second location in the environment while the user's hand is maintained in the predefined configuration, wherein the second location is different from the first location; and, in response to detecting the first gaze input moving to the second location in the environment while the user's hand is maintained in the predefined configuration: providing, to a second user interface element that corresponds to the second location in the environment, second gesture information that includes second information about the first gaze input. The method further includes, in response to detecting the first gaze input: in accordance with a determination that the hand of the user is not in the predefined configuration during the first gaze input: forgoing providing gesture information to the first user interface element about the first gaze input.

In accordance with some embodiments, a method is performed at a computer system that is in communication with a display generation component and one or more input devices. The method includes, while a view of an environment is visible via the display generation component, detecting a first input, including detecting that a gaze of a user is directed toward the environment. The method includes, in response to detecting the first input: initiating a first interaction with a target of the first input, and updating the view of the environment to indicate the initiated first interaction. The target of the first input is determined based on a first respective location in the environment to which the user's gaze is directed while the first input is detected, and the initiated first interaction is associated with a first input identifier for the first input. The method includes detecting a continuation of the first input, including detecting movement of a first hand of the user. The method includes, in response to detecting the continuation of the first input: continuing the first interaction with the target of the first input, and updating the view of the environment to indicate the continued first interaction, based on the movement of the user's first hand. The continued first interaction is associated with the first input identifier.

In accordance with some embodiments, a method is performed at a computer system that is in communication with a display generation component and one or more input devices. The method includes, while a view of an environment is visible via the display generation component, receiving, via the one or more input devices, an input that indicates a user's readiness to interact with the view of the environment. The method includes, in response to receiving the input that indicates the user's readiness to interact with the view of the environment: in accordance with a determination that the input corresponds to a request for direct manipulation of the view of the environment: displaying a visual indication that a target user interface object is selected for the direct manipulation. The target user interface object that is selected for the direct manipulation corresponds to a location of a portion of a hand of the user. The method further includes, in response to receiving the input that indicates the user's readiness to interact with the view of the environment: in accordance with a determination that the input corresponds to a request for indirect manipulation of the view of the environment: displaying a visual indication that a target user interface object is selected for the indirect manipulation. The target user interface object that is selected for the indirect manipulation corresponds to a location of a gaze of the user.

In accordance with some embodiments, a method is performed at a computer system that is in communication with a display generation component and one or more input devices. The method includes, while a view of an environment is visible via the display generation component, detecting a first input directed to a first user interface element in the environment. The method includes, in response to detecting the first input: providing, to the first user interface element, first gesture information about the first input. In accordance with a determination that additional gesture information about the first input, other than the first gesture information, is available, the first gesture information is provided in combination with an indication that the additional gesture information about the first input is available; and, in accordance with a determination that additional gesture information about the first input, other than the first gesture information, is not available, the first gesture information is provided without the indication that additional gesture information about the first input is available.

In accordance with some embodiments, a method is performed at a computer system that is in communication with a display generation component and one or more input devices. The method includes, while a view of an environment is visible via the display generation component, detecting a first input directed to a respective user interface object in the environment. The method includes, in response to detecting the first input: in accordance with a determination that the first input is a first type of input and that the respective user interface object is associated with a first behavior parameter, performing a respective operation corresponding to the first input; and, in accordance with a determination that the first input is the first type of input and that the respective user interface object is not associated with the first behavior parameter, forgoing performing the respective operation corresponding to the first input.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7I illustrate example techniques for providing gesture information about user inputs to targets of the user inputs based on whether a user is indicating readiness to interact or has initiated an interaction, in accordance with some embodiments.

FIGS. 7J-7K illustrate example techniques for disambiguating between direct manipulation and indirect manipulation of objects in a three-dimensional environment, in accordance with some embodiments.

FIGS. 7N-7X illustrate example techniques for conditionally performing operations in response to inputs directed to user interface objects based on behavior parameters of the objects, in accordance with some embodiments.

DESCRIPTION OF EMBODIMENTS

Figure 1A:
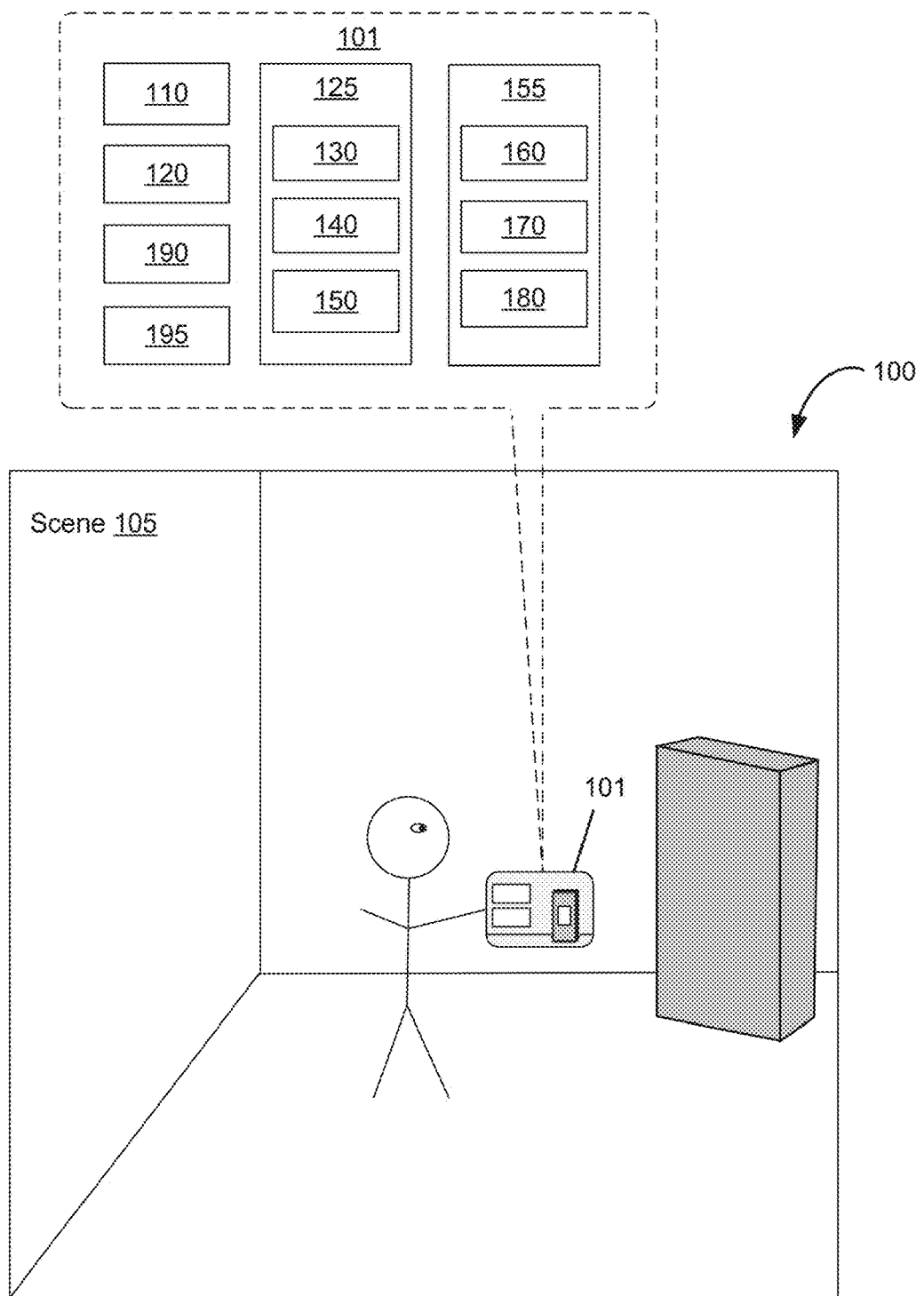
FIG. 1A is a block diagram illustrating an operating environment of a computer system for providing extended reality (XR) experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, in response to detecting that a user's gaze input is directed to a user interface element, a computer system determines whether the user's hand is in a predefined configuration. If so, the computer system provides gesture information about the gaze input to the user interface element, and to subsequent user interface elements as the gaze input moves, so long as the user's hand remains in the predefined configuration. If not, the computer system does not provide gesture information about the gaze input to the user interface element. Requiring that the user's hand be in a state that indicates readiness to interact in order to provide gesture information about a gaze input, and providing the gesture information to different targets based on where the gaze input is directed, ensures that gesture information about an input is provided to software that the user is clearly indicating intent to interact with.

In some embodiments, a computer system uses a same input identifier for a respective portion of an input whose location is based on where the user's gaze is directed as for a continuation of the input whose location is based on the location and/or movement of the user's hand. Using a consistent input identifier for different portions of an input, including for a gaze-based phase as well as for a hand movement-based phase, makes input processing and recognition more efficient by ensuring that related portions of an input are correlated with each other.

In some embodiments, a computer system determines, for an input that indicates a user's readiness to interact, whether the input requests direct manipulation or indirect manipulation. If direct manipulation, a target of the input is determined based on where the user's hand is positioned. If indirect manipulation, a target of the input is determined based on where the user's gaze is directed. Selecting the target of a direct manipulation input based on the location of the user's hand or a portion thereof provides an intuitive way to directly manipulate targets, and selecting the target of an indirect manipulation input based on the location of the user's gaze enables the indirect manipulation mode to extend the range of targets with which the user can interact.

In some embodiments, a computer system provides gesture information about an input to software associated with a target of the input, with an indication that additional gesture information about the input is available, if additional gesture information is available, or without the indication if additional gesture information is not available. Providing a limited set of gesture information about an input with an indication whether additional gesture information about the input is available upon request provides information about inputs more efficiently by reducing the amount of information that is provided by default, while supporting the provision of more comprehensive information about the input to software that has a need for and explicitly requests the additional information.

In some embodiments, a computer system conditionally performs an operation responsive to an input of a first type directed to a user interface object based on whether the object is associated with a behavior parameter indicating that the object is configured to respond to inputs of the first type, and performs an operation responsive to an input of a second type directed to the user interface object without regard to whether the object is associated with the behavior parameter. Allowing restrictions to be placed on certain types of inputs and objects, and not others, provides flexibility when designing user interfaces and reduces the responsiveness of user interfaces to inputs that are more likely to be accidental.

Figure 7A:
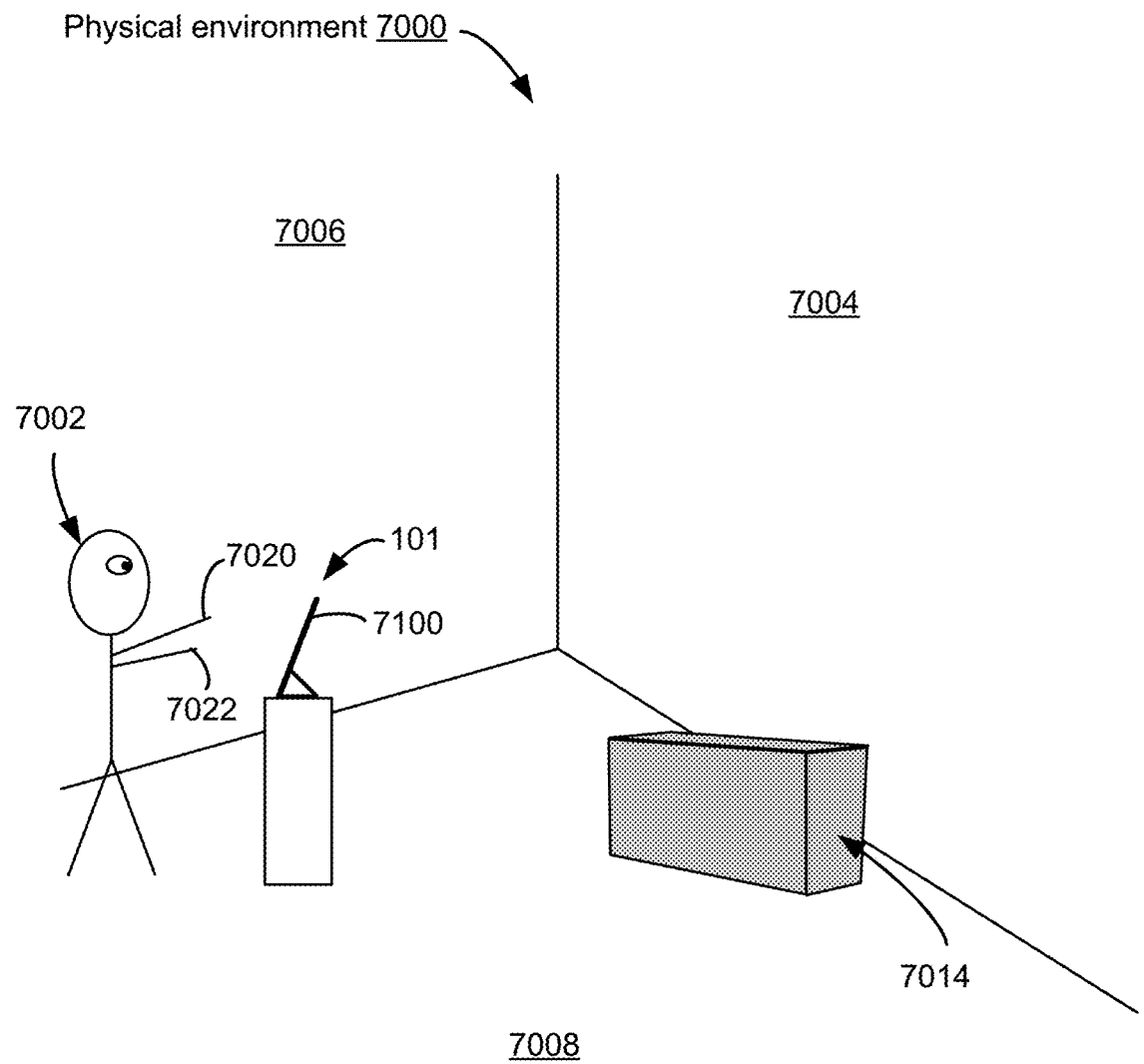
Figure 8:
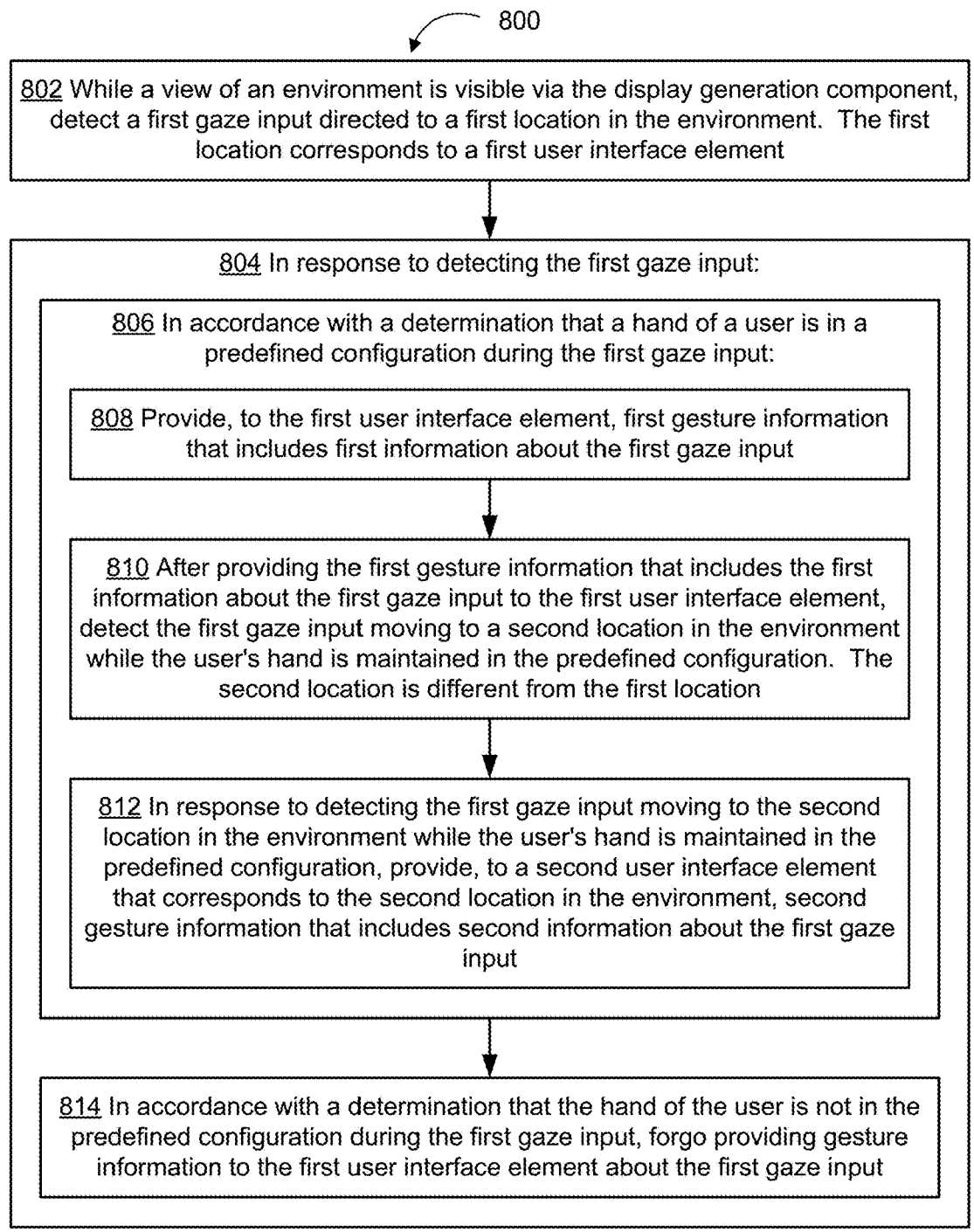
FIG. 8 is a flow diagram of methods of providing gesture information about an input to elements to which the user's gaze is directed, based on whether a user's hand is in a predefined configuration, in accordance with various embodiments.
Figure 9:
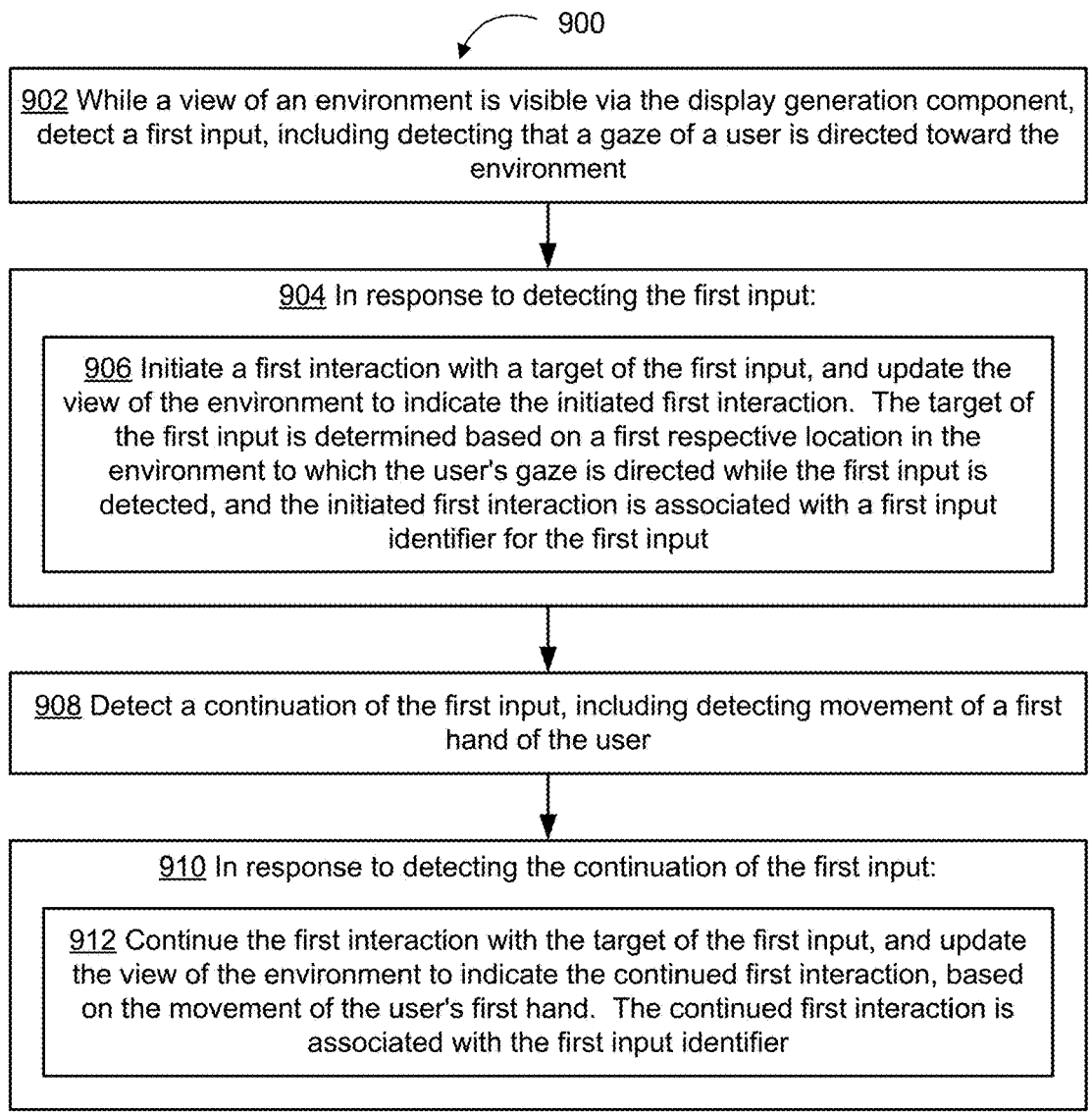
FIG. 9 is a flow diagram of methods of providing gesture information for an input using a consistent identifier for both a portion that is based on the location of the user's gaze and a portion that is based on the movement of the user's hand, in accordance with various embodiments.
Figure 10:
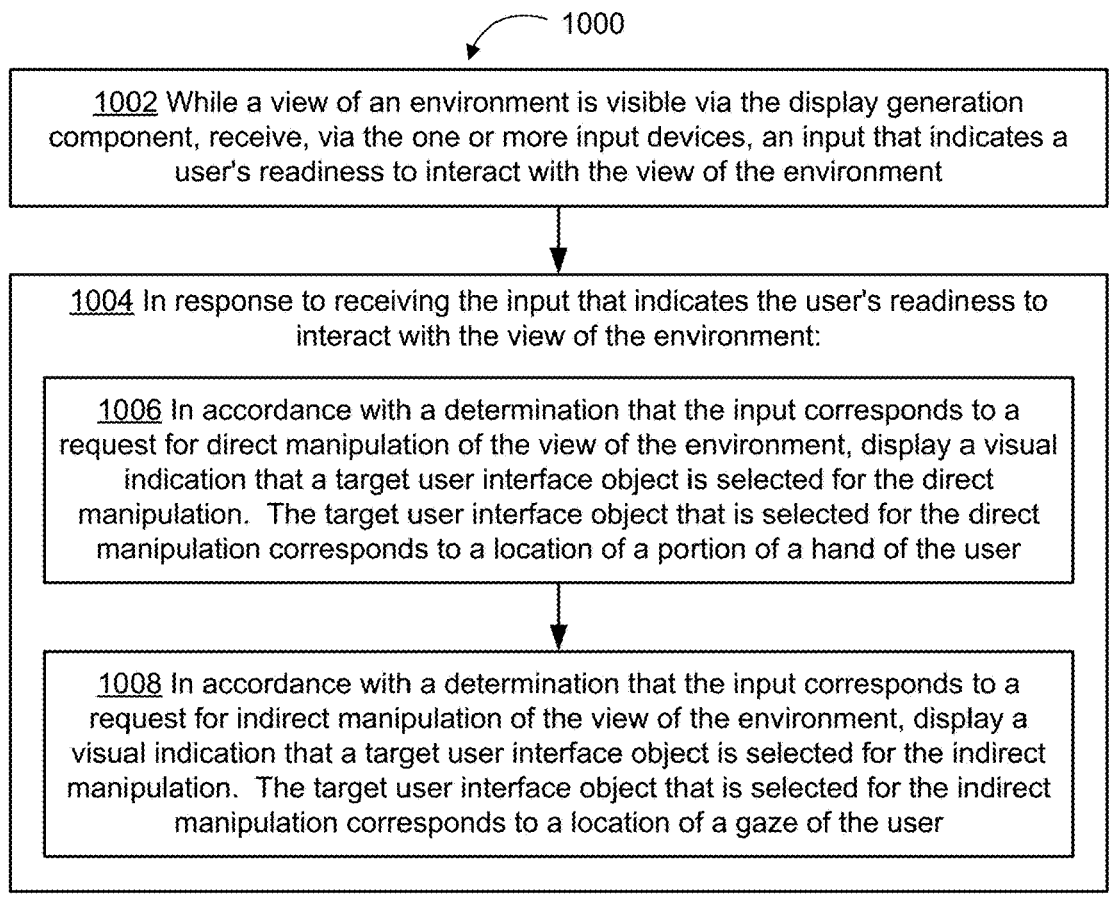
FIG. 10 is a flow diagram of methods of selecting a target of an input based on different features of the user depending on the object manipulation input mode being used, in accordance with various embodiments.
Figure 11:
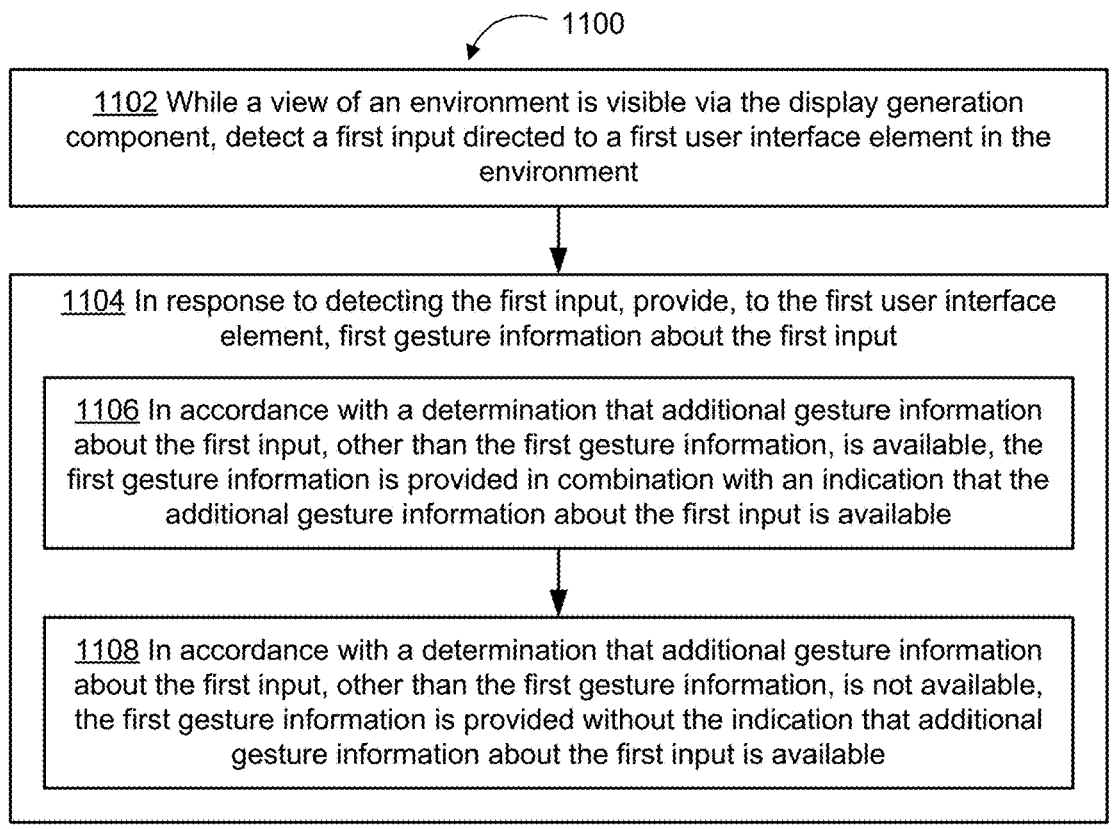
FIG. 11 is a flow diagram of methods of indicating whether additional gesture information beyond what is typically provided is available for certain inputs, in accordance with various embodiments.
Figure 12:
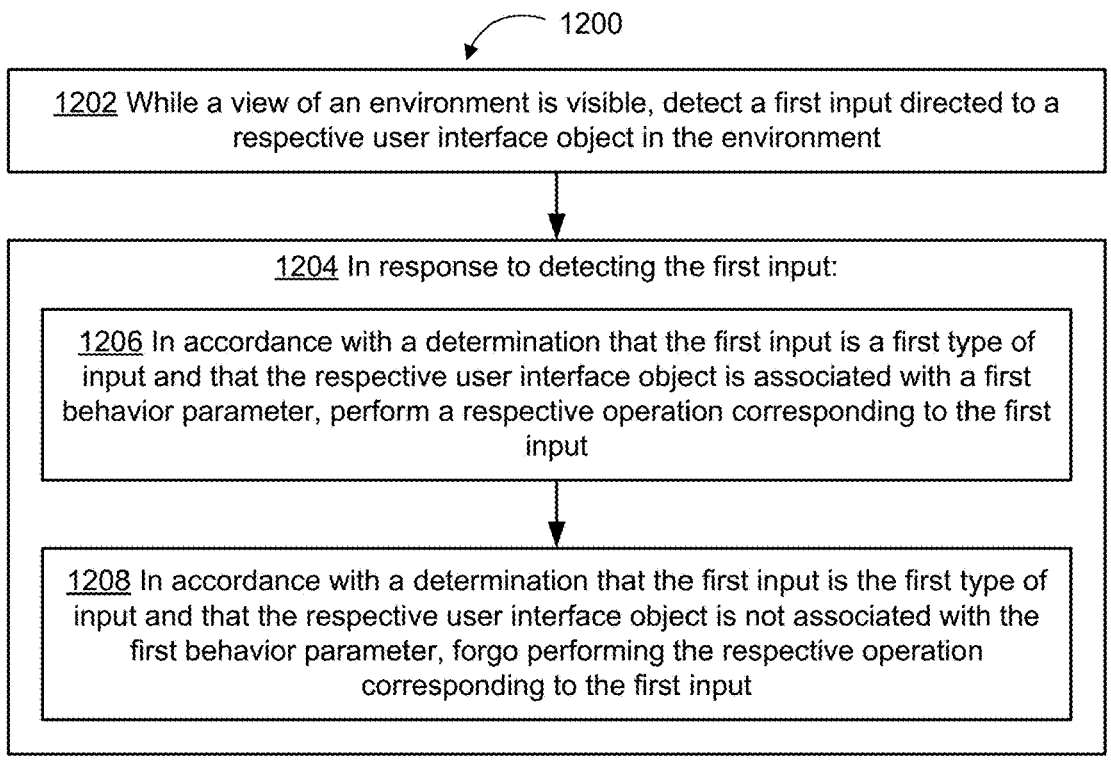
FIG. 12 is a flow diagram of methods of conditionally performing operations in response to inputs directed to user interface objects based on behavior parameters of the objects, in accordance with various embodiments.

FIGS. 1A-6 provide a description of example computer systems for providing XR experiences to users. FIGS. 7A-7I illustrate example techniques for providing gesture information about user inputs to targets of the user inputs based on whether a user is indicating readiness to interact or has initiated an interaction, in accordance with some embodiments. FIGS. 7J-7K illustrate example techniques for disambiguating between direct manipulation and indirect manipulation of objects in a three-dimensional environment, in accordance with some embodiments. FIG. 7L illustrates example relationships between the amount of movement of an input performed by a user and the amount of input movement included in information about the input that is delivered to respective software associated with a target of the input, in accordance with some embodiments. FIG. 7M illustrates example gesture information that describes a user input, in accordance with some embodiments. FIG. 7N-7X illustrate example techniques for conditionally performing operations in response to inputs directed to user interface objects based on behavior parameters of the objects, in accordance with some embodiments. FIG. 8 is a flow diagram of methods of providing gesture information about an input to elements to which the user's gaze is directed, based on whether a user's hand is in a predefined configuration, in accordance with various embodiments. FIG. 9 is a flow diagram of methods of providing gesture information for an input using a consistent identifier for both a portion that is based on the location of the user's gaze and a portion that is based on the movement of the user's hand, in accordance with various embodiments. FIG. 10 is a flow diagram of methods of selecting a target of an input based on different features of the user depending on the object manipulation input mode being used, in accordance with various embodiments. FIG. 11 is a flow diagram of methods of indicating whether additional gesture information beyond what is typically provided is available for certain inputs, in accordance with various embodiments. FIG. 12 is a flow diagram of methods of conditionally performing operations in response to inputs directed to user interface objects based on behavior parameters of the objects, in accordance with various embodiments. The user interfaces in FIGS. 7A-7X are used to illustrate the processes in FIGS. 8, 9, 10, 11, and 12.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands). A person may sense and/or interact with an XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate an XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is an XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
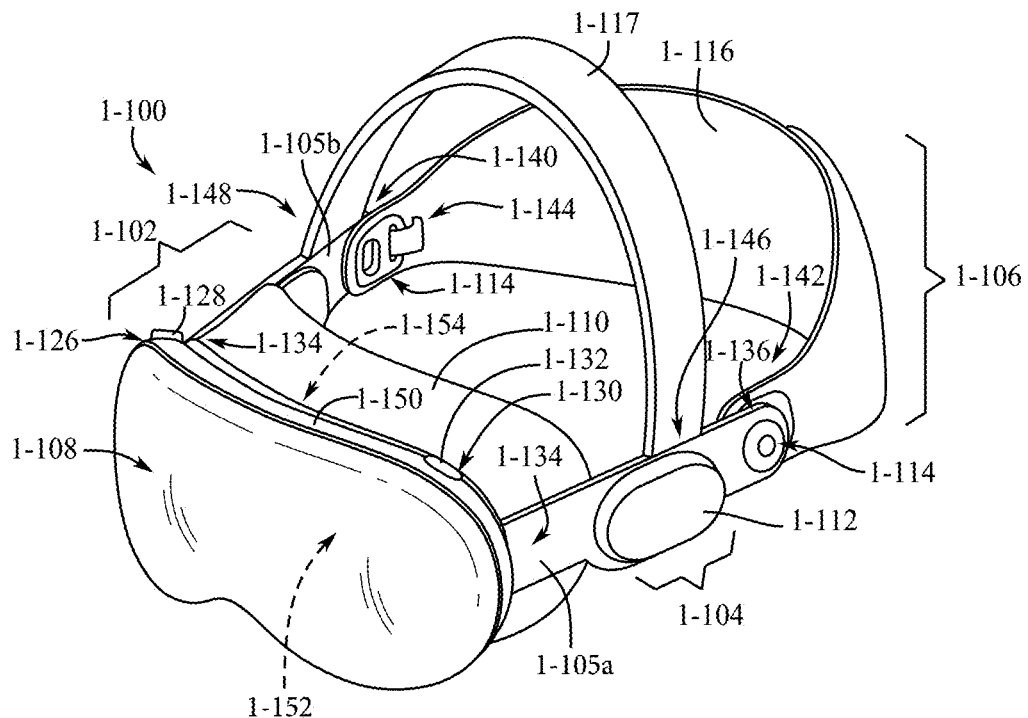
FIGS. 1B-1P are examples of a computer system for providing XR experiences in the operating environment of FIG. 1A.
Figure 1C:
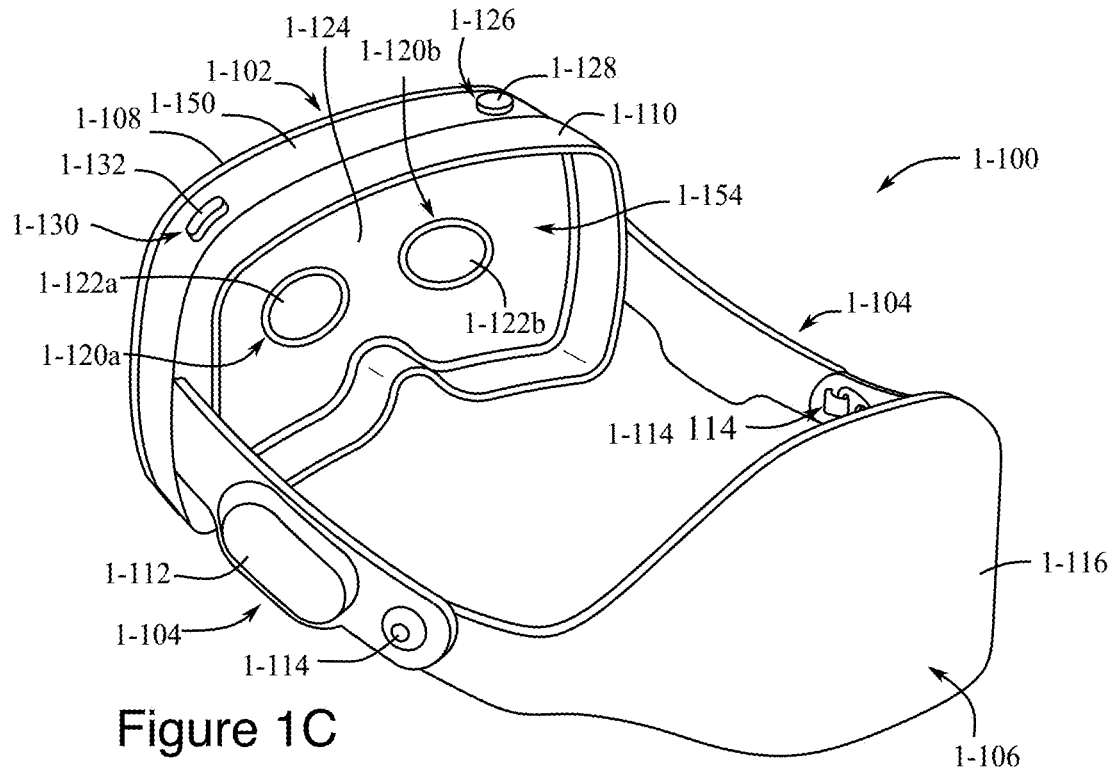
Figure 1D:
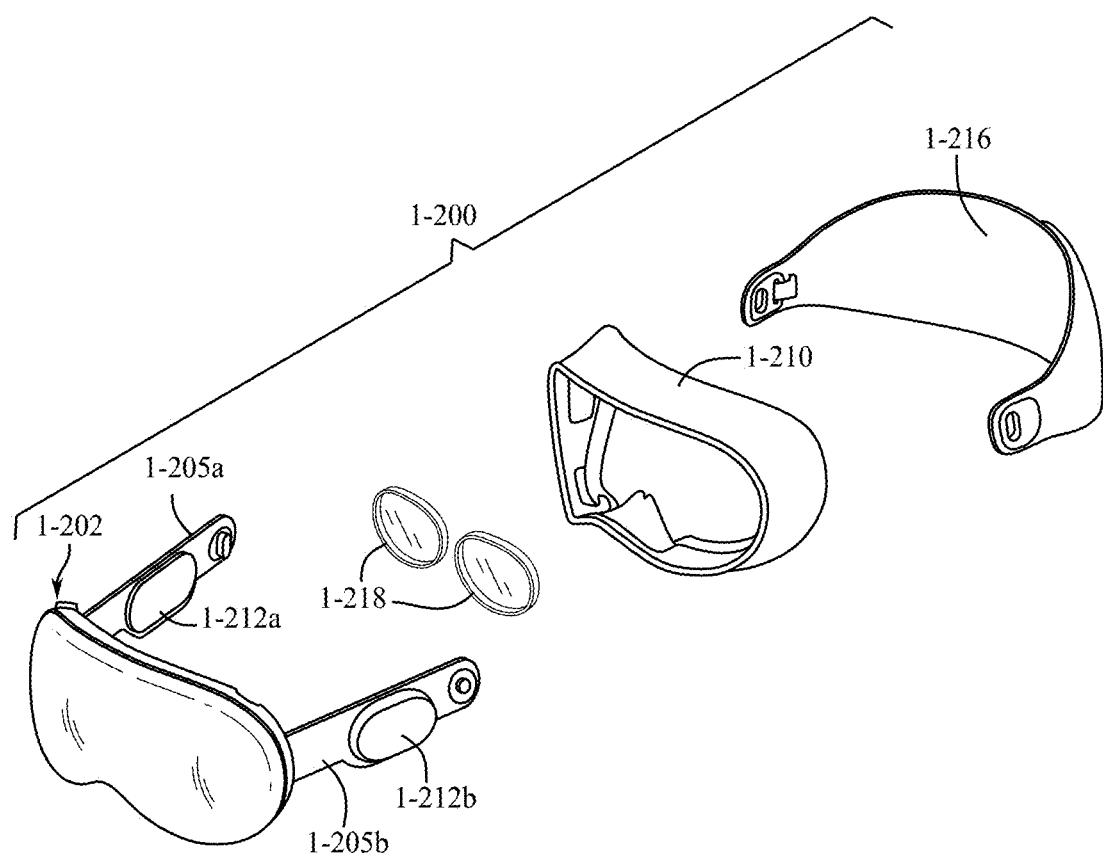
Figure 1E:
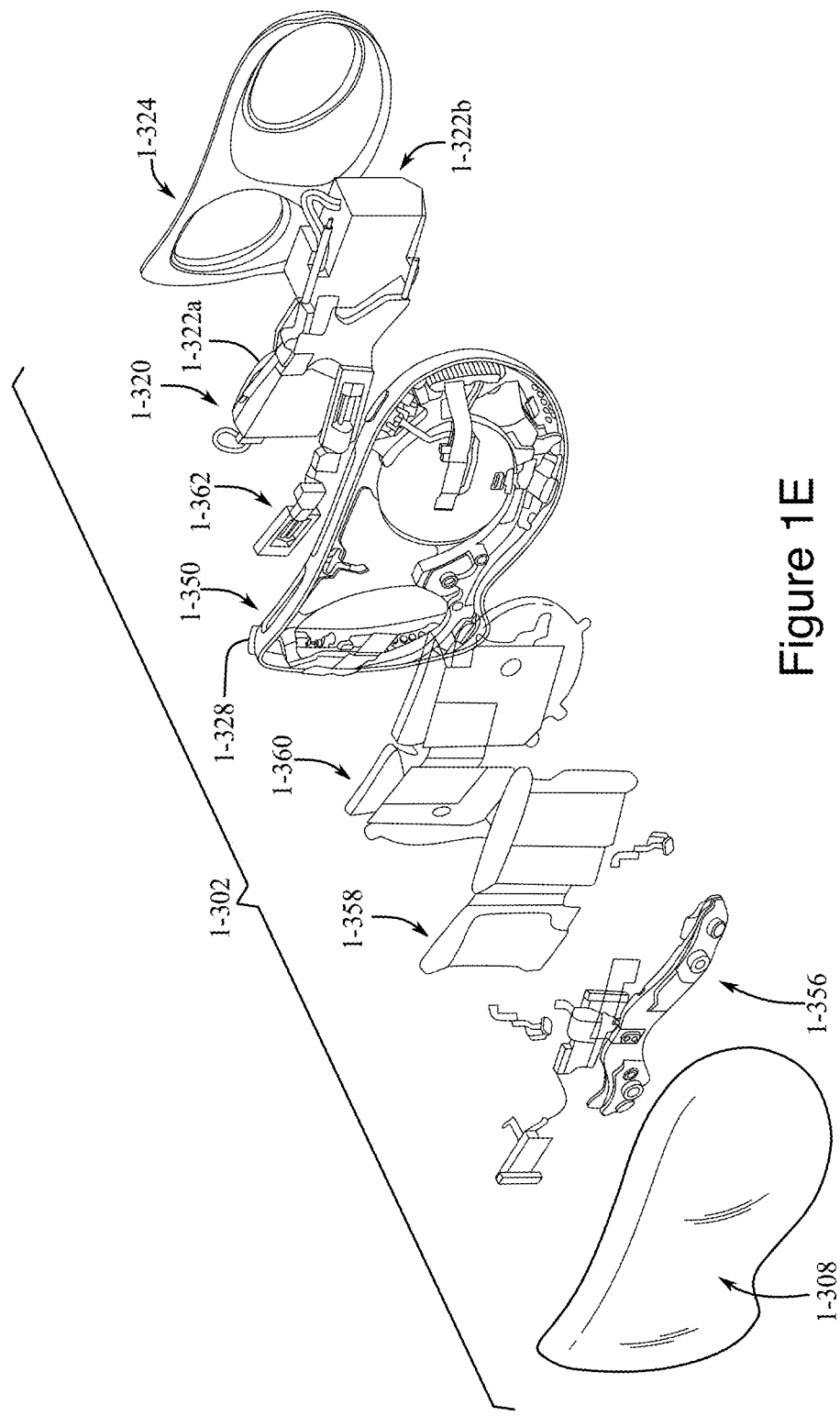
Figure 1F:
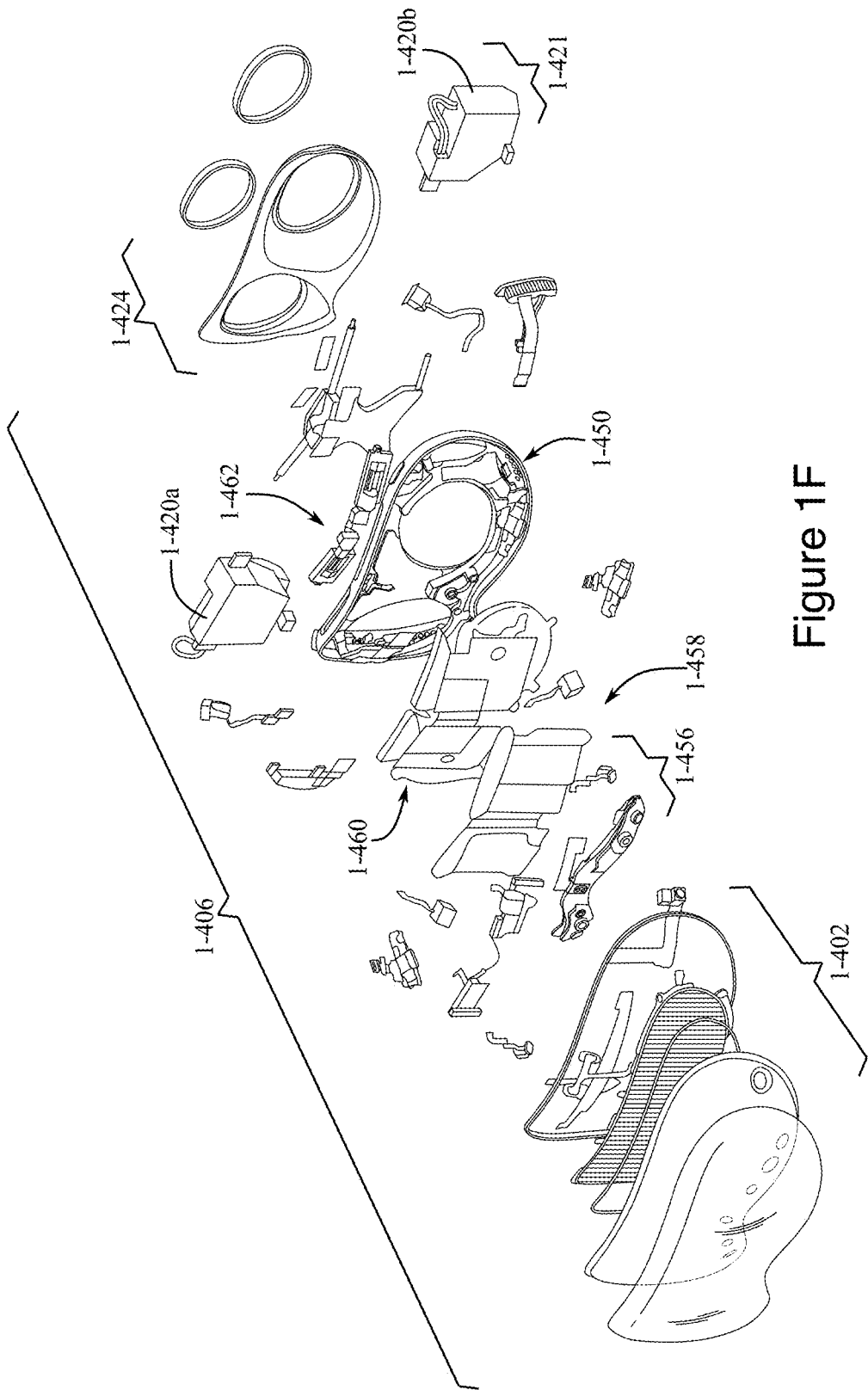
Figure 1G:
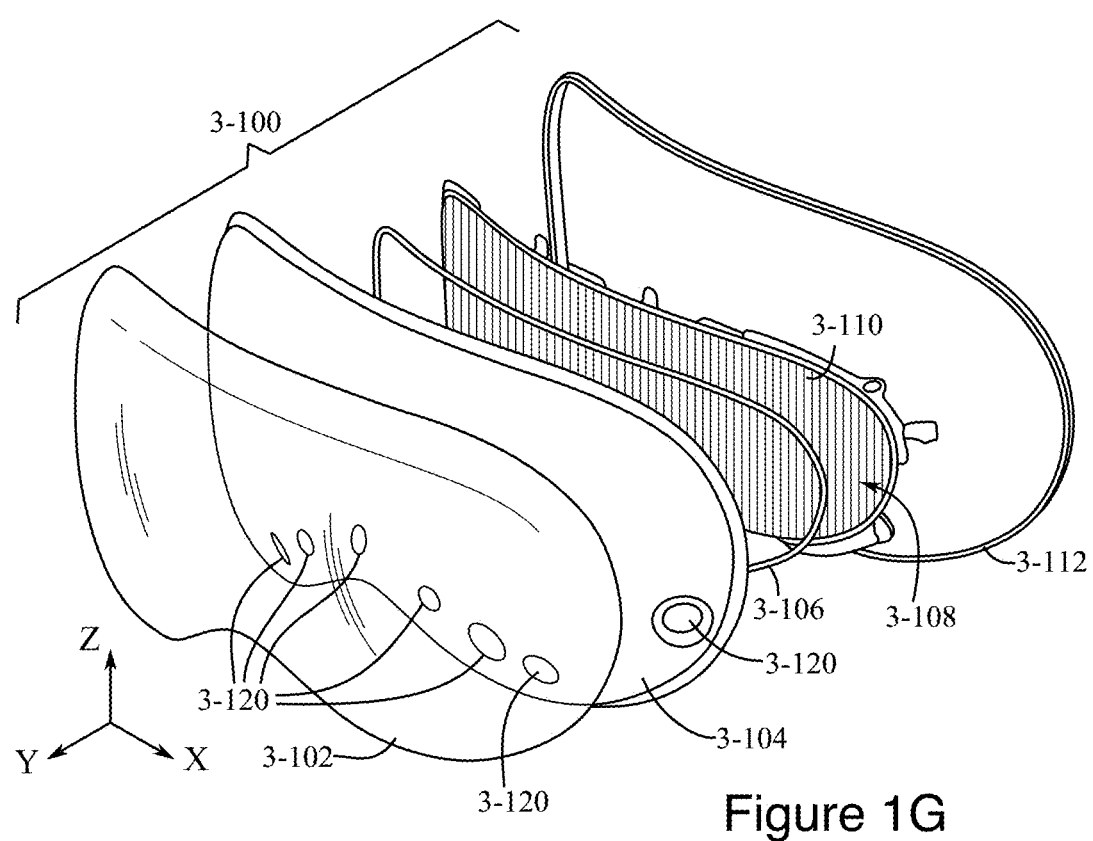
Figure 1H:
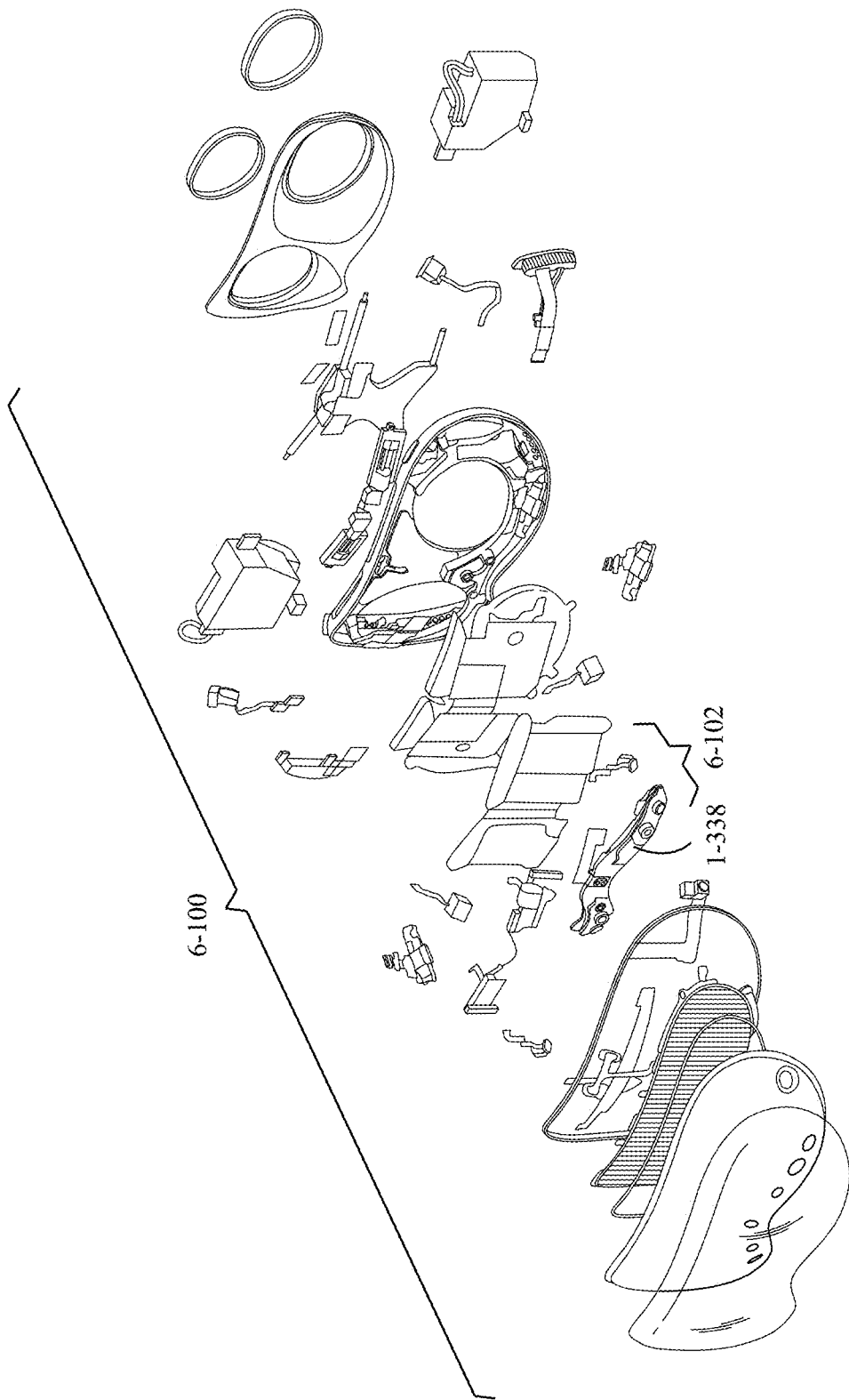
Figure 1I:
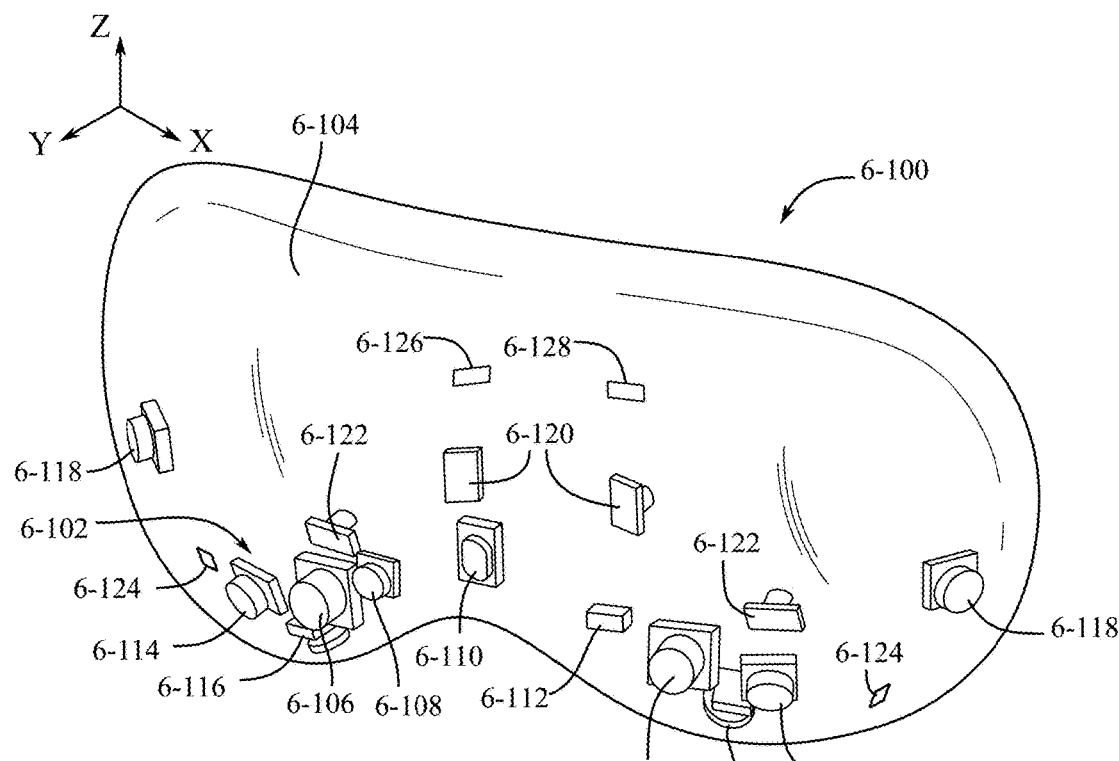
Figure 1J:
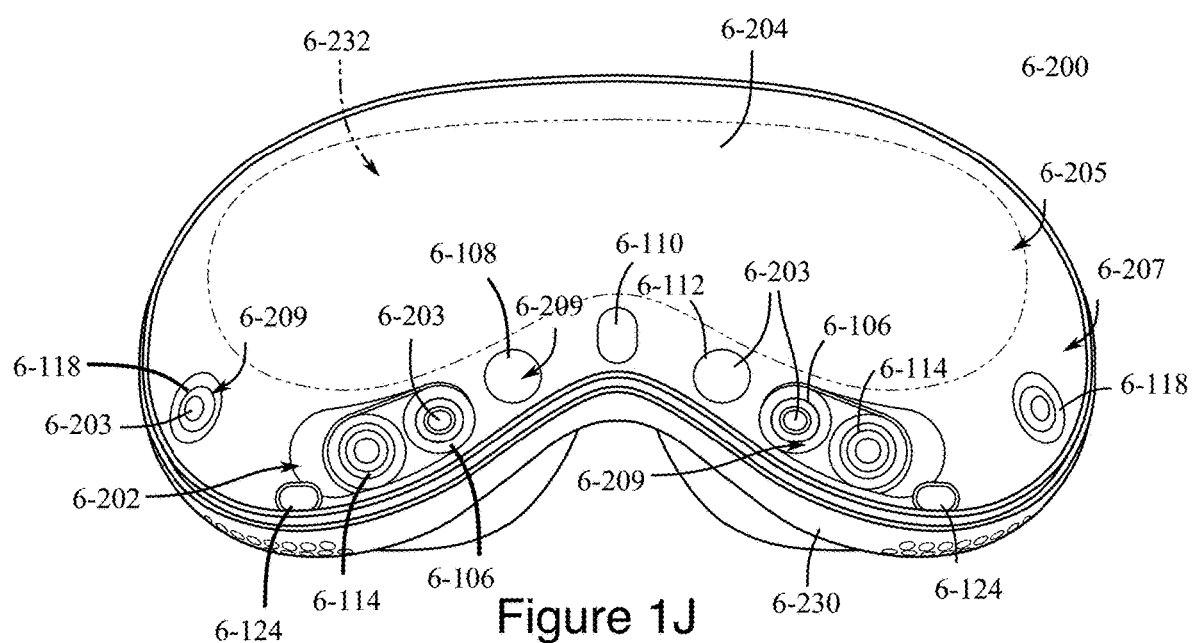
Figure 1K:
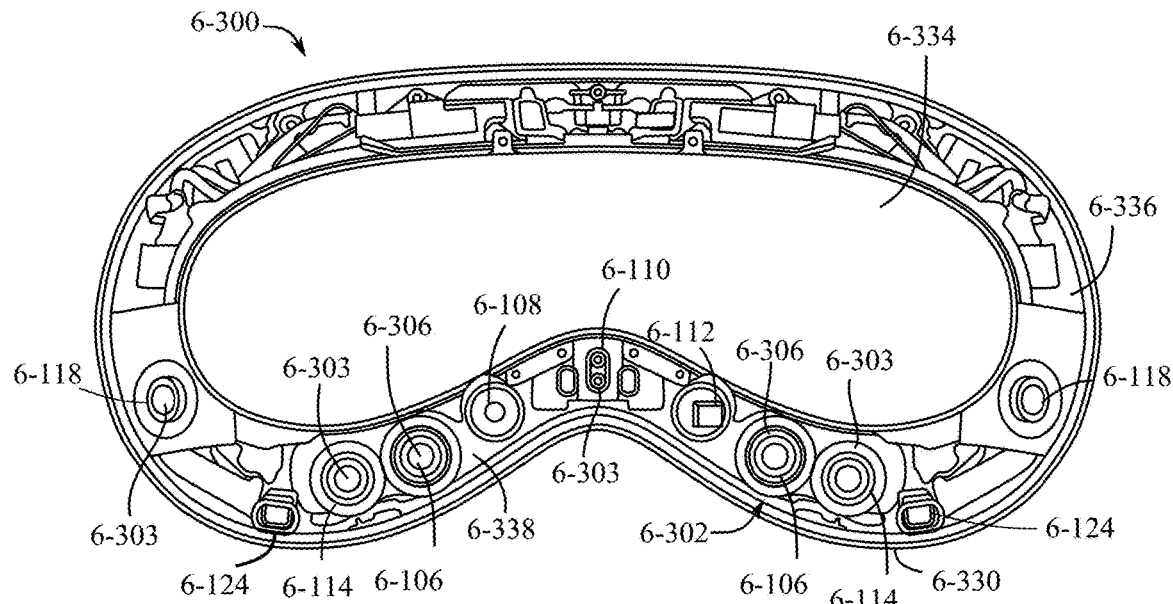
Figure 1L:
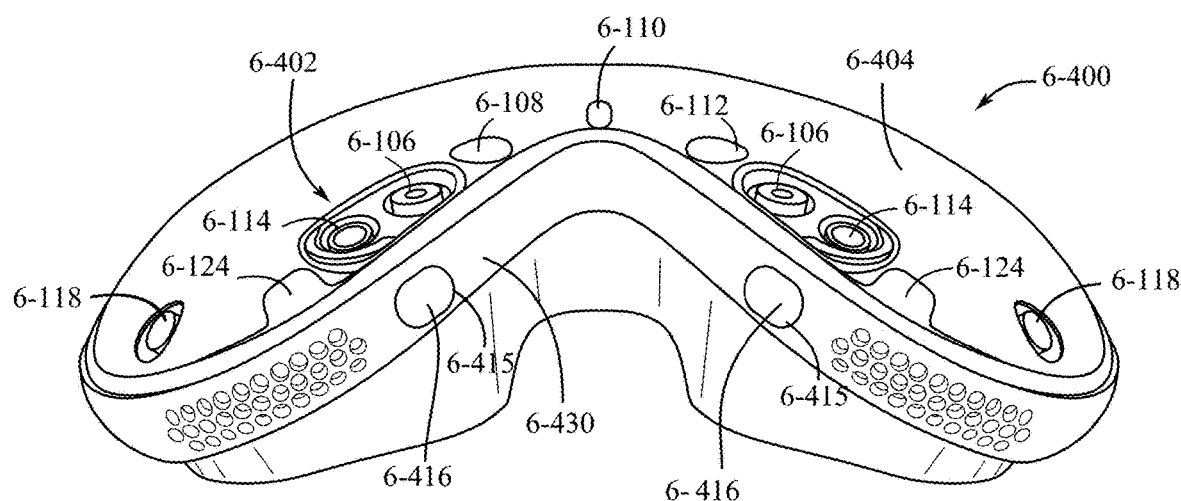
Figure 1M:
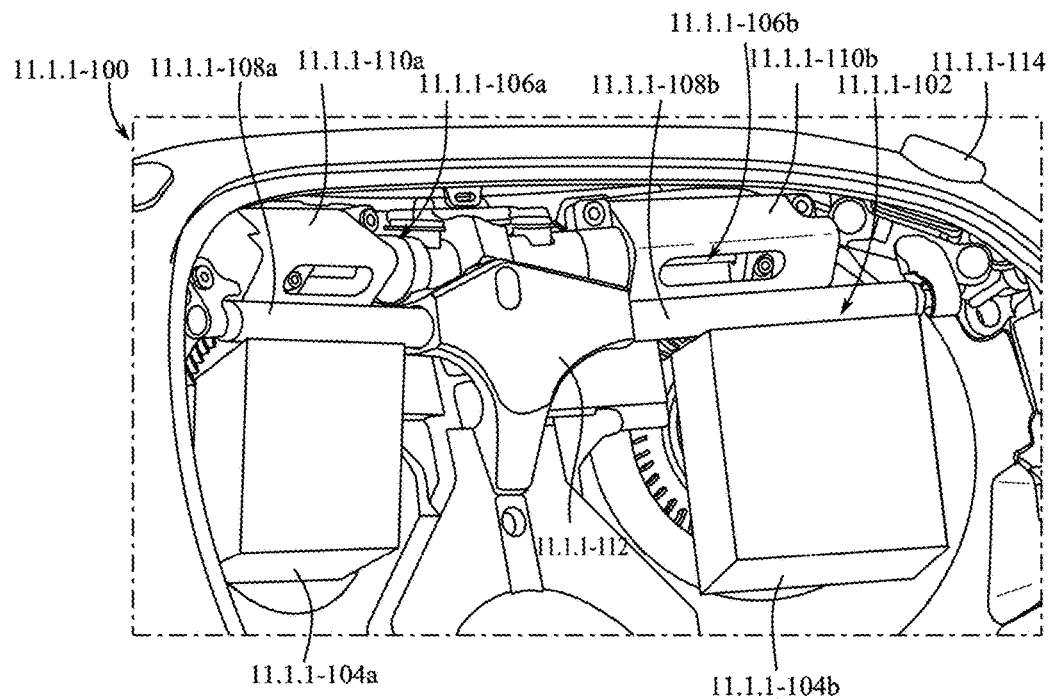
Figure 1N:
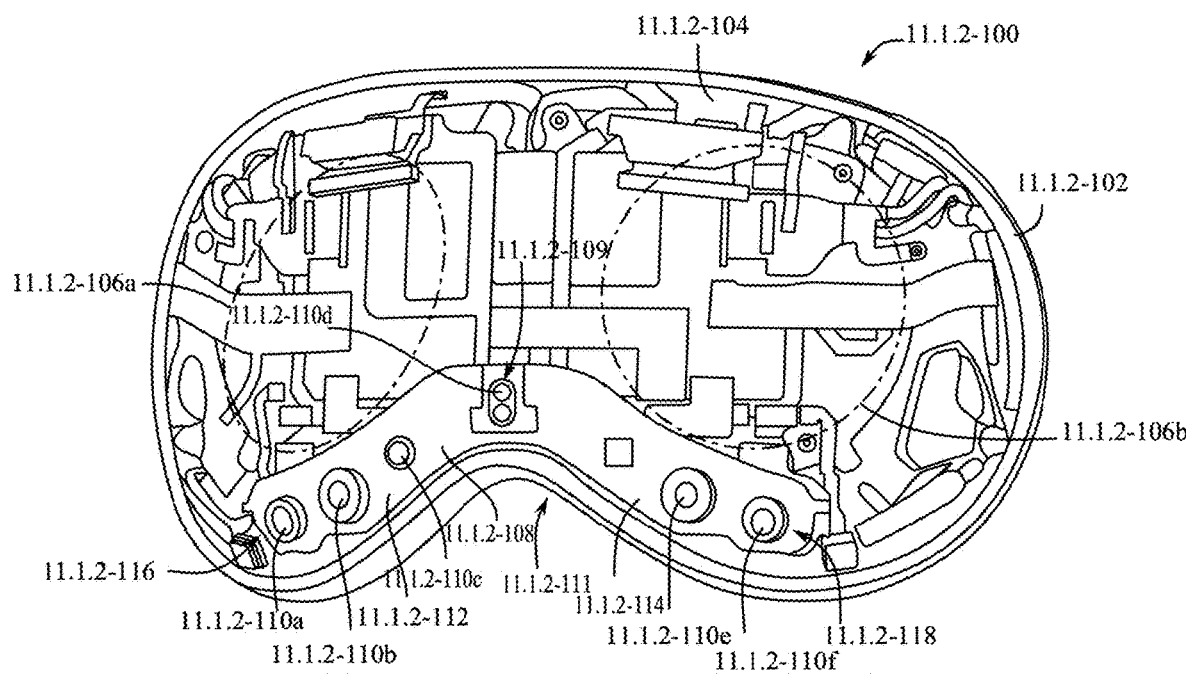
Figure 1O:
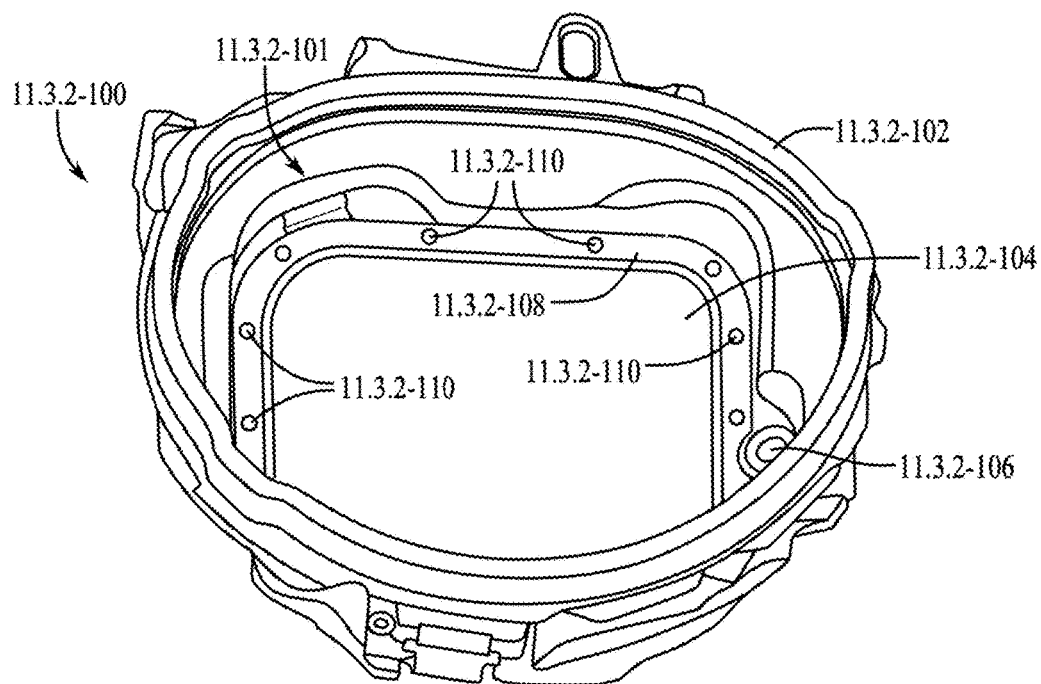
Figure 1P:
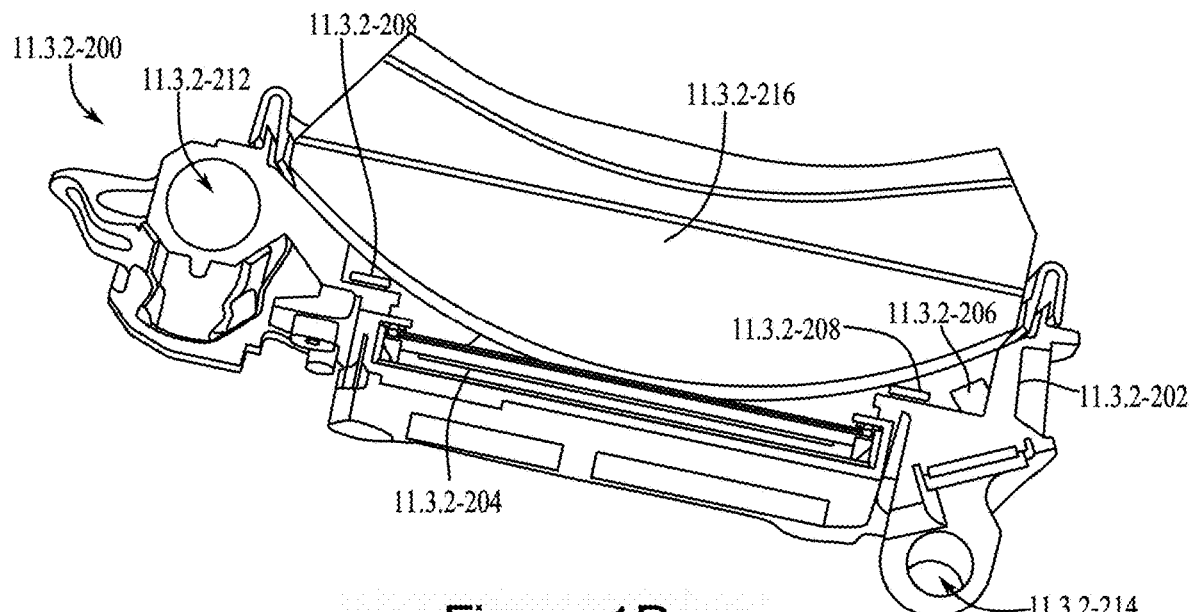

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120*a*, 1-120*b* and/or first and second optical modules 11.1.1-104*a* and 11.1.1-104*b*), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120*a*, 1-120*b* and/or first and second optical modules 11.1.1-104*a* and 11.1.1-104*b*).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105*a*, 1-105*b* of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105*a* including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105*b* including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105*a* and the second electronic strap 1-105*b*. The straps 1-105*a-b* and band 1-116 can be coupled via connection mechanisms or assemblies 1-114. In at least one example, the second band 1-117 includes a first end 1-146 coupled to the first electronic strap 1-105*a* between the first proximal end 1-134 and the first distal end 1-136 and a second end 1-148 coupled to the second electronic strap 1-105*b* between the second proximal end 1-138 and the second distal end 1-140.

In at least one example, the first and second electronic straps 1-105*a-b* include plastic, metal, or other structural materials forming the shape the substantially rigid straps 1-105*a-b*. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322a-b.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420a, 1-420b of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HMD device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HMD 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an interpupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110a-f. Each sensor of the plurality of sensors 11.1.2-110a-f can include various types of sensors, including cameras, IR sensors, and so forth. In some examples, one or more of the sensors 11.1.2-110a-f can be used for object recognition in three-dimensional space such that it is important to maintain a precise relative position of two or more of the plurality of sensors 11.1.2-110a-f. The cantilevered nature of the mounting bracket 11.1.2-108 can protect the sensors 11.1.2-110a-f from damage and altered positioning in the case of accidental drops by the user. Because the sensors 11.1.2-110a-f are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110a-f coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HMD devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
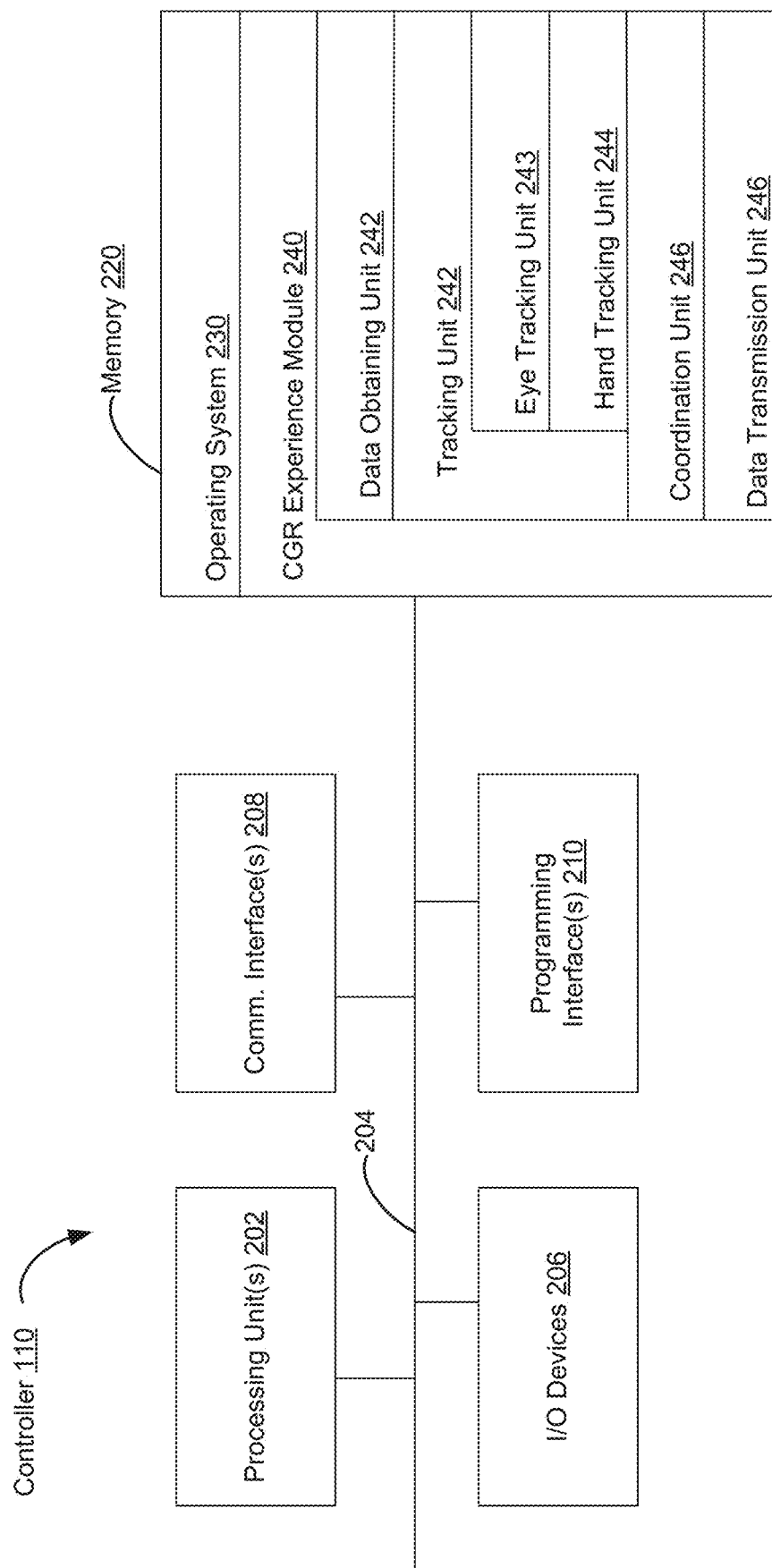
FIG. 2 is a block diagram illustrating a controller of a computer system that is configured to manage and coordinate an XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 245 and/or eye tracking unit 243. In some embodiments, the hand tracking unit 245 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 245 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 245), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 245), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
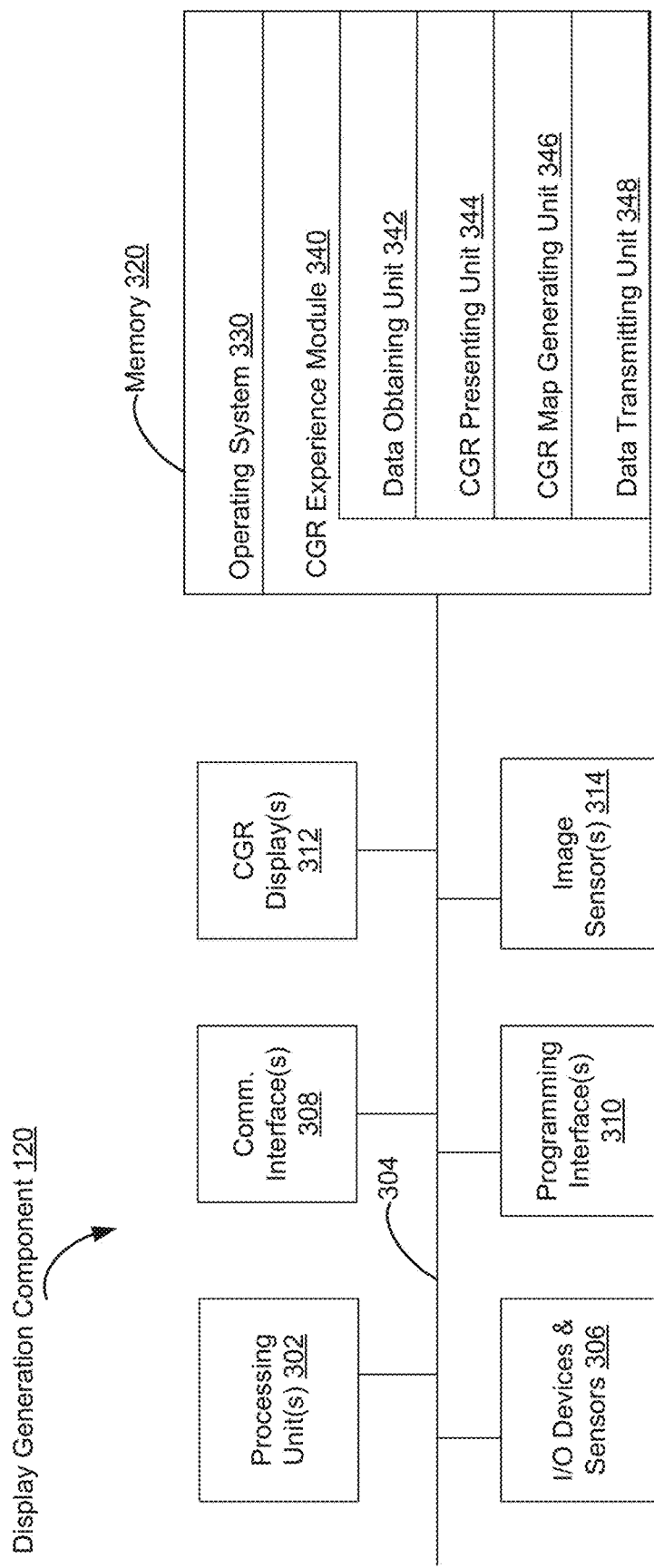
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transistor (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes an XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and an XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, an XR presenting unit 344, an XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate an XR map (e.g., a 3D map of the mixed reality scene or a map of the physical environment into which computer-generated objects can be placed to generate the extended reality) based on media content data.

To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
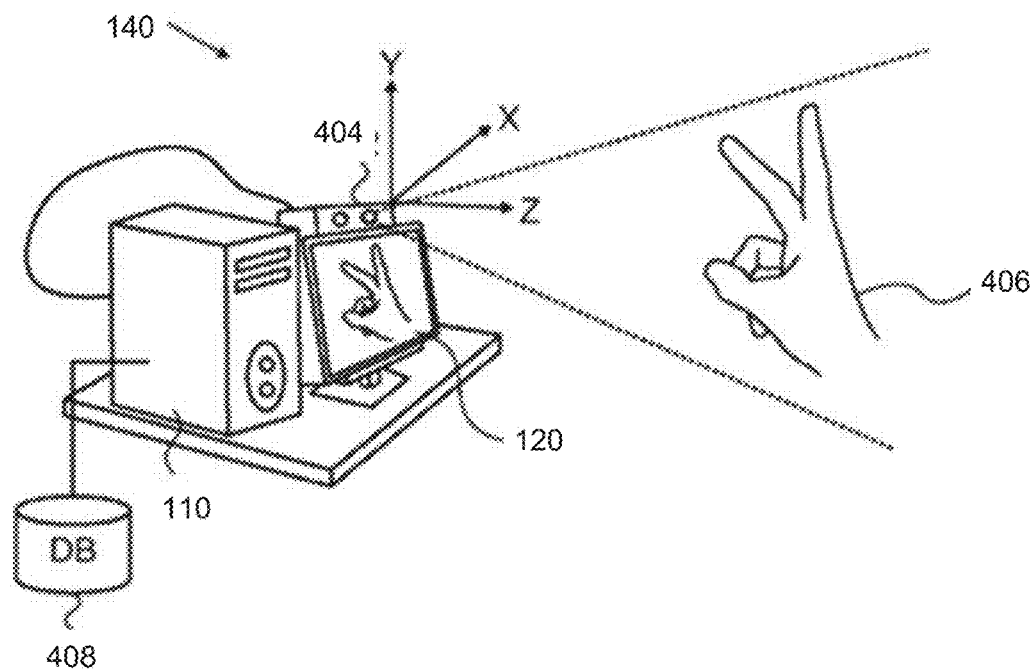
FIG. 4 is a block diagram illustrating a hand tracking unit of a computer system that is configured to capture gesture inputs of the user in accordance with some embodiments.
Figure 4:
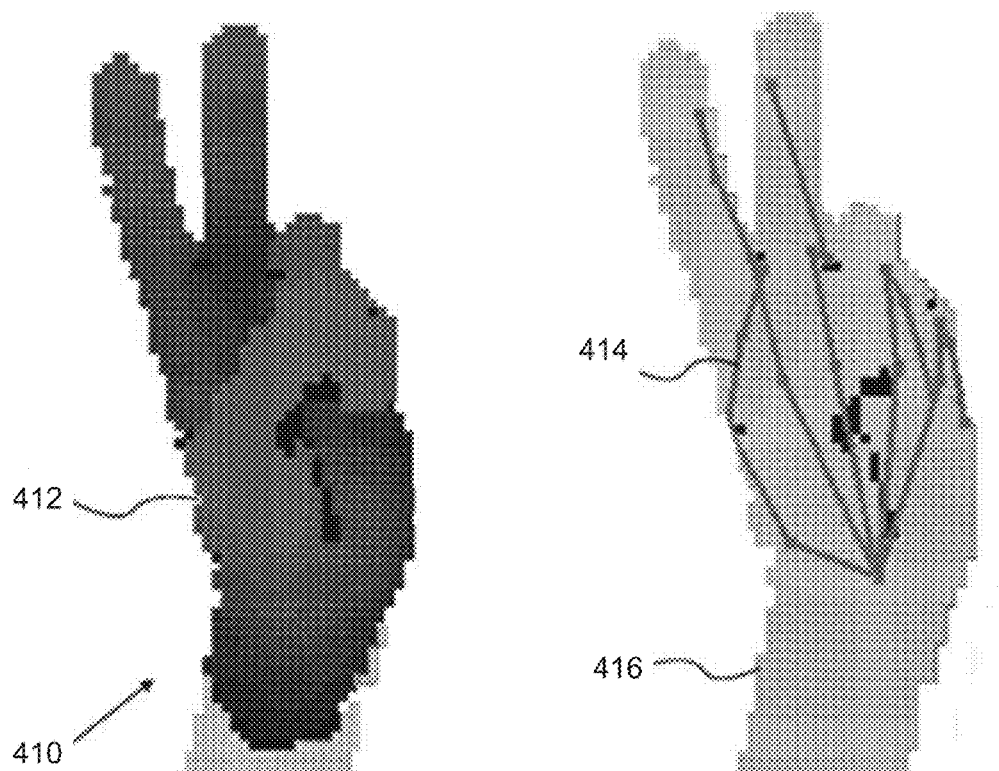

FIG. 4 is a schematic, pictorial illustration of an example embodiment of the hand tracking device 140. In some embodiments, hand tracking device 140 (FIG. 1A) is controlled by hand tracking unit 245 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving their hand 406 and/or changing their hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves their hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture (e.g., an air drag gesture or an air swipe gesture) includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, fingertips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
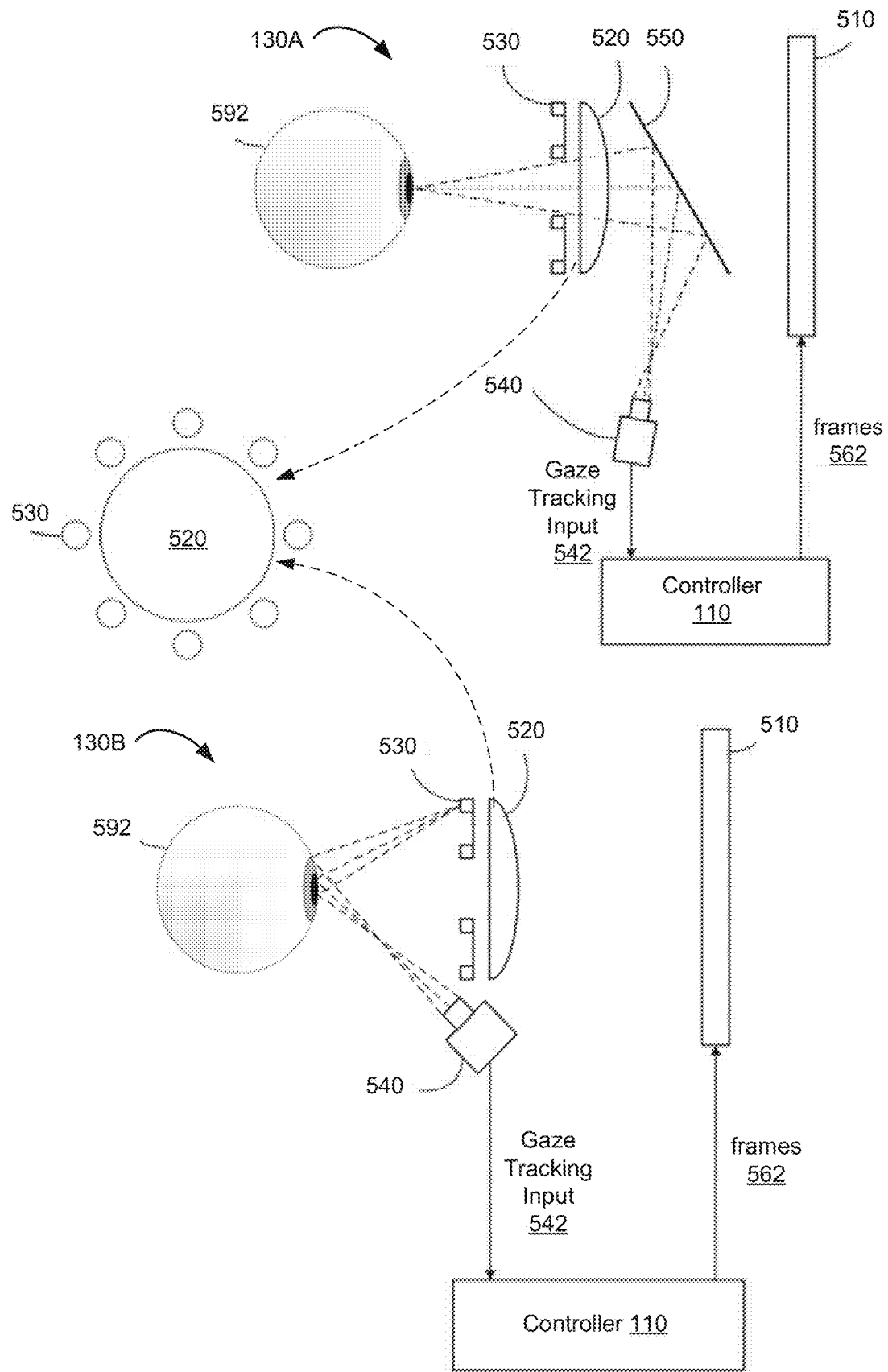
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or an XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
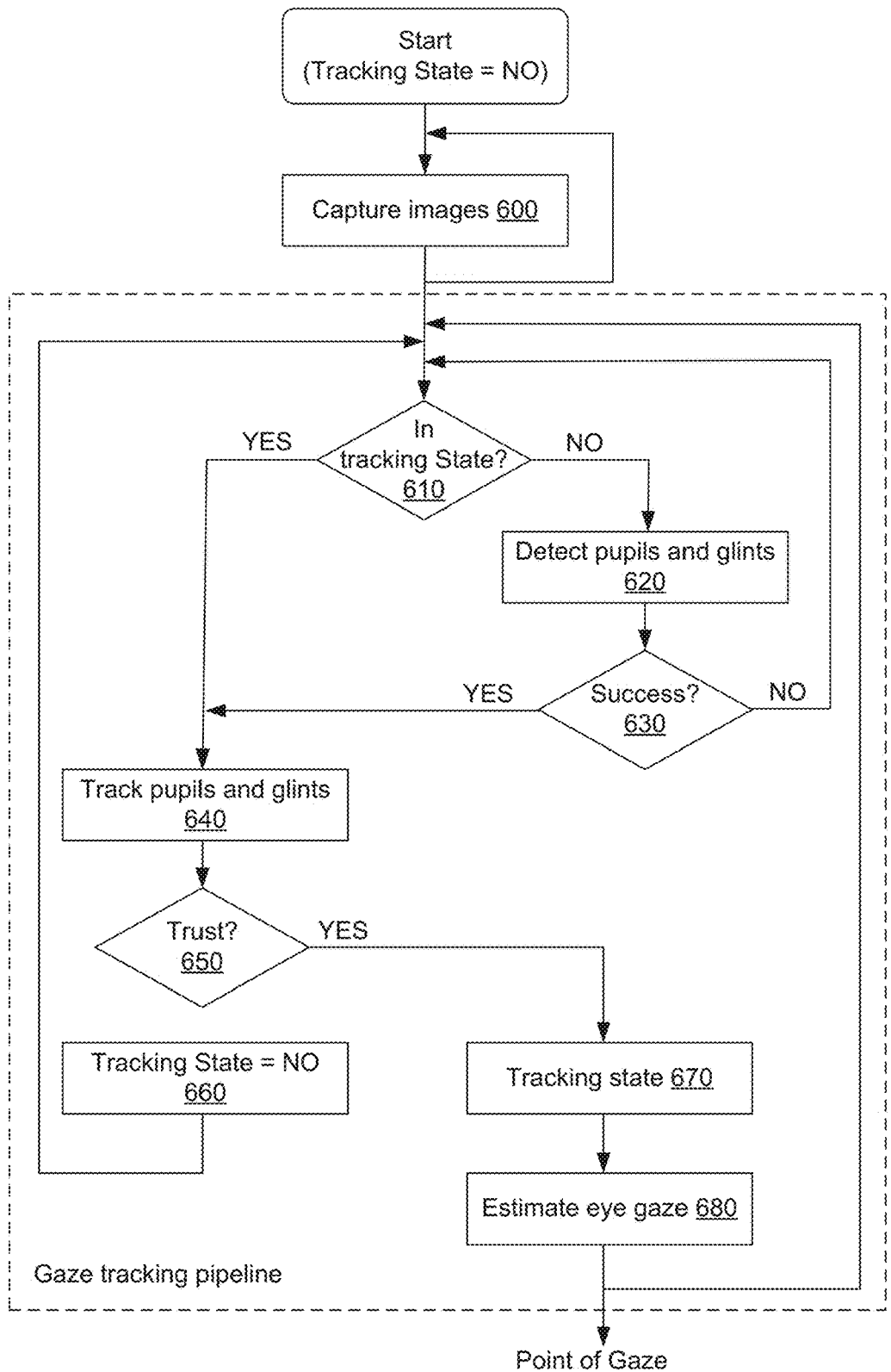
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component and one or more input devices.

FIGS. 7A-7X include illustrations of three-dimensional environments that are visible via a display generation component (e.g., a display generation component 7100, or a display generation component 120) of a computer system (e.g., computer system 101) and interactions that occur in the three-dimensional environments caused by user inputs directed to the three-dimensional environments and/or inputs received from other computer systems and/or sensors. In some embodiments, an input is directed to a virtual object within a three-dimensional environment by a user's gaze detected in the region occupied by the virtual object, or by a hand gesture performed at a location in the physical environment that corresponds to the region of the virtual object. In some embodiments, an input is directed to a virtual object within a three-dimensional environment by a hand gesture that is performed (e.g., optionally, at a location in the physical environment that is independent of the region of the virtual object in the three-dimensional environment) while the virtual object has input focus (e.g., while the virtual object has been selected by a concurrently and/or previously detected gaze input, selected by a concurrently or previously detected pointer input, and/or selected by a concurrently and/or previously detected gesture input). In some embodiments, an input is directed to a virtual object within a three-dimensional environment by an input device that has positioned a focus selector object (e.g., a pointer object or selector object) at the position of the virtual object. In some embodiments, an input is directed to a virtual object within a three-dimensional environment via other means (e.g., voice and/or control button). In some embodiments, an input is directed to a representation of a physical object or a virtual object that corresponds to a physical object by the user's hand movement (e.g., whole hand movement, whole hand movement in a respective posture, movement of one portion of the user's hand relative to another portion of the hand, and/or relative movement between two hands) and/or manipulation with respect to the physical object (e.g., touching, swiping, tapping, opening, moving toward, and/or moving relative to). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from sensors (e.g., image sensors, temperature sensors, biometric sensors, motion sensors, and/or proximity sensors) and contextual conditions (e.g., location, time, and/or presence of others in the environment). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from other computers used by other users that are sharing the computer-generated environment with the user of the computer system (e.g., in a shared computer-generated experience, in a shared virtual environment, and/or in a shared virtual or augmented reality environment of a communication session). In some embodiments, the computer system displays some changes in the three-dimensional environment (e.g., displaying movement, deformation, and/or changes in visual characteristics of a user interface, a virtual surface, a user interface object, and/or virtual scenery) in accordance with inputs from sensors that detect movement of other persons and objects and movement of the user that may not qualify as a recognized gesture input for triggering an associated operation of the computer system.

In some embodiments, a three-dimensional environment that is visible via a display generation component described herein is a virtual three-dimensional environment that includes virtual objects and content at different virtual positions in the three-dimensional environment without a representation of the physical environment. In some embodiments, the three-dimensional environment is a mixed reality environment that displays virtual objects at different virtual positions in the three-dimensional environment that are constrained by one or more physical aspects of the physical environment (e.g., positions and orientations of walls, floors, surfaces, direction of gravity, time of day, and/or spatial relationships between physical objects). In some embodiments, the three-dimensional environment is an augmented reality environment that includes a representation of the physical environment. In some embodiments, the representation of the physical environment includes respective representations of physical objects and surfaces at different positions in the three-dimensional environment, such that the spatial relationships between the different physical objects and surfaces in the physical environment are reflected by the spatial relationships between the representations of the physical objects and surfaces in the three-dimensional environment. In some embodiments, when virtual objects are placed relative to the positions of the representations of physical objects and surfaces in the three-dimensional environment, they appear to have corresponding spatial relationships with the physical objects and surfaces in the physical environment. In some embodiments, the computer system transitions between displaying the different types of environments (e.g., transitions between presenting a computer-generated environment or experience with different levels of immersion, adjusting the relative prominence of audio/visual sensory inputs from the virtual content and from the representation of the physical environment) based on user inputs and/or contextual conditions.

In some embodiments, the display generation component includes a pass-through portion in which the representation of the physical environment is displayed. In some embodiments, the pass-through portion of the display generation component is a transparent or semi-transparent (e.g., see-through) portion of the display generation component revealing at least a portion of a physical environment surrounding and within the field of view of a user. For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display. In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of a mobile device or associated with a head-mounted display, or other cameras that feed image data to the computer system). In some embodiments, the one or more cameras point at a portion of the physical environment that is directly in front of the user's eyes (e.g., behind the display generation component relative to the user of the display generation component). In some embodiments, the one or more cameras point at a portion of the physical environment that is not directly in front of the user's eyes (e.g., in a different physical environment, or to the side of or behind the user).

In some embodiments, when displaying virtual objects at positions that correspond to locations of one or more physical objects in the physical environment (e.g., at positions in a virtual reality environment, a mixed reality environment, or an augmented reality environment), at least some of the virtual objects are displayed in place of (e.g., replacing display of) a portion of the live view (e.g., a portion of the physical environment captured in the live view) of the cameras. In some embodiments, at least some of the virtual objects and content are projected onto physical surfaces or empty space in the physical environment and are visible through the pass-through portion of the display generation component (e.g., viewable as part of the camera view of the physical environment, or through the transparent or semi-transparent portion of the display generation component). In some embodiments, at least some of the virtual objects and virtual content are displayed to overlay a portion of the display and block the view of at least a portion of the physical environment visible through the transparent or semi-transparent portion of the display generation component.

In some embodiments, the display generation component displays different views of the three-dimensional environment in accordance with user inputs or movements that change the virtual position of the viewpoint of the currently displayed view of the three-dimensional environment relative to the three-dimensional environment. In some embodiments, when the three-dimensional environment is a virtual environment, the viewpoint moves in accordance with navigation or locomotion requests (e.g., in-air hand gestures, and/or gestures performed by movement of one portion of the hand relative to another portion of the hand) without requiring movement of the user's head, torso, and/or the display generation component in the physical environment. In some embodiments, movement of the user's head and/or torso, and/or the movement of the display generation component or other location sensing elements of the computer system (e.g., due to the user holding the display generation component or wearing the HMD), relative to the physical environment, cause corresponding movement of the viewpoint (e.g., with corresponding movement direction, movement distance, movement speed, and/or change in orientation) relative to the three-dimensional environment, resulting in corresponding change in the currently displayed view of the three-dimensional environment. In some embodiments, when a virtual object has a preset spatial relationship relative to the viewpoint (e.g., is anchored or fixed to the viewpoint), movement of the viewpoint relative to the three-dimensional environment would cause movement of the virtual object relative to the three-dimensional environment while the position of the virtual object in the field of view is maintained (e.g., the virtual object is said to be head locked). In some embodiments, a virtual object is body-locked to the user, and moves relative to the three-dimensional environment when the user moves as a whole in the physical environment (e.g., carrying or wearing the display generation component and/or other location sensing component of the computer system), but will not move in the three-dimensional environment in response to the user's head movement alone (e.g., the display generation component and/or other location sensing component of the computer system rotating around a fixed location of the user in the physical environment). In some embodiments, a virtual object is, optionally, locked to another portion of the user, such as a user's hand or a user's wrist, and moves in the three-dimensional environment in accordance with movement of the portion of the user in the physical environment, to maintain a preset spatial relationship between the position of the virtual object and the virtual position of the portion of the user in the three-dimensional environment. In some embodiments, a virtual object is locked to a preset portion of a field of view provided by the display generation component, and moves in the three-dimensional environment in accordance with the movement of the field of view, irrespective of movement of the user that does not cause a change of the field of view.

In some embodiments, as shown in some of the FIGS. 7A-7X, the views of a three-dimensional environment sometimes do not include representation(s) of a user's hand(s), arm(s), and/or wrist(s). In some embodiments, the representation(s) of a user's hand(s), arm(s), and/or wrist(s) are sometimes included in the views of a three-dimensional environment (e.g., FIG. 7K (e.g., FIGS. 7K1-7K2) may represent embodiments in which the representation(s) of a user's hand(s) are not included in the view of the three-dimensional environment or may represent embodiments in which the representation(s) of a user's hand(s) are included in the view of the three-dimensional environment). In some embodiments, the representation(s) of a user's hand(s), arm(s), and/or wrist(s) are included in the views of a three-dimensional environment as part of the representation of the physical environment provided via the display generation component. In some embodiments, the representations are not part of the representation of the physical environment and are separately captured (e.g., by one or more cameras pointing toward the user's hand(s), arm(s), and wrist(s)) and displayed in the three-dimensional environment independent of the currently displayed view of the three-dimensional environment. In some embodiments, the representation(s) include camera images as captured by one or more cameras of the computer system(s), or stylized versions of the arm(s), wrist(s) and/or hand(s) based on information captured by various sensors). In some embodiments, the representation(s) replace display of, are overlaid on, or block the view of, a portion of the representation of the physical environment. In some embodiments, when the display generation component does not provide a view of a physical environment, and provides a completely virtual environment (e.g., no camera view and no transparent pass-through portion), real-time visual representations (e.g., stylized representations or segmented camera images) of one or both arms, wrists, and/or hands of the user are, optionally, still displayed in the virtual environment. In some embodiments, if a representation of the user's hand is not provided in the view of the three-dimensional environment, the position that corresponds to the user's hand is optionally indicated in the three-dimensional environment, e.g., by the changing appearance of the virtual content (e.g., through a change in translucency and/or simulated reflective index) at positions in the three-dimensional environment that correspond to the location of the user's hand in the physical environment. In some embodiments, the representation of the user's hand or wrist is outside of the currently displayed view of the three-dimensional environment while the virtual position in the three-dimensional environment that corresponds to the location of the user's hand or wrist is outside of the current field of view provided via the display generation component; and the representation of the user's hand or wrist is made visible in the view of the three-dimensional environment in response to the virtual position that corresponds to the location of the user's hand or wrist being moved within the current field of view due to movement of the display generation component, the user's hand or wrist, the user's head, and/or the user as a whole.

FIGS. 7A-7I illustrate example techniques for providing gesture information about user inputs to targets of the user inputs based on whether a user is indicating readiness to interact or has initiated an interaction, in accordance with some embodiments.

FIG. 7A illustrates an example physical environment 7000 that includes a user 7002 interacting with a computer system 101. Computer system 101 is positioned in front of user 7002, such that user 7002's left hand 7020 and right hand 7022 are free to interact with computer system 101. Physical environment 7000 includes a physical object 7014, physical walls 7004 and 7006, and a physical floor 7008. As shown in the examples in FIGS. 7A-7M, display generation component 7100 of computer system 101 is a touchscreen positioned in front of user 7002. In some embodiments, the display generation component of computer system 101 is a head-mounted display worn on user 7002's head (e.g., what is shown in FIGS. 7A-7M as being visible via display generation component 7100 of computer system 101 corresponds to user 7002's field of view when wearing a head-mounted display 7100a, as shown in FIGS. 7C2-7C3). In some embodiments, the display generation component is a standalone display, a projector, or another type of display. In some embodiments, the computer system is in communication with one or more input devices, including cameras or other sensors and input devices that detect movement of the user's hand(s), movement of the user's body as whole, and/or movement of the user's head in the physical environment. In some embodiments, the one or more input devices detect the movement and the current postures, orientations, and positions of the user's hand(s), face, and/or body as a whole. In some embodiments, user inputs are detected via a touch-sensitive surface or touchscreen. In some embodiments, the one or more input devices include an eye tracking component that detects location and movement of the user's gaze. In some embodiments, the display generation component, and optionally, the one or more input devices and the computer system, are parts of a head-mounted device that moves and rotates with the user's head in the physical environment, and changes the viewpoint of the user in the three-dimensional environment provided via the display generation component. In some embodiments, the display generation component is a heads-up display that does not move or rotate with the user's head or the user's body as a whole, but, optionally, changes the viewpoint of the user in the three-dimensional environment in accordance with the movement of the user's head or body relative to the display generation component. In some embodiments, the display generation component (e.g., a touchscreen) is optionally moved and rotated by the user's hand relative to the physical environment or relative to the user's head, and changes the viewpoint of the user in the three-dimensional environment in accordance with the movement of the display generation component relative to the user's head or face or relative to the physical environment.

In some embodiments, the display generation component 7100 comprises a head mounted display (HMD) 7100a. For example, as illustrated in FIG. 7C2 (e.g., and FIGS. 7J1-7K1 and 7N-7X), the head mounted display 7100a includes one or more displays that display a representation of a portion of the three-dimensional environment 7000' that corresponds to the perspective of the user, while an HMD typically includes multiple displays including a display for a right eye and a separate display for a left eye that display slightly different images to generate user interfaces with stereoscopic depth, in the figures a single image is shown that corresponds to the image for a single eye and depth information is indicated with other annotations or description of the figures. In some embodiments, HMD 7100a includes one or more sensors (e.g., one or more interior- and/or exterior-facing image sensors 314), such as sensor 7101a, sensor 7101b and/or sensor 7101c for detecting a state of the user, including facial and/or eye tracking of the user (e.g., using one or more inward-facing sensors 7101a and/or 7101b) and/or tracking hand, torso, or other movements of the user (e.g., using one or more outward-facing sensors 7101c). In some embodiments, HMD 7100a includes one or more input devices that are optionally located on a housing of HMD 7100a, such as one or more buttons, trackpads, touchscreens, scroll wheels, digital crowns that are rotatable and depressible or other input devices. In some embodiments input elements are mechanical input elements, in some embodiments input elements are solid state input elements that respond to press inputs based on detected pressure or intensity. For example, in FIG. 7C2 (e.g., and FIGS. 7J1-7K1 and 7N-7X), HMD 7100a includes one or more of button 701, button 702 and digital crown 703 for providing inputs to HMD 7100a. It will be understood that additional and/or alternative input devices may be included in HMD 7100a.

FIG. 7C3 illustrates a top-down view of the user 7002 in the physical environment 7000. For example, the user 7002 is wearing HMD 7100a, such that the user's hand 7020 that is physically present within the physical environment 7000 behind the display of HMD 7100a, and optionally in front of the physical object 7026 (e.g., where virtual object 7104 is displayed on top of a surface of physical object 7026). In some embodiments, while the user's hand 7020 is within the field of view of the one or more sensors of HMD 7100a (e.g., within the field of view of the user), a representation of the user's hand 7020' is displayed in the user interface displayed on the display of HMD 7100a.

FIG. 7C2 (e.g., and FIGS. 7J1-7K1 and 7N-7X) illustrates an alternative display generation component of the computer system than the display illustrated in FIGS. 7A-7C1, 7D-7I and 7K2-7M. It will be understood that the processes, features and functions described herein with reference to the display generation component 7100 described in FIGS. 7A-7C1, 7D-7I and 7K2-7M are also applicable to HMD 7100a, illustrated in FIGS. 7C2, 7J1-7K1, and 7N-7X.

In some embodiments, the computer system is configured to process inputs such as the inputs described herein with reference to FIGS. 7A-7X as simulated touch inputs. For example, for inputs described herein with reference to FIGS. 7A-7X that are detected as air gestures (e.g., involving detecting the location and/or movement of the user's gaze and/or hand) rather than as touch inputs, information about the air gesture inputs is optionally provided using a touch input processing framework, such as by describing the air gesture inputs using input events and data structures for touch inputs. Using a system-provided framework, such as an application programming interface (API), that translates other types of user inputs, such as air gestures, into touch inputs allows applications that were designed for touch interaction to be able to receive and process the other types of user inputs, without requiring the applications to be redesigned and redeployed.

When using touch-based inputs via a touch-sensitive surface to control software running on a computer system, touch inputs have both temporal and spatial aspects. The temporal aspects include the phase of a touch input, which indicates when a touch has just begun, whether it is moving or stationary, and when it ends (e.g., when the finger providing the touch input is lifted away from the touch-sensitive surface). The spatial aspects of a touch input include the location in the user interface and/or the set of one or more user interface regions or user interface windows in which the touch input occurs. In an example touch input processing framework, touch inputs that are detected as one or more touch input signals via a touch-sensitive surface are represented by one or more touch events that describe the temporal and spatial aspects of the touch inputs. For example, a respective touch input via a touch-sensitive surface is optionally represented by a sequence of touch events, and in some embodiments multiple concurrent touch inputs via the touch-sensitive surface are represented by a sequence of touch events (e.g., where each touch event describes corresponding portions of multiple concurrent touch inputs) or by respective sequences of touch events (e.g., where each touch event describes a distinct portion of a distinct touch input). A respective touch event thus describes a respective portion of a current or recent touch input, or of multiple concurrent touch inputs (in which case information about multiple concurrent touch inputs is optionally arranged into one or more lists). Example information in a respective touch event that describes a respective touch input on or near a touch-sensitive surface includes the following, or a subset or superset thereof:

- a touch identifier identifying the touch input (e.g., in some embodiments the touch identifier for a touch input is the same for all touch events that are associated with the same touch input);
- a time stamp for the touch event (e.g., a time stamp of the corresponding portion of the touch input);
- a location of the touch input relative to the touch-sensitive surface (e.g., using two-dimensional coordinates or in some cases three-dimensional coordinates, where a third coordinate represents a distance relative to the touch-sensitive surface and is optionally used to describe how far a hover input is above the touch-sensitive surface);
- a target of the touch input (e.g., identifying one or more user interface regions and/or user interface windows in which the touch input occurs or to which the touch input is directed);
- a duration of the touch input (e.g., since initial detection of the touch input with this touch event's touch identifier);

a direction and/or speed of movement of the touch input; and/or a phase value that indicates a current phase of the touch input. The following are examples of phase values:

hover begin (e.g., indicating a beginning of an input proximate to but not in contact with the touch-sensitive surface);

hover stationary (e.g., indicating that an already-detected hover input is ongoing, without the input coming into contact with the touch-sensitive surface, and without a change in proximity or location);

hover changed (e.g., indicating an update to proximity or location of an already-detected hover input, without the input coming into contact with the touch-sensitive surface);

hover end (e.g., indicating that a touch input is no longer detected proximate to nor in contact with the touch-sensitive surface, such as when the hover input has moved out of detection range of the touch-sensitive surface);

touch begin (e.g., indicating an initial contact with a touch-sensitive surface, such as by a touch input that was previously in a hover phase coming into contact with the touch-sensitive surface);

touch stationary (e.g., indicating that an already-detected contact is ongoing and has not moved along the touch-sensitive surface);

touch changed (e.g., indicating an update to the location of an already-detected contact with the touch-sensitive surface);

touch end (e.g., indicating that a contact with the touch-sensitive surface has ceased to be detected on the touch-sensitive surface, such as by liftoff of the contact from the touch-sensitive surface as part of ending a touch gesture); and/or touch cancel (e.g., indicating that a touch input has been determined to be an accidental touch or has been otherwise identified as a touch that should be ignored, and that an application performing an operation based on the touch input should cancel the operation, such as by reverting to a state before the touch input was detected).

In some embodiments, inputs such as the inputs described herein with reference to FIGS. 7A-7X are processed using one or more gesture recognizers that are configured to monitor the progression of the inputs and determine whether an input matches the definition of a respective gesture that the computer system is configured to recognize. In some embodiments, a gesture recognizer transitions between one or more states from a plurality of states including "possible," "active," "ended," "canceled," "failed," and/or others based on gesture information that is received (e.g., as one or more touch events) or otherwise obtained about a respective input. For example, a selection input, such as a tap gesture, causes a tap gesture recognizer to transition from the "possible" state to the "ended" state (e.g., when performance of a tap gesture, such as by performance of an air pinch or air tap gesture, has been recognized). In another example, a scrolling input causes a scroll gesture recognizer to transition from the "possible" state to the "active" state (during the scrolling, such as while an air pinch is being moved laterally while the fingers performing the air pinch are kept in contact, or while an air tap is being moved laterally while the finger performing the air tap is kept down) to the "ended" state (when the scrolling input has ended, such as when the air pinch is released by separating the fingers or when the air tap is released by lifting the finger) (e.g., the "active" and "ended" both indicate that a gesture has been recognized). In some embodiments, a gesture recognizer remains in the "possible" state during hover phase events (e.g., while a user is indicating readiness to interact yet has not performed a part of an interaction input that would determine whether the input can be recognized as a particular gesture or a part thereof or whether the input cannot be recognized as the particular gesture). In some embodiments, a gesture recognizer transitions to the "canceled" state in response to a "hover cancel" or "touch cancel" event. In some embodiments, a gesture recognizer that is configured to recognize a particular gesture transitions to the "failed" state in response to certain input events that make it impossible for the input to be recognized as the particular gesture (e.g., input movement causes a long press gesture recognizer to fail; an input that has continued for more than a threshold amount of time causes a tap gesture recognizer to fail whereas an input that ends too soon causes a long press gesture recognizer to fail; an input that ends without movement causes a scroll gesture recognizer to fail). In some embodiments, the gesture recognizers are part of a system-provided framework, such as an application programming interface (API), that handles input recognition, optionally in addition to translating certain types of user inputs, such as air gestures, into other types of inputs, such as touch inputs.

Figure 7B:
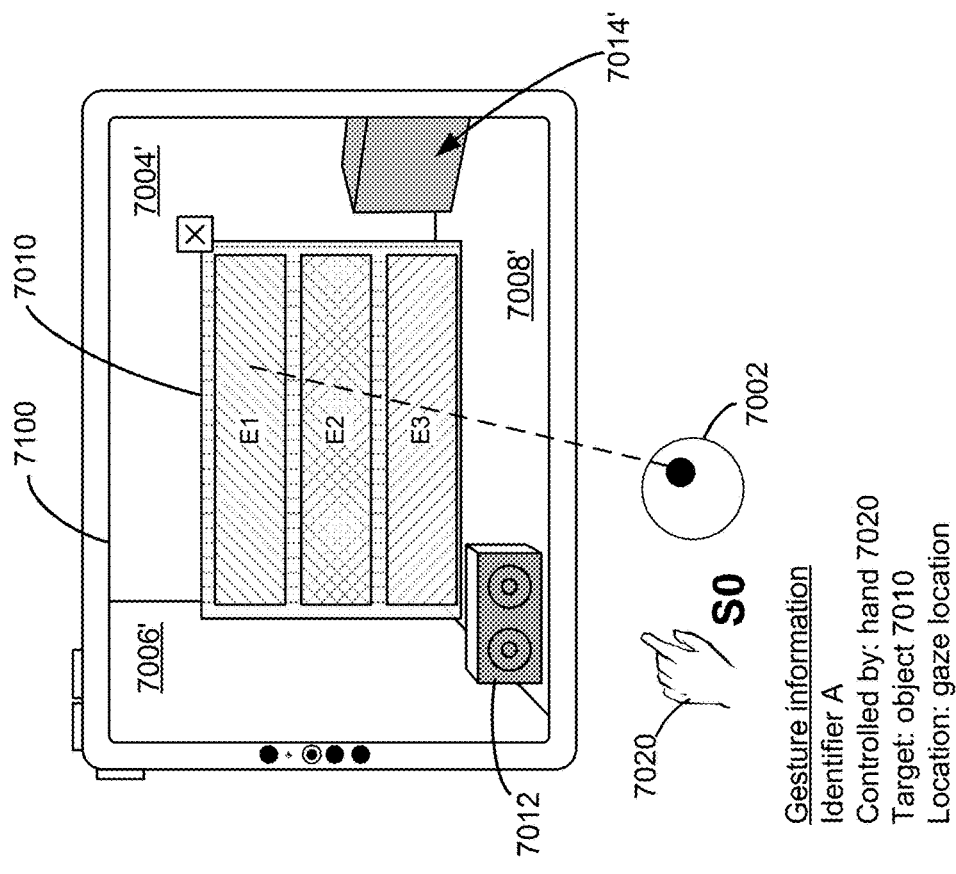
Figure 7B:
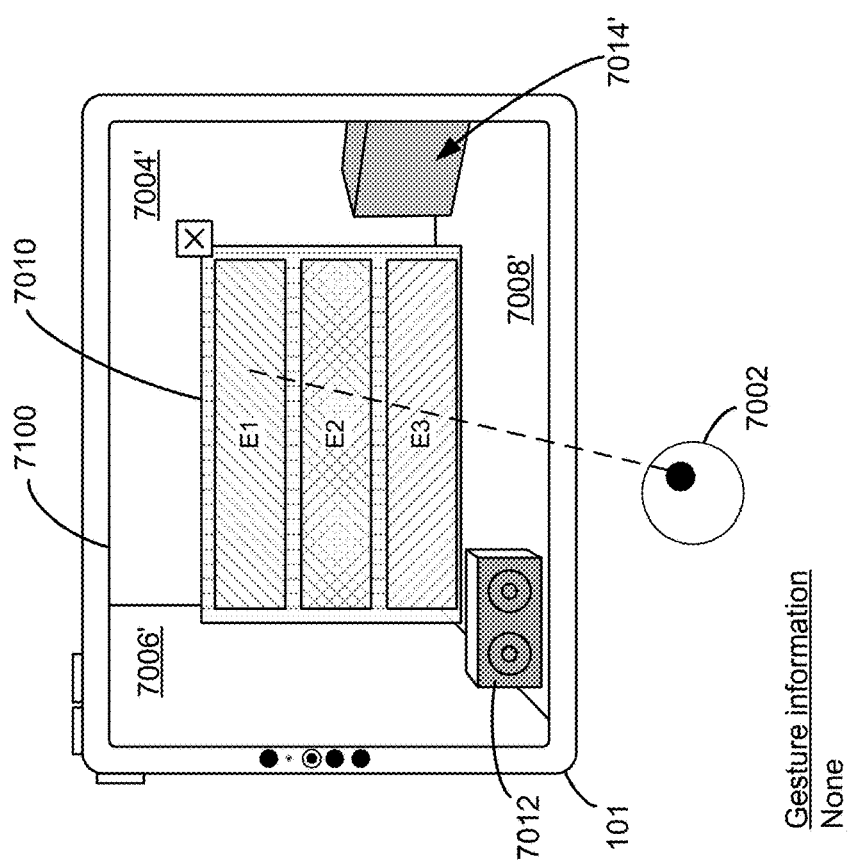

FIG. 7B illustrates a view of a three-dimensional environment that is visible to user 7002 via display generation component 7100 of computer system 101. The three-dimensional environment of FIG. 7B optionally includes representations of objects in a physical environment such as physical environment 7000 (e.g., as captured by one or more cameras of computer system 101). For example, in FIG. 7B, the three-dimensional environment includes representation 7014' of physical object 7014, representations 7004' and 7006' of physical walls 7004 and 7006, respectively, and representation 7008' of physical floor 7008. In addition, the three-dimensional environment includes one or more computer-generated objects, also called virtual objects, such as speaker 7012 (e.g., which is not a representation of a physical speaker in physical environment 7000).

FIG. 7B also shows application user interface 7010 displayed in the three-dimensional environment. In some embodiments, application user interface 7010 corresponds to a user interface of a software application executing on computer system 101 (e.g., an email application, a web browser, a messaging application, a maps application, or other software application). Application user interface 7010 includes one or more user interface elements, such as E1, E2, and E3 in the FIG. 7B example.

FIG. 7B shows a user input being provided to application user interface 7010, the user input involving user 7002 directing attention to (e.g., gazing at) application user interface 7010, and in particular element E1 of application user interface 7010. However, gesture information about the user input is not delivered to application user interface 7010 (e.g., to the software application) in FIG. 7B, because user 7002 directing attention to application user interface 7010 is insufficient to indicate user 7002's readiness to interact with application user interface 7010. Rather, in order for gesture information about the user input to be delivered to the software application of application user interface 7010, user 7002's hand must be in a particular state (e.g., a ready state) in addition to user 7002's attention being directed to application user interface 7010, as shown in FIG. 7C (e.g., FIGS. 7C1-7C3) (e.g., where a user interface analogous to the user interface described in FIG. 7C1 is shown on HMD 7100a in FIG. 7C2). In some embodiments, however, user 7002 directing attention to application user interface 7010 is sufficient to indicate user 7002's readiness to interact with application user interface 7010, and in some such embodiments, gesture information about the user input of FIG. 7B is provided to the software application of application user interface 7010.

FIG. 7C (e.g., FIGS. 7C1-7C3) show a user input being provided to application user interface 7010, the user input involving user 7002 directing attention to application user interface 7010 and user 7002's left hand 7020 held in a first state "S0" (e.g., a ready state hand configuration). In some embodiments, state "S0" corresponds to a static hand configuration. In some embodiments, state "S0" corresponds to the performance of a predefined air gesture. In some embodiments, the user input of FIG. 7C (e.g., FIGS. 7C1-7C3) indicates user 7002's readiness to interact with application user interface 7010, and in particular with element E1. In some embodiments, the appearance of element E1 is changed to indicate that element E1 has input focus (e.g., by highlighting element E1; changing color, opacity, blurring, amount of shadow, and/or other visual property of element E1; displaying a selection outline around element E1; and/or creating a three-dimensional visual effect for element E1, such as of element E1 moving forward or backward, changing in thickness, and/or by changing a degree of separation between two or more layers of element E1). Accordingly, gesture information about the user input is delivered to the software application of application user interface 7010. In some embodiments, to simulate a touch input, the gesture information about the user input of FIG. 7C (e.g., FIGS. 7C1-7C3) is provided as a touch event. For example, the gesture information (e.g., touch event) includes an input identifier "A" that identifies which input the gesture information describes (e.g., the input corresponding to hand 7020). The gesture information (e.g., touch event) optionally identifies and/or is delivered to the target of the user input (e.g., application user interface 7010, or more specifically element E1), which is determined based on a current location of the user input, which in FIG. 7C (e.g., FIGS. 7C1-7C3) is determined based on the location of user 7002's gaze. The gesture information (e.g., touch event) optionally includes a location value that is the location of user 7002's gaze in FIG. 7C (e.g., FIGS. 7C1 and FIG. 7C2) (e.g., the location in element E1) and/or the phase value "hover begin."

In some embodiments, if user 7002 then continues gazing at element E1 and maintains hand 7020 in state "S0," another set of gesture information about the user input is delivered to the software application of application user interface 7010, optionally as a touch event with the phase value "hover stationary."

Figure 7E:
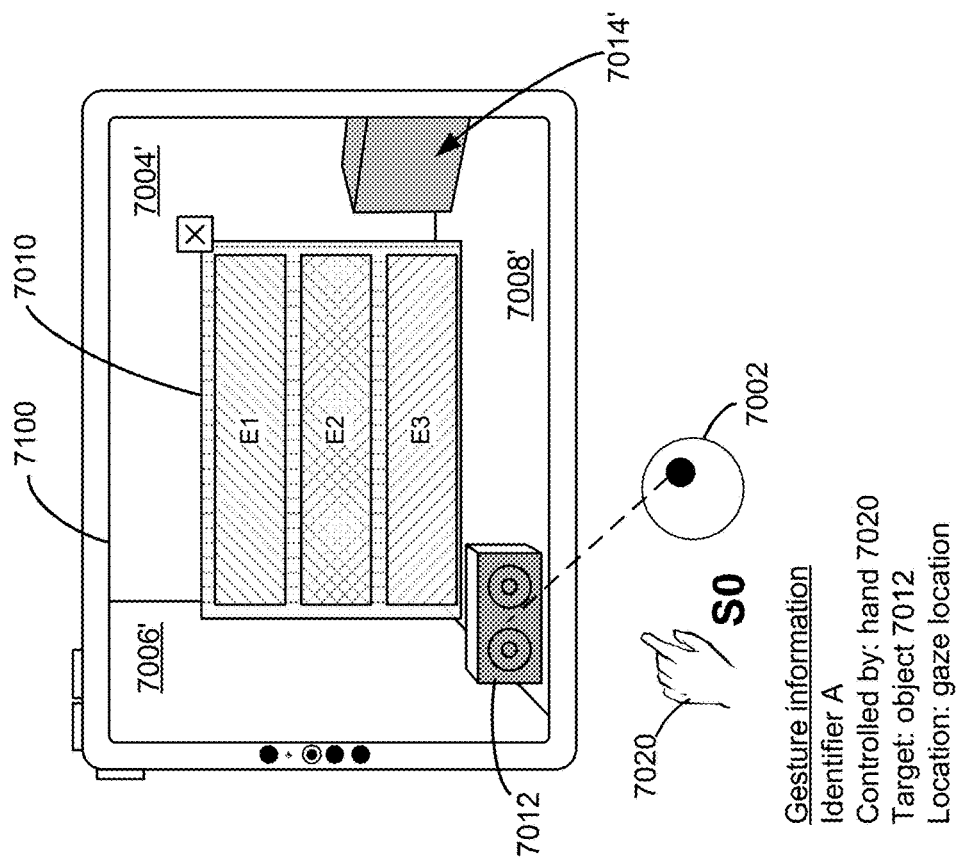
Figure 7D:
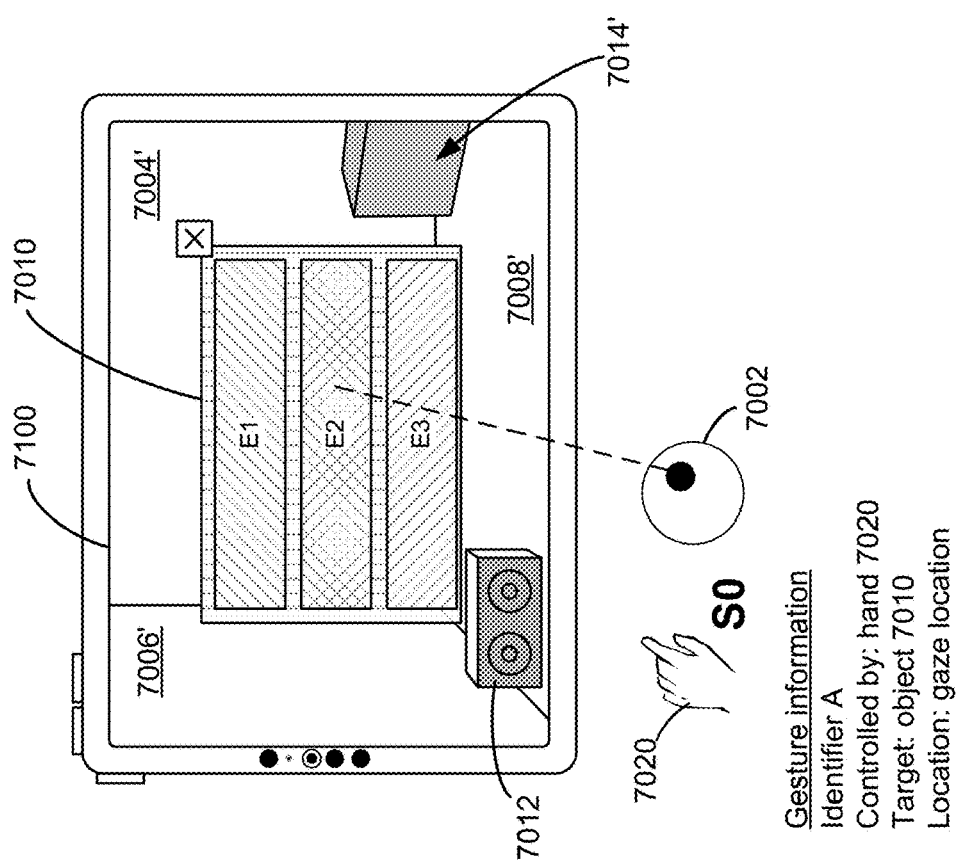
Figure 7G:
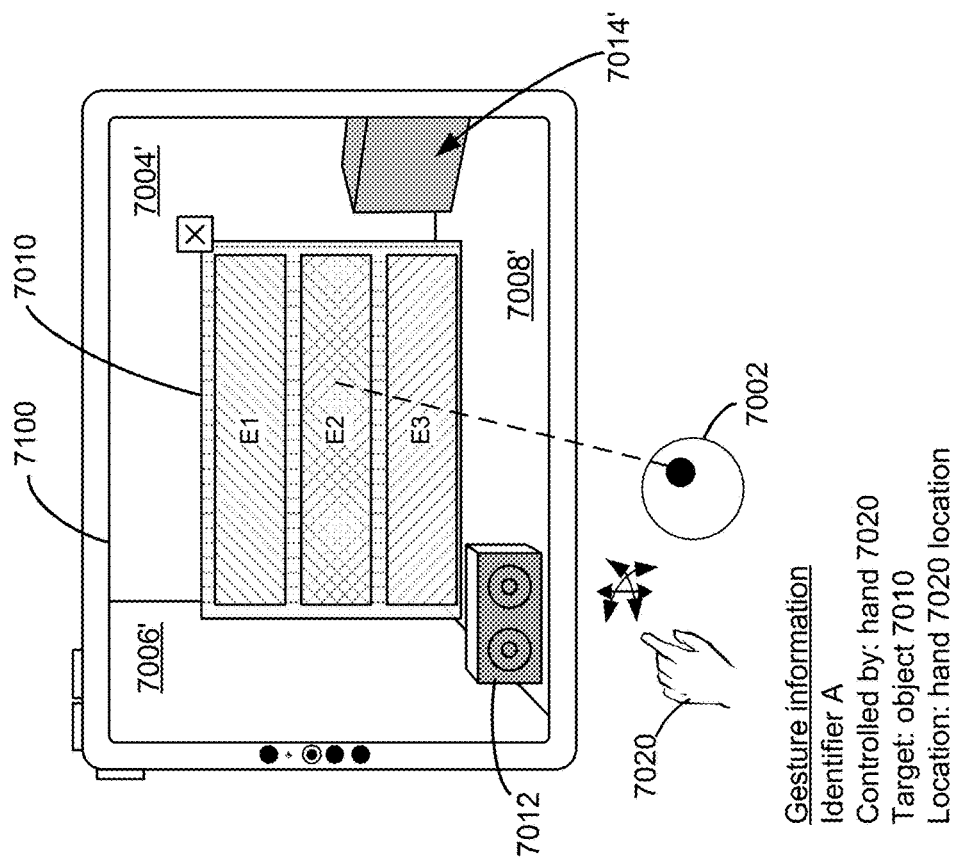

FIG. 7D shows user 7002 directing attention to element E2 of application user interface 7010 instead of to element E1, while maintaining hand 7020 in state "S0." In some embodiments, the appearance of element E2 is changed to indicate that element E2 has input focus (e.g., in one or more of the ways described herein for element E1 of application user interface 7010). Accordingly, gesture information about the user input is delivered (e.g., as a touch event) to the software application of application user interface 7010. For example, the gesture information of FIG. 7D includes the same input identifier "A" that identifies which input the gesture information describes (e.g., the input corresponding to hand 7020), and the gesture information optionally identifies and/or is delivered to the target of the user input (e.g., application user interface 7010, or more specifically element E2), which is determined based on a current location of the user input, which in FIG. 7D is determined based on the location of user 7002's gaze. The gesture information (e.g., touch event) optionally includes a location value that is the location of user 7002's gaze in FIG. 7D (e.g., the location in element E2) and/or the phase value "hover changed" (e.g., indicating that the hover touch input has moved to a different location). As described in more detail herein with reference to FIG. 7L, in some embodiments, the location of input focus is the location to which user 7002's gaze is directed (e.g., the location of input focus in FIG. 7C is the location in element E1 to which user 7002's gaze is directed, and the location of input focus in FIG. 7D is the location in element E2 to which user 7002's gaze is directed), and in some embodiments the amount by which the location of input focus is moved in the three-dimensional environment is unaccelerated relative to the actual amount of movement of user 7002's gaze (e.g., the amount by which the location of input focus is moved from FIG. 7C to FIG. 7D is the amount by which user 7002's gaze has moved from FIG. 7C to FIG. 7D, and similarly for the amount of movement of the location of input focus from FIG. 7D to FIG. 7E based on the movement of user 7002's gaze from FIG. 7D to FIG. 7E, described herein). In some embodiments, if user 7002 then continues gazing at element E2 and maintains hand 7020 in state "S0," another set of gesture information about the user input is delivered to the software application of application user interface 7010, optionally as another touch event with the phase value "hover stationary."

FIG. 7E shows user 7002 directing attention to speaker 7012 instead of to an element of application user interface 7010, while maintaining hand 7020 in state "S0." In some embodiments, the appearance of speaker 7012 is changed to indicate that speaker 7012 has input focus (e.g., in one or more of the ways described herein for element E1 of application user interface 7010). Accordingly, gesture information about the user input is delivered (e.g., as a touch event) to a software application associated with speaker 7012 (e.g., a media playback application represented by speaker 7012) instead of to the software application of application user interface 7010. The gesture information of FIG. 7E describes the same input (e.g., the input corresponding to hand 7020) as in FIGS. 7C-7D and thus includes the same input identifier "A." Moreover, as in FIGS. 7C-7D, the target of the user input in FIG. 7E is determined based on the location of user 7002's gaze. However, because user 7002's gaze in FIG. 7E is directed to a different target than in FIGS. 7C-7D, the gesture information of FIG. 7E would identify and/or be delivered to the different target (e.g., speaker 7012). The gesture information (e.g., touch event) optionally includes a location value that is the location of user 7002's gaze in FIG. 7E (e.g., the location on speaker 7012) and/or the phase value "hover changed" (e.g., indicating that the hover touch input has moved to a different location). In some embodiments, if user 7002 then continues gazing at speaker 7012 and maintains hand 7020 in state "S0," another set of gesture information about the user input is delivered to the software application of speaker 7012, optionally as another touch event with the phase value "hover stationary."

Figure 7F:
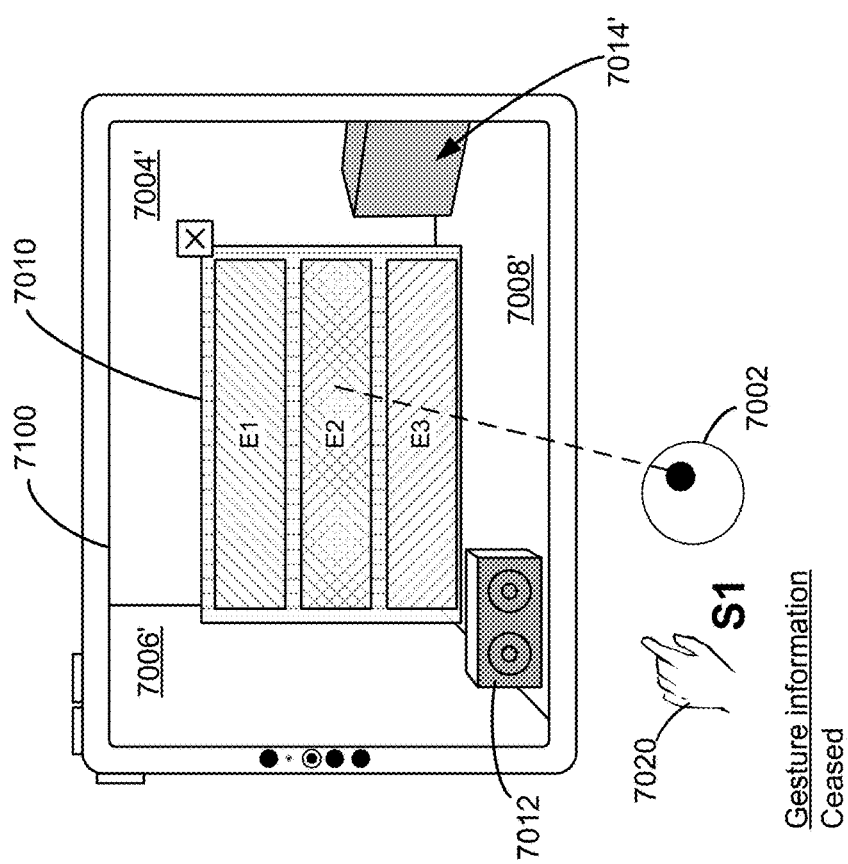
Figure 7I:
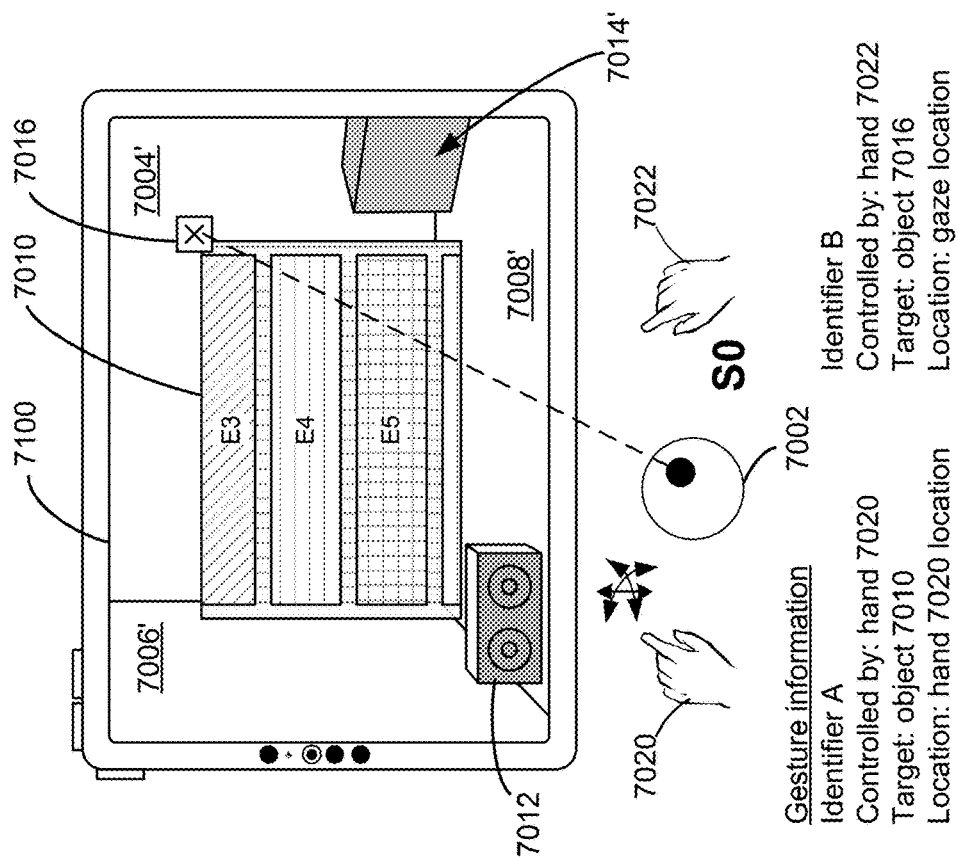

FIG. 7F shows user 7002 directing attention to element E2 of application user interface 7010. In addition, user 7002's hand 7020 in FIG. 7F is no longer in state "S0," and instead is in a second state "S1" (e.g., a hand configuration other than a ready state) (e.g., FIG. 7F represents a transition from FIG. 7D in which user 7002 continues to direct attention to element E2 of application user interface 7010 and has transitioned hand 7020 from of state "S0" to state "S1"). In some embodiments, state "S1" represents a state in which hand 7020 is detected by computer system 101 as being in a different hand configuration from the hand configuration of state "S0." In some embodiments, state "S1" represents a state in which hand 7020 is no longer detected by computer system 101. Because user 7002 is directing attention to application user interface 7010 without hand 7020 being in state "S0," gesture information about the user input corresponding to hand 7020 ceases to be delivered. For example, gesture information about the user input corresponding to hand 7020 is not delivered to application user interface 7010, even though user 7002 is directing attention to application user interface 7010. Optionally, the gesture information about the user input corresponding to hand 7020 ceases to be delivered after gesture information, optionally in the form of a touch event with the phase value "hover end" and the input identifier "A," is delivered to the software application of application user interface 7010 to indicate the end of the user input corresponding to hand 7020 indicating user 7002's readiness to interact.

FIG. 7G shows user 7002 directing attention to element E2 of application user interface 7010. In addition, user 7002's hand 7020 in FIG. 7G has initiated an interaction input, as indicated by the arrows next to hand 7020 in FIG. 7G (e.g., FIG. 7G represents a transition from FIG. 7D in which user 7002 continues to direct attention to element E2 and has transitioned hand 7020 out of state "S0"). In some embodiments, user 7002 initiates an interaction input by transitioning hand 7020 from a state "S0" (e.g., a ready state) to a predefined interaction state (e.g., an interaction hand configuration) and/or by performing at least a portion of a predefined interaction gesture (e.g., an air pinch or air tap gesture). Accordingly, gesture information about the interaction input is delivered (e.g., as a touch event) to the software application of application user interface 7010. In some embodiments, the interaction input of FIG. 7G is part of (e.g., a continuation of) the user input that indicated user 7002's readiness to interact with application user interface 7010 in FIG. 7D. For example, the gesture information includes the same input identifier "A" that identifies which input the gesture information describes (e.g., the input controlled by hand 7020). In addition, the gesture information optionally identifies and/or is delivered to the target of the user input (e.g., application user interface 7010, or more specifically element E2), which is determined based on a current location of the user input. Although the location of the user input is initially determined based on the location of user 7002's gaze while hand 7020 is in state "S0" (as in FIG. 7D), the location of the user input changes to being determined based on the location of user 7002's hand 7020 in response to initiation of an interaction input, as indicated in FIG. 7G. The gesture information (e.g., touch event) optionally includes a location value that corresponds to the location of user 7002's hand in FIG. 7G (e.g., the location in element E2) and/or the phase value "touch begin" (e.g., corresponding to a touch input that was hovering over a touch-sensitive surface contacting the touch-sensitive surface). Unlike for gaze location, the location value of the touch event of FIG. 7G is not necessarily the location of hand 7020 in FIG. 7G, and rather is optionally determined based on the location to which user 7002's gaze was directed (e.g., the location in element E2) when hand 7020 initiated the interaction input. In some embodiments, the gesture information includes an input event (e.g., a touch event, which is optionally the same or different from the touch event for hand 7020 that includes the "touch begin" phase value) indicating that computer system 101 is transitioning from detecting the input of hand 7020 based on the location of user 7002's gaze to detecting the input of hand 7020 based on the location and/or movement of hand 7020.

In some embodiments, if user 7002 then maintains hand 7020 in state "S0" at the same position, another set of gesture information about the user input is delivered to the software application of application user interface 7010, optionally as a touch event with the phase value "touch stationary."

Figure 7H:
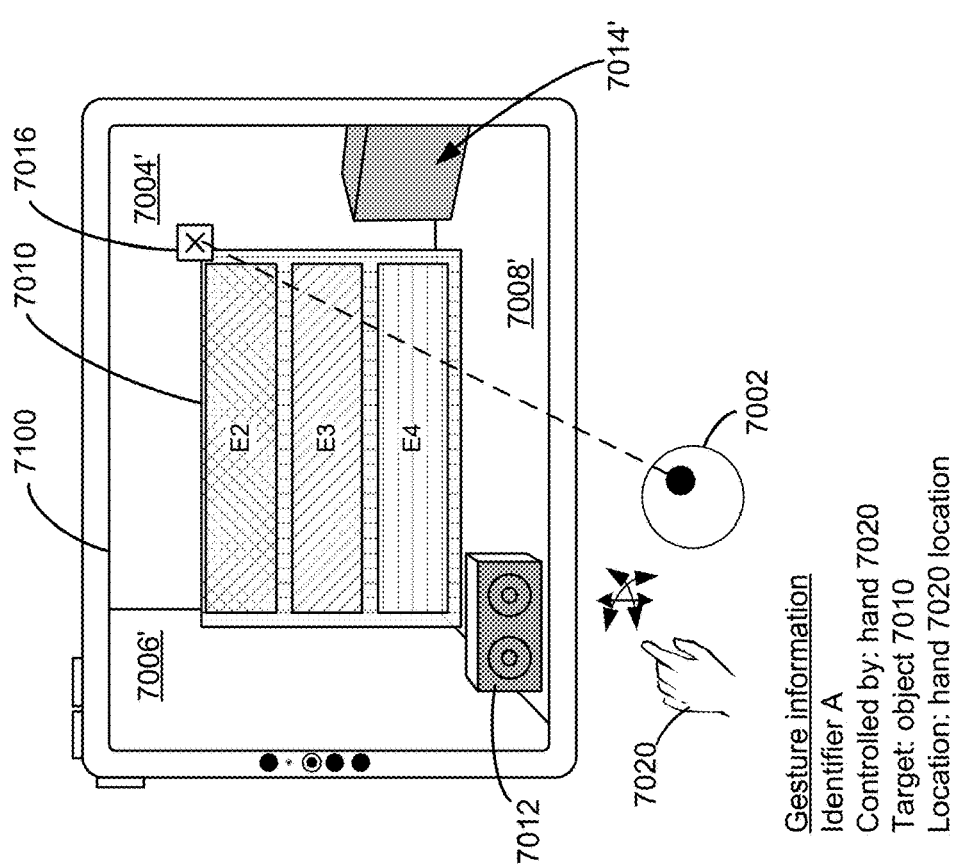
Figures 7L, 7M:
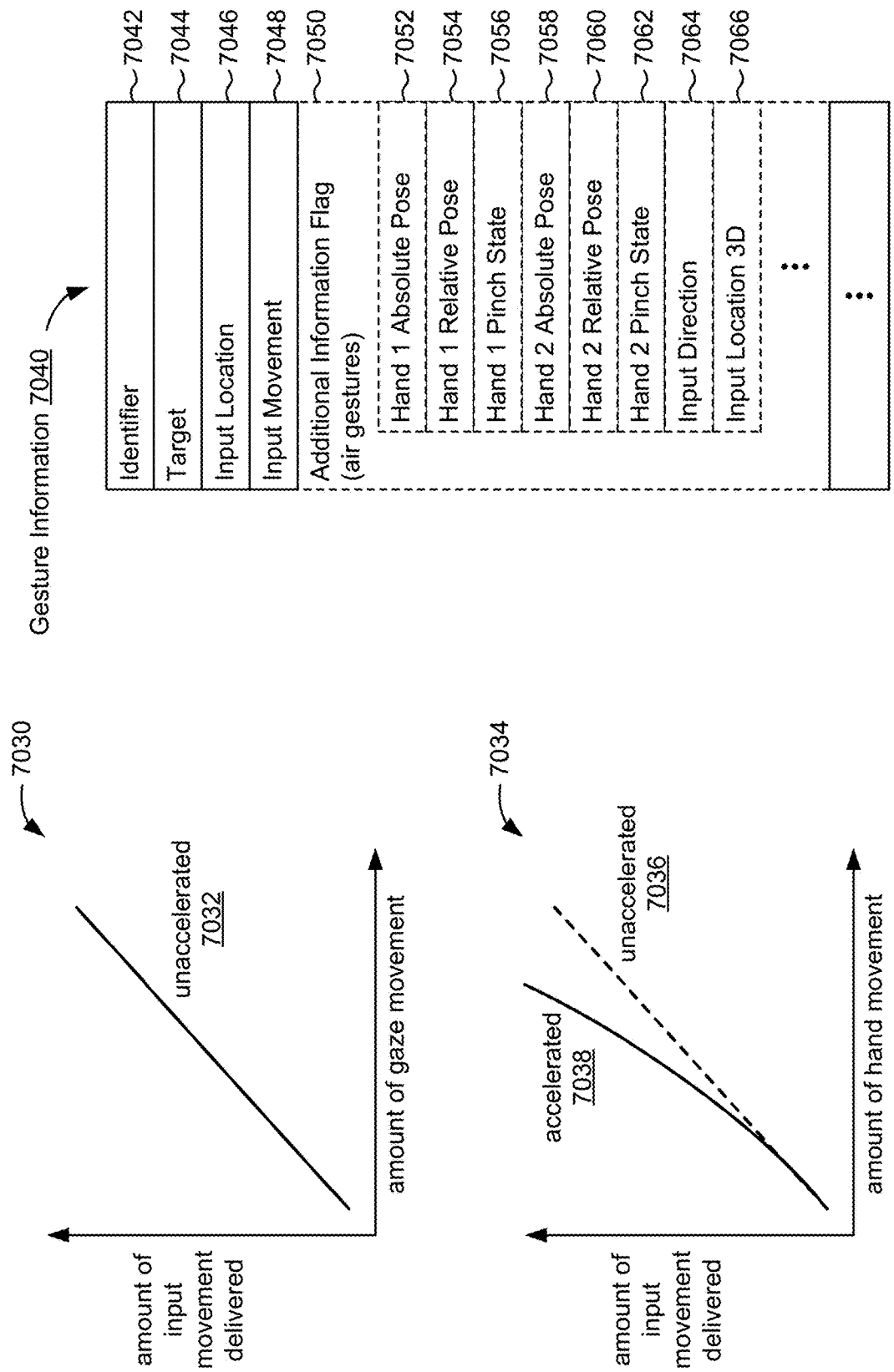
FIG. 7L illustrates example relationships between the amount of movement of an input performed by a user and the amount of input movement included in information about the input that is delivered to respective software associated with a target of the input, in accordance with some embodiments.
FIG. 7M illustrates example gesture information that describes a user input, in accordance with some embodiments.
Figure 7O:
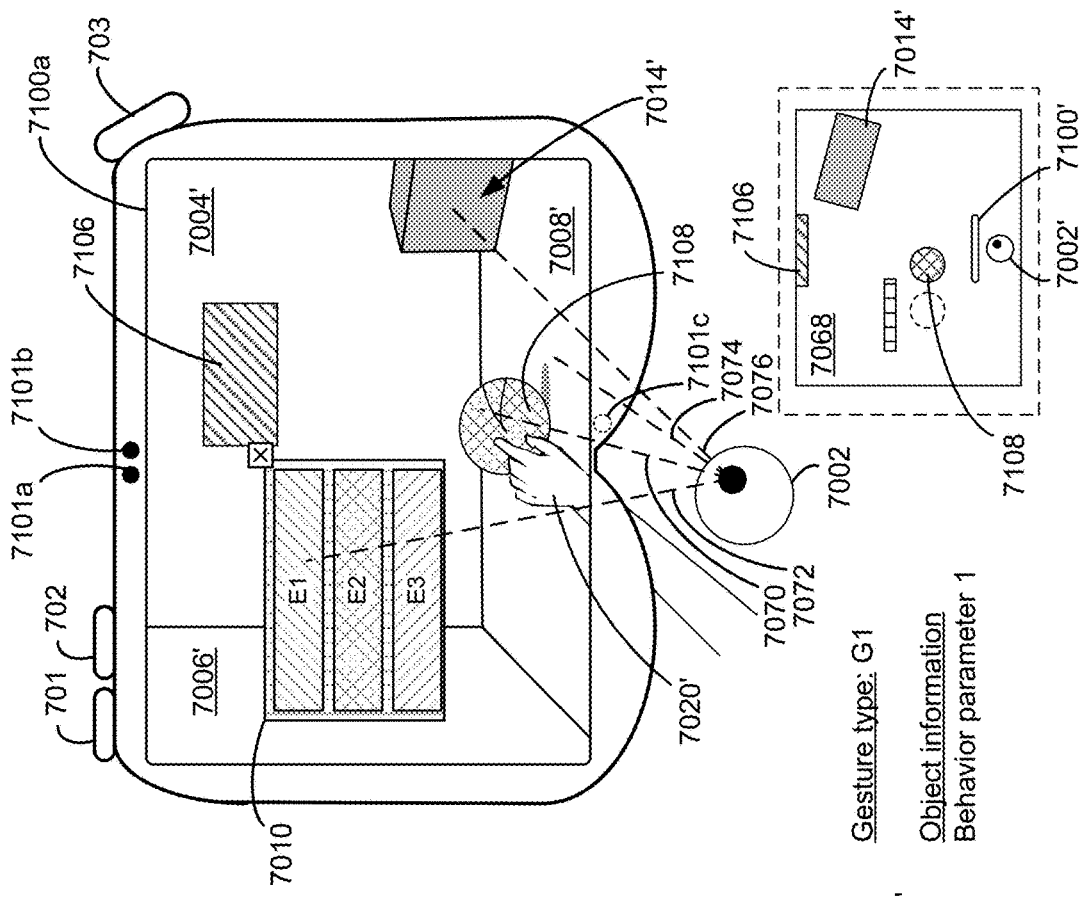

FIG. 7H shows user 7002 directing attention to close button 7016 (which is activatable to dismiss application user interface 7010), while user 7002 continues the interaction input of FIG. 7G by moving hand 7020 upward relative to the position of hand 7020 in FIG. 7G (e.g., FIG. 7H represents a transition from FIG. 7G in which user 7002 has redirected their attention to close button 7016 while continuing the interaction input using hand 7020). In some embodiments, hand 7020 in FIG. 7H continues the interaction input of FIG. 7G in part by being maintained in the predefined interaction state and/or by not having completed the predefined interaction gesture. Accordingly, in FIG. 7H, gesture information about the ongoing interaction input is delivered (e.g., as a touch event) with the same input identifier "A" that identifies which input the gesture information describes (e.g., the input controlled by hand 7020). Because the location of the interaction input is based on the location of hand 7020, FIG. 7H indicates that the gesture information about the interaction input optionally identifies and/or is delivered to a target that corresponds to the current location of hand 7020 (e.g., application user interface 7010), rather than to a target that corresponds to the current location of user 7002's gaze (e.g., close button 7016). In addition, the gesture information (e.g., touch event) includes information about the upward movement of hand 7020. The gesture information (e.g., touch event) optionally includes a location value that corresponds to the location of user 7002's hand in FIG. 7H (e.g., rather than to the location of user 7002's gaze in FIG. 7H) and/or the phase value "touch changed" (e.g., to indicate input movement corresponding to movement of a contact across a touch-sensitive surface). In response, application user interface 7010 is scrolled upward (e.g., element E1 is scrolled out of view, elements E2 and E3 are shifted upward, and element E4 is scrolled into view at the bottom of application user interface 7010) by an amount corresponding to the amount of movement of hand 7020 between FIG. 7G and FIG. 7H (e.g., and not by an amount corresponding to the amount of movement of user 7002's gaze as user 7002's gaze shifts from element E2 to close button 7016). As described in more detail herein with reference to FIG. 7L, in some embodiments the amount by which application user interface 7010 is scrolled is accelerated relative to the actual amount of movement of hand 7020. Accordingly, the difference (e.g., distance) between the location value of the touch event of FIG. 7H and the location value of the touch event of FIG. 7G is in some embodiments greater than the distance between the location of hand 7020 in FIG. 7H and the location of hand 7020 in FIG. 7G. In addition, unlike for gaze movement, the location value of the touch event of FIG. 7H is not necessarily the location of hand 7020 in FIG. 7H, and rather is optionally determined relative to the location of hand 7020 in FIG. 7G (e.g., when hand 7020 initiated the ongoing interaction input).

FIG. 7I shows that user 7002 has brought right hand 7022 into state "S0" (e.g., the ready state) while continuing to direct attention to close button 7016 and while continuing the interaction input of FIGS. 7G-7H by moving hand 7020 further upward (e.g., FIG. 7I represents a transition from FIG. 7H). The combination of user 7002's attention being directed to close button 7016 and hand 7022 being in state "S0" indicates user 7002's readiness to interact with close button 7016. Accordingly, gesture information about the user input corresponding to hand 7022 is delivered (e.g., as a touch event) to software associated with close button 7016 (e.g., the same software application of application user interface 7010, or an operating system of computer system 101, or other system software responsible for opening and closing applications). For example, the gesture information for the user input corresponding to hand 7022 includes an input identifier "B" that identifies which input the gesture information describes (e.g., the input corresponding to hand 7022), and the gesture information optionally identifies and/or is delivered to the target of the user input corresponding to hand 7022 (e.g., close button 7016, or software associated with close button 7016), which is determined based on a current location of the user input, which for the user input corresponding to hand 7022 in FIG. 7I is determined based on the location of user 7002's gaze. The gesture information (e.g., touch event) optionally includes a location value that corresponds to the location of user 7002's gaze in FIG. 7I (e.g., the location in close button 7016) and/or the phase value "hover begin."

In addition, gesture information about the ongoing interaction input corresponding to hand 7020 is also delivered (e.g., as part of the same touch event as for hand 7022 or as a separate touch event). The gesture information about the interaction input corresponding to hand 7020 includes the same input identifier "A" that identifies the input controlled by hand 7020, and optionally identifies and/or is delivered to the target that corresponds to the current location of hand 7020 (e.g., application user interface 7010), with information about the further upward movement of hand 7020 (e.g., the touch event optionally includes a location value that corresponds to the location of user 7002's hand in FIG. 7I and/or the phase value "touch changed"). In response, application user interface 7010 is scrolled further upward (e.g., element E2 is now also scrolled out of view, elements E3 and E4 are shifted upward, and elements E5 and E6 are scrolled, at least partially, into view at the bottom of application user interface 7010) by an amount corresponding to the amount of movement of hand 7020 between FIG. 7H and FIG. 7I (e.g., even though user 7002's gaze has not moved from close button 7016). As described in more detail herein with reference to FIG. 7L, in some embodiments the amount by which application user interface 7010 is further scrolled is accelerated relative to the actual amount of movement of hand 7020. Accordingly, the difference (e.g., distance) between the location value of the touch event with identifier "A" of FIG. 7I and the location value of the touch event of FIG. 7H (which has identifier "A") is in some embodiments greater than the distance between the location of hand 7020 in FIG. 7I and the location of hand 7020 in FIG. 7H. In addition, the location value of the touch event with identifier "A" of FIG. 7I is not necessarily the location of hand 7020 in FIG. 7I, and rather is optionally determined relative to the location of hand 7020 in FIG. 7H. From the scenario in FIG. 7I, user 7002 is enabled to continue the interaction input of hand 7020 (e.g., to further scroll application user interface 7010) by continuing to move hand 7020, or to end the interaction input of hand 7020 by releasing hand 7020 from the predefined interaction state and/or by completing the predefined interaction gesture (e.g., lifting or raising the finger to complete the air tap gesture, or separating the two or more fingers from each other to complete the air pinch gesture). In some embodiments, corresponding gesture information (e.g., a touch event) is delivered with the phase value "touch end" (e.g., indicating the end of the scrolling input).

In some embodiments, the gesture information (e.g., touch event(s)) for the user input corresponding to hand 7020 (e.g., the interaction input) is delivered in a first input event stream, whereas the gesture information (e.g., touch event(s)) for the user input corresponding to hand 7022 (e.g., indicating user 7002's readiness to interact) is delivered in a second input event stream. In some embodiments, the first input event stream and the second input event stream are delivered concurrently (e.g., a touch event for a portion of the user input corresponding to hand 7020 is delivered concurrently with the touch event for the corresponding (e.g., concurrent) portion of the user input corresponding to hand 7022).

In some embodiments, an input event stream continues while the input manipulator (e.g., a part of the user such as a hand, a finger, or a wrist; or a user-controlled physical device such as a wand, a remote, or a controller) corresponding to the input event stream continues to be detected, even if another input event stream is stopped in response to the input manipulator corresponding to the other input event stream ceases to be detected. For example, from the scenario in FIG. 7I, if hand 7020 ceases to be detected by computer system 101 (e.g., is moved out of view of one or more cameras of computer system 101), the first input event stream corresponding to hand 7020 ends (e.g., similar to ceasing to deliver gesture information about the user input corresponding to hand 7020 as described herein with reference to FIG. 7F, except for an interaction input instead of a readiness input, and optionally with a final touch event with the phase value "touch end" being delivered). In another example, from the scenario in FIG. 7I, if hand 7022 ceases to be detected by computer system 101 (e.g., is moved out of view of one or more cameras of computer system 101), the second input event stream corresponding to hand 7022 ends (e.g., analogous to ceasing to deliver gesture information about the user input corresponding to hand 7020 as described herein with reference to FIG. 7F, and optionally with a final touch event with the phase value "hover end" being delivered).

From the scenario in FIG. 7I, user 7002 is enabled to initiate an interaction input using hand 7022, in response to which gesture information about the interaction input corresponding to hand 7022 (e.g., a continuation of the user input indicating user 7002's readiness to interact with close button 7016 using hand 7022 in FIG. 7I) would be delivered (e.g., as one or more touch events) to the software associated with close button 7016 and would include the same input identifier "B" that identifies the input controlled by hand 7022. For example, from the scenario in FIG. 7I, an interaction input corresponding to a activation input (e.g., an air tap, air pinch and release, or other activation input) performed using hand 7022 would activate close button 7016 and dismiss application user interface 7010. The gesture information (e.g., touch event(s)) would optionally include a location value that corresponds to the location of user 7002's hand in FIG. 7I (e.g., instead of the location of user 7002's gaze). In some embodiments, the gesture information for the activation input performed using hand 7022 includes a first touch event with the phase value "touch begin" (e.g., indicating a first portion of the activation input, such as the lowering of a finger as part of an air tap gesture, or two or more fingers making contact with each other as part of an air pinch gesture) followed by a second touch event with the phase value "touch end" (e.g., indicating a second (e.g., final) portion of the activation input, such as the lifting or raising of the finger to complete the air tap gesture, or the separating of the two or more fingers from each other to complete the air pinch gesture). In some embodiments, the gesture information includes an input event (e.g., a touch event, which is optionally the same or different from the touch event for hand 7022 that includes the "touch begin" phase value) indicating that computer system 101 is transitioning from detecting the input of hand 7022 based on the location of user 7002's gaze to detecting the input of hand 7022 based on the location and/or movement of hand 7022.

FIG. 7J (e.g., FIGS. 7J1-7J2)-7K (e.g., FIGS. 7K1-7K2) (e.g., where a user interface analogous to the user interface described in FIG. 7J2 is shown on HMD 7100*a* in FIG. 7J1 and a user interface analogous to the user interface described in FIG. 7K2 is shown on HMD 7100*a* in FIG. 7K1) illustrate disambiguating between direct manipulation and indirect manipulation of objects in a three-dimensional environment.

FIG. 7J (e.g., FIGS. 7J1-7J2) illustrate interaction with a three-dimensional environment via indirect manipulation. In particular, FIG. 7J2 shows a view of a three-dimensional environment that is visible to user 7002 via display generation component 7100 (e.g., HMD 7100*a* in FIG. 7J1) of computer system 101. Similar to the three-dimensional environment described herein of FIG. 7B, the three-dimensional environment of FIG. 7J2 (e.g., and FIG. 7J1) includes representations of objects in a physical environment such as physical environment 7000 (e.g., as captured by one or more cameras of computer system 101). For example, in FIG. 7J (e.g., FIG. 7J1-7J2), the three-dimensional environment includes representation 7014' of physical object 7014, representations 7004' and 7006' of physical walls 7004 and 7006, respectively, and representation 7008' of physical floor 7008. In addition, the three-dimensional environment of FIG. 7J (e.g., FIGS. 7J1-7J2) includes one or more computer-generated objects, including wall hanging 7106 and ball 7108.

In FIGS. 7J, user 7002 is directing attention to (e.g., gazing at) wall hanging 7106, and user 7002's left hand 7020 is in state "S0." In some embodiments, as illustrated by the example of FIG. 7J (e.g., FIG. 7J1-7J2), user 7002 directing attention to wall hanging 7106 while holding a hand (e.g., hand 7020) in state "S0" indicates user 7002's readiness to interact with wall hanging 7106. In some embodiments, user 7002's readiness to interact with wall hanging 7106 corresponds to a request to interact with the three-dimensional environment via indirect manipulation, determined based on the following: in accordance with a determination that user 7002's hand 7020 is in a particular state, such as state "S0" (e.g., a ready state for indirect manipulation, such as a pre-pinch configuration); and/or in accordance with a determination that a distance $d_1$ between wall hanging 7106 and a location corresponding to user 7002 (e.g., a simulated position 7002' of user 7002 or a part of user 7002 such as hand 7020 in the three-dimensional environment, or a simulated position 7100' of display generation component 7100 in the three-dimensional environment), as indicated in top view 7018 of the three-dimensional environment in FIGS. 7J, is greater than a threshold distance Din. Accordingly, wall hanging 7106 is visually emphasized to indicate that wall hanging 7106 has focus for further interaction, as indicated by the border displayed around wall hanging 7106 in FIG. 7J (e.g., FIGS. 7J1-7J2). In addition, gesture information about the user input corresponding to hand 7020 is delivered to software associated with wall hanging 7106, in some embodiments in the form of a hover phase touch event (e.g., "hover begin" for a newly-initiated readiness input, "hover stationary" for an ongoing readiness input for which user 7002's gaze remains directed to wall hanging 7106, or "hover changed" for an ongoing readiness input for which user 7002's gaze has recently shifted to wall hanging 7106). For example, if wall hanging 7106 displays a selected image provided by a photo application, the gesture information is delivered to the photo application, and optionally causes performance of an operation associated with the photo application that is responsive to wall hanging 7106 having focus (e.g., initiating playback of a video, or a portion of the video, that the displayed image represents; or displaying a different image from the photo application instead, for example by progressing through a sequence of selected images).

In some embodiments, a target of the indirect manipulation corresponding to hand 7020 is selected based on the movement of user 7002's gaze (e.g., based on a current location of user 7002's gaze), optionally while user 7002's hand 7020 remains in or returns to state "S0." For example, from the scenario in FIGS. 7J, if user 7002's gaze was to move to ball 7108 (e.g., with hand 7020 in state "S0"), ball 7108 would be visually emphasized (e.g., as in FIG. 7K (e.g., FIGS. 7K1-7K2)) to indicate that the focus for further interaction has shifted to ball 7108.

In some embodiments, the target selected for indirect manipulation is independent of lateral movement of the user's hand. For example, from the scenario in FIG. 7J, whether or not user 7002 were to move hand 7020 left, right, up, down, forward, and/or backward, if user 7002's gaze remained directed to wall hanging 7106, wall hanging 7106 would retain focus (e.g., so long as hand 7020 is maintained in state "S0" indicating readiness to interact).

In some embodiments, user 7002 is enabled to transition from using indirect manipulation to using direct manipulation (e.g., before or after changing the target of the indirect manipulation by redirecting their gaze to a different object, such as to ball 7108, in the three-dimensional environment). For example, after user 7002's gaze moves from wall hanging 7106, as shown in FIGS. 7J, to ball 7108 (e.g., while hand 7020 is maintained in state "S0"), which changes the target of the indirect manipulation to ball 7108, user 7002 is enabled to perform an input that corresponds to a request for direct manipulation (e.g., by transitioning hand 7020 from state "S0" to a pre-tap configuration and, optionally, bringing hand 7020 near ball 7108). In response, computer system 101 transitions from the indirect manipulation to direct manipulation, with ball 7108 remaining as the target. Then, in response to user 7002 moving hand 7020 laterally, the location in the three-dimensional environment that has focus for the direct manipulation is moved based on the movement of hand 7020, thus changing, in some circumstances, the target of the direct manipulation from ball 7108 to another object in the three-dimensional environment.

In some embodiments, from the scenario in FIGS. 7J, user 7002 is enabled to initiate an interaction input using hand 7020 (e.g., performing an air pinch starting from the pre-pinch configuration, or other indirect manipulation activation input) and optionally causes performance of an operation responsive to the interaction input. For example, an interaction input to activate wall hanging 7106 causes performance of an operation associated with the photo application that is responsive to wall hanging 7106 being activated (e.g., displaying a user interface of the photo application, selecting wall hanging 7106 for manipulation within the three-dimensional environment, or other activation operation). Accordingly, in some embodiments, gesture information about the interaction input by hand 7020 is delivered to the software associated with wall hanging 7106, in some embodiments in the form of one or more touch phase touch events (e.g., "touch begin" for the interaction input when newly-initiated, "touch stationary" as the interaction input continues with user 7002's hand 7020 held still, or "touch changed" as the interaction input continues with user 7002 moving hand 7020 relative to the three-dimensional environment).

In some circumstances, the interaction input by hand 7020 includes movement of hand 7020 (e.g., after the interaction has been initiated and while the interaction input is ongoing, for example while hand 7020 is maintained in a pinch configuration). In some embodiments, during the interaction input, a current location of the interaction input is determined based on the location and/or movement of hand 7020 (e.g., rather than the location and/or movement of user 7002's gaze, as was the case for the indirect manipulation readiness input). For example, if a first (e.g., initial) portion of the interaction input selects wall hanging 7106 for manipulation and a second (e.g., subsequent) portion of the interaction input includes movement of hand 7020 and requests to move wall hanging 7106 in the environment, wall hanging 7106 is moved in the environment by an amount that is based on the amount of movement of hand 7020 (e.g., with or without acceleration, as described herein with reference to FIG. 7L). In some embodiments, the amount of acceleration applied to hand movement to produce the resulting amount of object manipulation for an indirect manipulation input (e.g., during an interaction portion of the input) is greater than the amount of acceleration (if any) applied to gaze movement to determine a current target of the indirect manipulation input (e.g., during a portion of the input that indicates readiness to interact, prior to initiating interaction).

FIG. 7K (e.g., FIGS. 7K1-7K2) illustrate interaction with the three-dimensional environment via direct manipulation. In FIGS. 7K, user 7002's hand 7020 is positioned at a location corresponding to ball 7108. In some embodiments, hand 7020 is positioned over or on a touch-sensitive surface at a location corresponding to a location at which ball 7108 is displayed (e.g., over or on ball 7108 displayed on a touchscreen). In some embodiments, hand 7020 is at a location in physical environment 7000 that corresponds to a simulated location in the three-dimensional environment at or near which ball 7108 is located (e.g., if ball 7108 were a physical ball in physical environment 7000, hand 7020 would be near or touching the physical ball). In some embodiments, hand 7020 being positioned at the location corresponding to ball 7108 indicates user 7002's readiness to interact with ball 7108. In some embodiments, user 7002's readiness to interact with ball 7108 corresponds to a request to interact with the three-dimensional environment via direct manipulation, determined based on the following: in accordance with a determination that a distance $d_2$ between ball 7108 and a location corresponding to user 7002 (e.g., a simulated position 7002' of user 7002 or a part of user 7002 such as hand 7020 in the three-dimensional environment, or a simulated position 7100' of display generation component 7100 in the three-dimensional environment), as indicated in top view 7018 in FIGS. 7K, is less than the threshold distance $D_{th}$; in accordance with a determination that hand 7020 is not in the particular state for requesting indirect manipulation (e.g., not in state "S0"); and/or in accordance with a determination that hand 7020 is in a particular state for requesting direct manipulation (e.g., a ready state for direct manipulation, such as a pre-tap configuration). Accordingly, ball 7108 is visually emphasized to indicate that ball 7108 has focus for further interaction, as indicated by the border displayed around ball 7108 in FIG. 7K (e.g., instead of around wall hanging 7106, as in FIG. 7J). In addition, gesture information about the user input corresponding to hand 7020 is delivered to software associated with ball 7108, in some embodiments in the form of a hover phase touch event (e.g., "hover begin" for a newly-initiated readiness input, "hover stationary" for an ongoing readiness input for which user 7002's hand 7020 continues to correspond to ball 7108, or "hover changed" for an ongoing readiness input for which user 7002 has recently moved hand 7020 to ball 7108), and optionally causes performance of an operation that is responsive to ball 7108 having focus (e.g., an operation defined by the software associated with ball 7108).

In some embodiments, a target of the direct manipulation corresponding to hand 7020 is selected based on a current location and/or recent movement of hand 7020, optionally while user 7002's hand 7020 remains in or returns to a state for requesting and/or indicating readiness to interact via direct manipulation (e.g., the pre-tap configuration). For example, from the scenario in FIGS. 7K, if user 7002 were to move hand 7020 toward wall hanging 7106 (e.g., with hand 7020 in the pre-tap configuration, and optionally after having moved closer to wall hanging 7106 so that wall hanging 7106 is within the threshold distance $D_{th}$ of hand 7020), wall hanging 7106 would be visually emphasized (e.g., as in FIGS. 7J) to indicate that the focus for further interaction has shifted to wall hanging 7106.

In some embodiments, the target selected for direct manipulation is independent of movement of the user's gaze. For example, from the scenario in FIGS. 7K, if user 7002 were to shift their gaze to another object in the three-dimensional environment besides ball 7108, without moving hand 7020 from its location as shown in FIGS. 7K, ball 7108 would retain focus (e.g., so long as hand 7020 is maintained in the state for indicating readiness to interact via direct manipulation).

In some embodiments, user 7002 is enabled to transition from using direct manipulation to using indirect manipulation (e.g., before or after changing the target of the direct manipulation by moving hand 7020 to a different object, such as to wall hanging 7106, in the three-dimensional environment). For example, after user 7002's hand 7020 has moved from the position shown in FIG. 7K to change the target of the direct manipulation from ball 7108 to wall hanging 7106, user 7002 is enabled to perform an input that corresponds to a request for indirect manipulation (e.g., by transitioning hand 7020 from a pre-tap configuration to state "S0"). In response, computer system 101 transitions from the direct manipulation to indirect manipulation, with wall hanging 7106 remaining as the target while user 7002's gaze stays directed to wall hanging 7106. Then, in response to user 7002's gaze moving away from wall hanging 7106 (e.g., while hand 7020 is maintained in state "S0"), the location in the three-dimensional environment that has focus for the indirect manipulation is moved based on the movement of user 7002's gaze, thus changing, in some circumstances, which object in the three-dimensional environment is the target of the indirect manipulation.

In some embodiments, from the scenario in FIGS. 7K, user 7002 is enabled to initiate an interaction input using hand 7020 (e.g., performing an air tap starting from the pre-tap configuration, or other direct manipulation activation input) and optionally causes performance of an operation responsive to the interaction input. For example, an interaction input to activate ball 7108 causes performance of an operation associated with the software associated with ball 7108 that is responsive to ball 7108 being activated (e.g., launching an associated application, selecting ball 7108 for manipulation within the three-dimensional environment, or other activation operation). Accordingly, in some embodiments, gesture information about the interaction input by hand 7020 is delivered to the software associated with ball 7108, in some embodiments in the form of one or more touch phase touch events (e.g., "touch begin" for the interaction input when newly-initiated, "touch stationary" as the interaction input continues with user 7002's hand 7020 held still, or "touch changed" as the interaction input continues with user 7002 moving hand 7020 relative to the three-dimensional environment).

In some circumstances, the interaction input by hand 7020 includes movement of hand 7020 (e.g., after the interaction input has been initiated and while the interaction input is ongoing, for example while hand 7020 is maintained in a tap configuration). In some embodiments, during the interaction input, a current location of the interaction input is determined based on the location and/or movement of hand 7020 (e.g., as was also the case for the direct manipulation readiness input). For example, if a first (e.g., initial) portion of the interaction input selects ball 7108 for manipulation and a second (e.g., subsequent) portion of the interaction input includes movement of hand 7020 and requests to move ball 7108 in the environment, ball 7108 is moved in the environment by an amount that is based on the amount of movement of hand 7020 (e.g., with or without acceleration, as described herein with reference to FIG. 7L). In some embodiments, the amount of acceleration applied to hand movement to produce the resulting amount of object manipulation for direct manipulation inputs is less than the amount of acceleration applied to hand movement to produce the resulting amount of object manipulation for indirect manipulation inputs. As explained herein, indirect manipulation is typically used to interact with objects that are further than a threshold distance from the user, and thus may benefit from additional acceleration to extend the user's reach, in effect; whereas less acceleration for direct manipulation would preferably yield a more realistic and more precise interaction experience.

FIG. 7L illustrates example relationships between the amount of movement of an input performed by a user and the amount of input movement included in information about the input that is delivered to respective software (e.g., a software application or system software) associated with a target of the input. Graph 7030 illustrates embodiments in which, for an input that includes a gaze input by user 7002, information delivered about the input indicates the same amount of movement of the gaze input as the actual amount of movement of user 7002's gaze relative to the three-dimensional environment, such that information about gaze movement is unaccelerated relative to actual gaze movement. Accordingly, curve 7032 (labeled "unaccelerated") in graph 7030 represents vertical y-axis values that are equal to their corresponding horizontal x-axis values (e.g., an identity function). For example, in FIGS. 7C-7D, user 7002 has shifted their attention from element E1 (as in FIG. 7C (e.g., FIGS. 7C1-7C3)) of application user interface 7010 to element E2 (as in FIG. 7D) while hand 7020 is maintained in state "S0"; accordingly, the gesture information that is delivered to the software application of application user interface 7010 is based on the location of user 7002's gaze. In some embodiments, the gesture information delivered for the scenario of FIG. 7D indicates an amount of gaze movement that is the amount by which user 7002's gaze moved from FIG. 7C to FIG. 7D (e.g., the difference, such as a linear distance or an angular distance, between the location of user 7002's gaze on element E1 and the location of user 7002's gaze on element E2).

Graph 7034 of FIG. 7L illustrates embodiments in which, for an input that includes movement of a hand of user 7002, information delivered about the input indicates at least the amount of hand movement than the actual amount of movement of user 7002's hand relative to the three-dimensional environment, such that information about hand movement is, at least in some circumstances, accelerated relative to actual hand movement. Accordingly, curve 7038 (labeled "accelerated") in graph 7034 represents vertical y-axis values that are greater than or equal to their corresponding horizontal x-axis values, further indicated by "accelerated" curve 7038 being at or above curve 7036 (labeled "unaccelerated"), which represents vertical y-axis values that are equal to their corresponding horizontal x-axis values (e.g., an identity function). In some embodiments, information delivered about hand movement is more accelerated for greater amounts of actual hand movement and less accelerated for lesser amounts of actual hand movement (e.g., "accelerated" curve 7038 diverges more from "unaccelerated" curve 7036 for greater amounts of actual hand movement (e.g., further right along the horizontal x-axis). In some embodiments, information about hand movement is unaccelerated for less than a threshold amount of actual hand movement (e.g., "accelerated" curve 7038 and "unaccelerated" curve 7036 are the same for amounts of actual hand movement that are less than a threshold amount of hand movement, towards the left along the horizontal x-axis). In some embodiments, instead of accelerated hand movement information being delivered, the information that is delivered about hand movement indicates the same amount of hand movement as the actual amount of hand movement, and the software that receives the information responds to the hand movement information in an accelerated manner (e.g., a target user interface element of the input is moved a greater distance in the user interface than the amount of movement indicated by the information about the input, optionally in accordance with a determination that the information about the input indicates hand movement). In some embodiments, if accelerated hand movement information is delivered to an application (e.g., as part of gesture information provided about an input), the application is enabled to request unaccelerated hand movement information.

For example, in FIGS. 7G-7H, application user interface 7010 is scrolled upward in response to user 7002 moving hand 7020 upward from a first location in the three-dimensional environment to a second location in the three-dimensional environment during the interaction input controlled by hand 7020. In some embodiments, the gesture information that is delivered to the software application of application user interface 7010 for the transition from FIG. 7G to 7H indicates a greater amount of hand movement than the amount by which hand 7020 moved (e.g., the difference between the first location of hand 7020 and the second location of hand 7020 in the three-dimensional environment). In some such embodiments, application user interface 7010 is scrolled by the amount of hand movement indicated by the delivered gesture information, such that the amount by which application user interface 7010 is scrolled is greater than the actual amount of movement of hand 7020. In some embodiments, the software application of application user interface 7010 is enabled to request information indicating the actual amount of movement of hand 7020.

Similarly, in FIGS. 7H-7I, application user interface 7010 is scrolled upward in response to user 7002 moving hand 7020 upward from the second location in the three-dimensional environment to a third location in the three-dimensional environment during the continuation of the interaction input controlled by hand 7020. Accordingly, in some embodiments, the gesture information that is delivered to the software application of application user interface 7010 for the transition from FIG. 7H to 7I indicates a greater amount of hand movement than the amount by which hand 7020 (e.g., the difference between the second location of hand 7020 and the third location of hand 7020 in the three-dimensional environment), such that application user interface 7010 is scrolled by an amount that is greater than the actual amount of movement of hand 7020. In some embodiments, the software application of application user interface 7010 is enabled to request information indicating the actual amount of movement of hand 7020.

FIG. 7M illustrates example gesture information 7040 that describes a user input received at computer system 101 (e.g., any of the inputs described herein with reference to FIGS. 7A-7K). Gesture information 7040 represents information that is typically delivered, at least in part, to software (e.g., an application, or system software) associated with a target of the received user input. In some embodiments, gesture information such as gesture information 7040 is delivered to the software using a system-provided framework, such as an application programming interface (API) (e.g., that translates other types of user inputs, such as air gestures, into touch inputs). Gesture information 7040 optionally includes the following data (or sets of data), or any combination (e.g., a subset or superset) thereof:

input identifier 7042 (e.g., identifier "A" or identifier "B" (FIGS. 7C-7I));

target 7044 (e.g., application user interface 7010, or more specifically element E1 or E2 therein, or speaker 7012, or close button 7016 (FIGS. 7C-7I); or wall hanging 7106 (FIG. 7J) or ball 7108 (FIG. 7K));

input location 7046 (e.g., based on user 7002's gaze, hand 7020, or hand 7022); and/or input movement information 7048 (e.g., based on the movement of user 7002's gaze, hand 7020, or hand 7022).

Below are a few examples of some function calls in an API for handling inputs at a computer system that is able to display AR/VR content and receive inputs directed to the AR/VR content, such as the computer systems described herein:

SpatialTapGesture public var location3D: Point3D {get} which is a function call that when requested by the application causes the operating system of the computer system to return the 3D location of the an air tap gesture to the application, which the application optionally uses to update a user interface of the application. This value can also, optionally, be set by the application with a corresponding set function call.

MagnifyGesture public var startLocation3D: Point3D {get} which is a function call that when requested by the application causes the operating system of the computer system to return the initial 3D center of the gesture in the modified view's coordinate space to the application which the application optionally uses to update a user interface of the application. This value can also, optionally, be set by the application with a corresponding set function call.

public var startAnchor3D: UnitPoint3D {get} which is a function call that when requested by the application causes the operating system of the computer system to return the initial 3D anchor point of the gesture in the modified view coordinate space to the application which the application optionally uses to update a user interface of the application. This value can also, optionally, be set by the application with a corresponding set function call.

RotateGesture public var startLocation3D: Point3D {get} which is a function call that when requested by the application causes the operating system of the computer system to return the initial 3D center of the gesture in the modified view's coordinate space to the application which the application optionally uses to update a user interface of the application. This value can also, optionally, be set by the application with a corresponding set function call.

public var startAnchor3D: UnitPoint3D {get} which is a function call that when requested by the application causes the operating system of the computer system to return the initial 3D anchor point of the gesture in the modified view coordinate space to the application which the application optionally uses to update a user interface of the application. This value can also, optionally, be set by the application with a corresponding set function call RotateGesture public var startLocation3D: Point3D {get} which is a function call that when requested by the application causes the operating system of the computer system to return the initial 3D center of the gesture in the modified view's coordinate space to the application which the application optionally uses to update a user interface of the application. This value can also, optionally, be set by the application with a corresponding set function call.

public var startAnchor3D: UnitPoint3D {get} which is a function call that when requested by the application causes the operating system of the computer system to return the initial 3D anchor point of the gesture in the modified view coordinate space to the application which the application optionally uses to update a user interface of the application. This value can also, optionally, be set by the application with a corresponding set function call.

RotateGesture3D public var time: Date {get} which is a function call that when requested by the application causes the operating system of the computer system to return the time associated with the gesture's current event to the application which the application optionally uses to update a user interface of the application. This value can also, optionally, be set by the application with a corresponding set function call.

public var otation3D: Rotation3D {get} which is a function call that when requested by the application causes the operating system of the computer system to return the relative amount by which the gesture has rotated to the application which the application optionally uses to update a user interface of the application. This value can also, optionally, be set by the application with a corresponding set function call.

public var velocity(around axis: RotationAxis3D) →Angle {get} which is a function call that when requested by the application causes the operating system of the computer system to return the current velocity of rotation about a provided 3D axis to the application which the application optionally uses to update a user interface of the application. This value can also, optionally, be set by the application with a corresponding set function call.

public var startAnchor3D: UnitPoint3D {get} which is a function call that when requested by the application causes the operating system of the computer system to return the initial 3D anchor point of the gesture in the modified view coordinate space to the application which the application optionally uses to update a user interface of the application. This value can also, optionally, be set by the application with a corresponding set function call.

public var startLocation3D: Point3D {get} which is a function call that when requested by the application causes the operating system of the computer system to return the initial 3D center of the gesture in the modified view's coordinate space to the application which the application optionally uses to update a user interface of the application. This value can also, optionally, be set by the application with a corresponding set function call.

public var constrainedAxis: RotationAxis3D which is a variable set by the application that causes the rotation to be constrained around an axis if a value is specified, or to be unconstrained to rotation around an axis if no value is specified (e.g., by the application or by the operating system). This value can also, optionally, be set by the application with a corresponding set function call.

public var minimumAngleDelta: Angle which is a variable set by the application or by the operating system that sets minimum angle delta before the gesture becomes active (e.g., by the application or by the operating system). This value can also, optionally, be set by the application with a corresponding set function call.

public var constrainedAxis: RotationAxis3D which is a variable set by the application that causes the rotation to be constrained around an axis if a value is specified, or to be unconstrained to rotation around an axis if no value is specified (e.g., by the application or by the operating system). This value can also, optionally, be set by the application with a corresponding set function call.

DragGesture public var location3D: Point3D {get} which is a function call that when requested by the application causes the operating system of the computer system to return the 3D location of the drag to the application which the application optionally uses to update a user interface of the application. This value can also, optionally, be set by the application with a corresponding set function call.

public var startLocation3D: Point3D {get} which is a function call that when requested by the application causes the operating system of the computer system to return the 3D start location of the drag to the application which the application optionally uses to update a user interface of the application. This value can also, optionally, be set by the application with a corresponding set function call.

public var translation3D: Vector3D {get} which is a function call that when requested by the application causes the operating system of the computer system to return the initial 3D translation vector of the drag to the application which the application optionally uses to update a user interface of the application. This value can also, optionally, be set by the application with a corresponding set function call.

public var predictedEndLocation3D: Point3D {get} which is a function call that when requested by the application causes the operating system of the computer system to return a prediction of where the final location would be if dragging stopped now, based on the current drag velocity to the application which the application optionally uses to update a user interface of the application. This value can also, optionally, be set by the application with a corresponding set function call.

public var inputDevicePose: Pose3D {get} which is a function call that when requested by the application causes the operating system of the computer system to return the 3D pose of the device driving the drag to the application which the application optionally uses to update a user interface of the application. This value can also, optionally, be set by the application with a corresponding set function call.

public var startInputDevicePose: Pose3D {get} which is a function call that when requested by the application causes the operating system of the computer system to return the starting 3D pose of the device driving the drag to the application which the application optionally uses to update a user interface of the application. This value can also, optionally, be set by the application with a corresponding set function call.

SpatialEventCollection public struct Event: Identifiable which is specifies an ID that is a unique identifier for the event. This value can also, optionally, be set by the application with a corresponding set function call.

public enum Phase which specifies a current phase for the event, available phases include:
  Active—meaning that the event will produce at least one more event;
  Ended—meaning that the event will not produce any more events; and
  Canceled—meaning that the event will not produce any more events and prior updates caused by the event should be ignored and/or reversed by the application.

public enum Kind which specifies a kind of input device that triggered generation of the event, available kinds include:
  Touch—meaning that the event was generated from a touch directly targeting an input target;
  Direct Pinch—meaning that the event was generated from a direct air pinch;
  Indirect Pinch—meaning that the event was generated from an indirect air pinch;
  Pencil—meaning that the event was from a stylus or pencil; and
  Pointer—meaning the event was from a click-based indirect input device such as a mouse or trackpad.

public var inputDevicePose: Pose3D {get} which is a function call that when requested by the application causes the operating system of the computer system to return the 3D pose of the device driving the input event to the application which the application optionally uses to update a user interface of the application. This value can also, optionally, be set by the application with a corresponding set function call.

public var inputDevicePose—Altitude: Angle {get} which is a function call that when requested by the application causes the operating system of the computer system to return the Altitude of the input device driving the input event to the application which the application optionally uses to update a user interface of the application. This value can also, optionally, be set by the application with a corresponding set function call.

public var inputDevicePose—Azimuth: Angle {get} which is a function call that when requested by the application causes the operating system of the computer system to return the Azimuth of the input device driving the input event to the application which the application optionally uses to update a user interface of the application. This value can also, optionally, be set by the application with a corresponding set function call.

public var location3D: Point3D {get} which is a function call that when requested by the application causes the operating system of the computer system to return the 3D location of the input event to the application which the application optionally uses to update a user interface of the application. This value can also, optionally, be set by the application with a corresponding set function call.

public var location2D: Point2D {get} which is a function call that when requested by the application causes the operating system of the computer system to return the 2D location of the input event to the application which the application optionally uses to update a user interface of the application. This value can also, optionally, be set by the application with a corresponding set function call.

public var targetedEntity {get} which is a function call that when requested by the application causes the operating system of the computer system to return the entity (e.g., window, application or user interface object) targeted by the input event to the application which the application optionally uses to update a user interface of the application. This value can also, optionally, be set by the application with a corresponding set function call.

public var selectionRay {get} which is a function call that when requested by the application causes the operating system of the computer system to return the 3D ray used to target the entity (e.g., window, application, or user interface object) targeted by the input event to the application which the application optionally uses to update a user interface of the application. This value can also, optionally, be set by the application with a corresponding set function call.

As described herein with reference to FIG. 7A (and FIGS. 7A-7X more generally), gesture information is optionally delivered as an input event (e.g., a touch event) and optionally also includes a time stamp for the input event, a location of the input relative to the three-dimensional environment, a duration of the input, a direction and/or speed of movement of the input, and/or a phase value that indicates a current phase of the input.

In some embodiments, the aforementioned data about a user input, collectively referred to herein as standard input information, is provided regardless of user input type. For example, the aforementioned data about a user input is provided whether the user input is a touch input, air gesture input, or other type of user input. In some embodiments, the delivered information about the user input includes an additional information flag 7050 that indicates whether additional data about the user input is available in addition to the standard information. In some embodiments, the inclusion of additional information flag 7050 in the delivered information indicates that additional information is available; alternatively, in some embodiments the absence of additional information flag 7050 from the delivered information indicates that additional information is available. In some embodiments, additional information about the user input is available to be delivered (e.g., in response to a request, from the software associated with the target of the user input, for the additional information) if the user input is an air gesture (e.g., any of the air gesture-related inputs described herein with reference to FIGS. 7A-7K; whether the input indicates readiness to interact (see, e.g., FIGS. 7C-7E), initiates or is part of an interaction (see, e.g., FIGS. 7G-7I), or neither (see, e.g., FIG. 7F); and whether the input is an indirect manipulation input (see, e.g., FIG. 7J) or a direct manipulation input (see, e.g., FIG. 7K)). Accordingly, in some embodiments, additional information flag 7050 indicates whether the user input is an air gesture. The additional information about an air gesture optionally includes data that describes one or more hands performing the air gesture, or more generally one or more input manipulators (e.g., a part of the user such as a hand, a finger, or a wrist; or a user-controlled physical device such as a wand, a remote, or a controller), such as the following data (or sets of data) or any combination (e.g., a subset or superset) thereof:

absolute pose 7052 for a first input manipulator (e.g., one of hand 7020 or hand 7022), which indicates the pose (e.g., position and/or orientation) of the first input manipulator in absolute, system-defined terms (e.g., with respect to a system-defined three-dimensional coordinate space);

relative pose 7054 for the first input manipulator, which indicates the pose (e.g., position and/or orientation) of the first input manipulator in relative terms (e.g., relative to a most recent prior pose and/or relative to an application-defined three-dimensional coordinate space); and/or pinch state 7056 for the first input manipulator, which indicates a configuration state of the first input manipulator, optionally from a plurality of predefined configuration states (e.g., a pre-pinch configuration, pinch configuration, pre-tap configuration, or tap configuration of a hand performing the air gesture);

absolute pose 7058 for a second input manipulator (e.g., the other of hand 7020 or hand 7022), which indicates the pose of the second input manipulator in absolute terms, if detected;

relative pose 7060 for the second input manipulator, which indicates the pose of the second manipulator in relative terms; and/or pinch state 7062 for the second input manipulator, which indicates a configuration state of the second input manipulator;

input direction 7064, which indicates a direction in the three-dimensional environment (e.g., of a selection ray) that is used to identify a target of an input; and/or input location 3D 7066, which identifies a location of an input in three dimensions.

In some circumstances where a user's hand is used as a respective input manipulator, pose information provided about the respective input manipulator, such as absolute pose and/or relative pose, includes position information indicating where the user's hand is in the three-dimensional environment and/or information indicating the orientation of the user's hand.

In some embodiments, the standard input information about a user input simulates an input as a two-dimensional input (e.g., a touch input that has two-dimensional positioning and/or movement with respect to a touch-sensitive surface), whereas the additional information provides three-dimensional information about an input (e.g., an air gesture that uses three-dimensional positioning and/or movement). Accordingly, in some embodiments, gesture information 7040 includes input location 7046 that identifies the location of an input in two dimensions (e.g., using x-y coordinates or other two-dimensional coordinates). Thus, in some embodiments, if the input described by gesture information 7040 has a three-dimensional location, input location 7046 identifies the location of the input projected into two dimensions. For example, for a two-dimensional input location with respect to a touch-sensitive surface having a third coordinate that represents a distance relative to the touch-sensitive surface (e.g., how far a hover input is above the touch-sensitive surface), input location 7046 includes the two-dimensional location (e.g., omitting the third coordinate). In another example, for an input location in a three-dimensional environment, input location 7046 maps the input location in the three-dimensional environment to a two-dimensional location (e.g., by identifying lateral (e.g., x-axis) and vertical (e.g., y-axis) coordinates of the input location relative to a user without identifying a distance (e.g., z-axis) of the input location from the user, identifying azimuthal and altitudinal coordinates without identifying a radial coordinate, or other two-coordinate subset) and includes the two-dimensional location without the third coordinate.

In some embodiments, input location 3D 7066 (also simply called input location 7066) of gesture information 7040 identifies the location of an input in three dimensions (e.g., and is optionally part of the standard input information or part of the additional information whose availability is indicated by additional information flag 7050). For example, for a two-dimensional input location, input location 7066 includes the two-dimensional input location and an empty value (e.g., null or 0, or other value) for the third coordinate. In another example, for an input location in a three-dimensional environment, input location 7066 identifies the three coordinates of the input location in the three-dimensional environment (e.g., without any of the three coordinates being the empty value).

In some embodiments, the additional information about a user input enables computer system 101 (e.g., a gesture recognizer of computer system 101) to recognize a chorded gesture (e.g., that involves two or more interaction points, analogous to a multitouch gesture, such as for zooming or rescaling content, minimizing content, previewing content, switching between different applications, and/or transitioning to or from a system user interface such as an application selection user interface or control panel user interface). For example, recognition of a two-handed pinch air gesture (e.g., analogous to a touch-based pinch gesture using two or more contacts moving toward or away from each other on a touch-sensitive surface) is enabled by providing information about the position and/or orientation (absolute and/or relative to each other) of two hands in physical space, information about the absolute and/or relative movement of one or both hands, and/or information about the distance between the two hands. In some embodiments, a target of the two-handed pinch air gesture is determined based on a location of user 7002's gaze and in accordance with a determination that both hands 7020 and 7022 are in a pre-pinch ready state configuration, for indirect manipulation, or based on the locations of hands 7020 and 7022 in a pre-tap configuration, for direct manipulation (e.g., corresponding gesture information is delivered as "hover begin" phase touch events in respective input streams for each hand). In some embodiments, in response to both hands 7020 and 7022 initiating an interaction input (e.g., performing an air pinch for indirect manipulation or performing an air tap for direct manipulation), gesture information is delivered as "touch begin" phase touch events in respective input streams for each hand). However, because the inputs corresponding to both hands are initiated with respect to the same location (e.g., the location of user 7002's gaze when the interaction input is initiated), in some embodiments the additional information about hands 7020 and 7022, such as absolute pose and/or relative pose, is helpful for determining the progress of the two-handed pinch air gesture. Thus, in some embodiments, subsequent movement of hands 7020 and 7022 is monitored to determine the extent of movement of the manipulators relative to each other and relative to the three-dimensional environment, and accordingly the extent of the air gesture, by requesting (e.g., by an application associated with the target of the input) the additional information, including absolute pose and/or relative pose information for hands 7020 and 7022.

In some embodiments, when additional information about a user input is available, the additional information is delivered to software (e.g., an application, or system software) associated with the target of the user input in response to a request, from the software associated with the target of the user input, for the additional information (e.g., the software issues the request for additional information to or through the system-provided framework, for example after receiving, from or through the system-provided framework, the standard input information). In some embodiments, the software issues separate requests for additional information for different sets or instances of standard input information received (e.g., a first request for additional information corresponding to first standard input information received, and a second request for additional information corresponding to second standard input information received).

In some embodiments, as illustrated in FIG. 7M, the additional information that is available to be delivered about a user input includes input direction 7064, which is an indication of a direction of a target selector, such as a portion of a user's body (e.g., a user's gaze, hand, finger (e.g., an extended finger, fingertip, two or more fingers performing a pinch gesture, or other configuration), wrist, head, or other portion of the user's body) or other input manipulator (e.g., a user-controlled physical device such as a wand, a remote, or a controller), that is used to select a target of the user input (e.g., also identified in gesture information 7040 as target 7044). In some embodiments, input direction 7064 indicates the direction toward which the target selector is directed, such as the direction of a selection ray extending through the three-dimensional environment (e.g., an extended reality environment) from a position corresponding to the target selector (e.g., the portion of the user's body or other input manipulator), to or through target 7044. Accordingly, target 7044 of gesture information 7040 identifies an element in the three-dimensional environment that the selection ray intersects (e.g., target 7044 is one of one or more elements in the three-dimensional environment that are in the path of the selection ray). In some embodiments or circumstances, target 7044 is a two- or three-dimensional object (e.g., a virtual user interface object) in the three-dimensional environment.

Although FIG. 7M shows input direction 7064 included in the additional information about a user input (e.g., that, even if available, is not delivered automatically with the standard input information that is provided about the user input, but rather is withheld unless requested by the software associated with target 7044 of the user input), in some embodiments input direction 7064 is included in the standard input information that is provided about the user input (e.g., as part of gesture information 7040 more generally) and is delivered without the software associated with target 7044 needing to request the additional information.

In some embodiments, input direction 7064 is delivered (e.g., as part of the standard input information) or available to be delivered (e.g., upon request as part of the additional information) as part of input events for indirect manipulation inputs, for which an input manipulator is typically at a distance from an intended input target and for which a direction of a user's focus (e.g., whether based on the direction of the user's gaze or the direction in which the user is pointing the input manipulator) is typically used to identify the input target, as described herein with reference to FIG. 7J. In such circumstances, input direction 7064 indicates the direction of the user's focus (e.g., the direction of the user's gaze or the direction in which the user is pointing the input manipulator). In contrast, for direct manipulation inputs, as described herein with reference to FIG. 7K, the target of a direct manipulation input can be identified simply based on a current location of the user's hand (e.g., by selecting the element in the three-dimensional environment that coincides with the simulated position of the user's hand or portion of the user's hand in the three-dimensional environment, as if the user were reaching out and touching or poking the element). Accordingly, input direction 7064 is not needed and generally inapplicable to direct manipulation inputs. In some embodiments, therefore, input direction 7064 is neither delivered nor available to be delivered as part of input events for direct manipulation inputs.

In some embodiments, an indication of the type of input manipulator that is performing an input is delivered (e.g., as part of the standard input information) or available to be delivered (e.g., upon request as part of the additional information) as part of the gesture information 7040 in input events for the input. For example, gesture information 7040 optionally includes an additional parameter that identifies whether the input manipulator is a direct input manipulator (e.g., if the input manipulator is performing a direct manipulation input); an indirect input manipulator (e.g., if the input manipulator is performing an indirect manipulation input, such as by performing an input gesture (e.g., using a user's hand) in combination with a separate target selector (e.g., a user's gaze)); an indirect pointer (e.g., a pointing device, such as a trackpad or mouse); a stylus; or other type of input manipulator.

In some embodiments, pose information (e.g., provided or available to be provided as absolute pose 7052, relative pose 7054, pinch state 7056, absolute pose 7058, relative pose 7060, and/or pinch state 7062) about an input manipulator is assessed and defined differently for different types of input manipulators. For example, where the input manipulator is a user's hand performing indirect manipulation input gestures in conjunction with a user's attention (e.g., gaze), the pose information provided about the input manipulator identifies the location of a first characteristic portion (e.g., a centroid or other portion) and an orientation of the user's hand that performs the input gesture. In another example, where the input manipulator is a user's hand performing direct manipulation inputs, the pose information provided about the input manipulator identifies the location of a second characteristic portion of the user's hand) (e.g., a fingertip, or other portion of the user's hand, that the user extends to an input target in the three-dimensional environment as if to touch the input target), optionally without an orientation of the user's hand. In yet another example, where the input manipulator is performing a gesture that includes a drag gesture, the pose information provided about the input manipulator identifies a rotation of the input manipulator during the drag gesture, such that an input target of the drag gesture (e.g., a three-dimensional object in the three-dimensional environment) can be rotated in accordance with rotation of the input manipulator (e.g., with a magnitude of the rotation of the three-dimensional object being based on a magnitude of the rotation of the input manipulator, a direction of the rotation of the three-dimensional object being based on a direction of the rotation of the input manipulator, and/or a speed of the rotation of the three-dimensional object being based on a speed of the rotation of the input manipulator, and/or other mapping of aspects of the rotation of the three-dimensional object to aspects of the rotation of the input manipulator).

FIGS. 7N-7X illustrate conditionally performing operations in response to inputs directed to user interface objects based on behavior parameters of the objects.

Figure 7N:
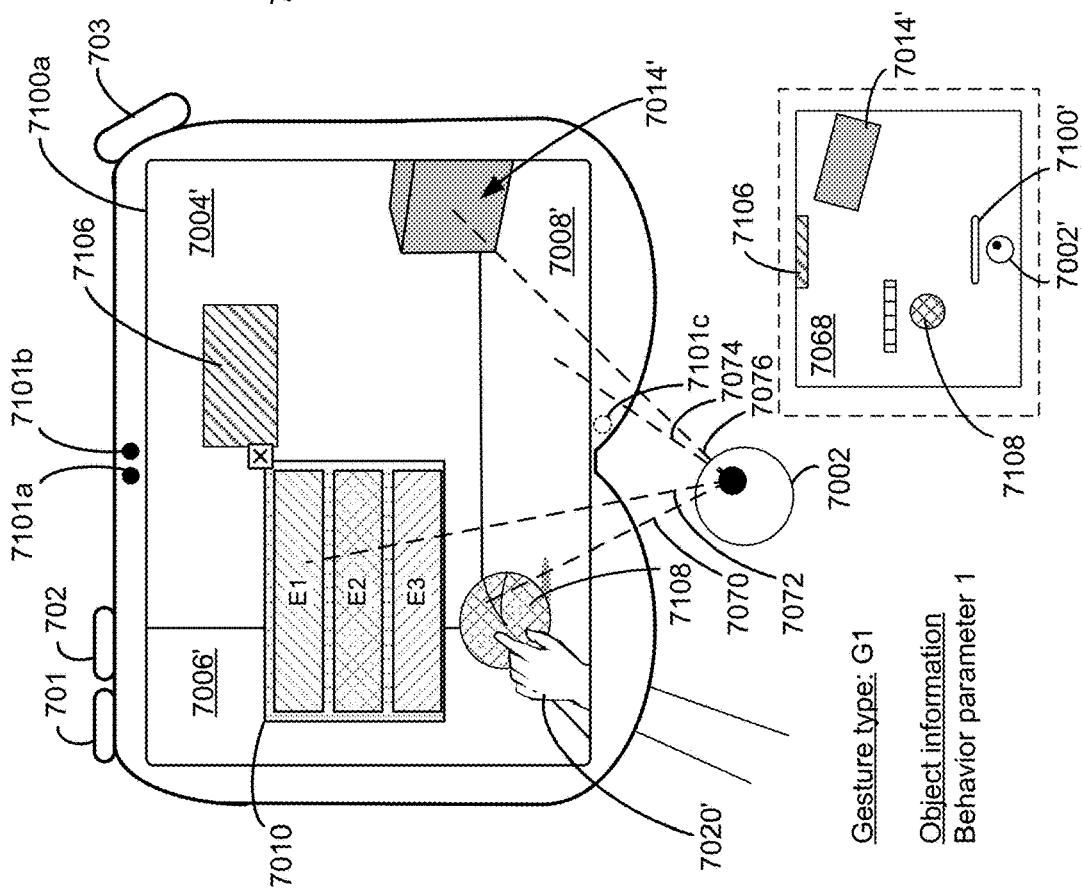
Figure 7Q:
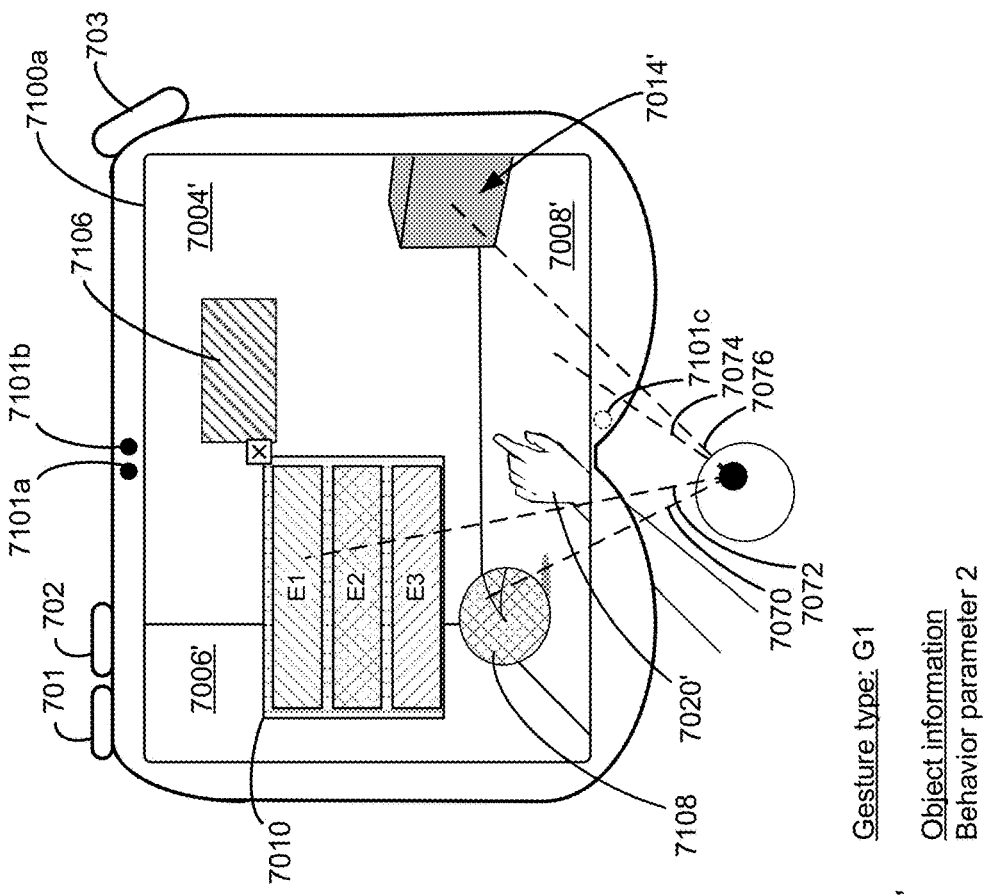

FIG. 7N shows a view of a three-dimensional environment that is visible to user 7002 via display generation component 7100 of computer system 101. Similar to the three-dimensional environment described herein of FIG. 7B, the three-dimensional environment of FIG. 7N includes representations of objects in a physical environment such as physical environment 7000 (e.g., as captured by one or more cameras of computer system 101). For example, in FIG. 7N, the three-dimensional environment includes representation 7014' of physical object 7014, representations 7004' and 7006' of physical walls 7004 and 7006, respectively, and representation 7008' of physical floor 7008. In addition, the three-dimensional environment of FIG. 7N includes one or more computer-generated objects, including wall hanging 7106, ball 7108, and application user interface 7010. Top view 7068 illustrates the relative positions of objects in the three-dimensional environment, including representation 7014' of physical box 7014; computer-generated objects 7106, 7108, and 7010; simulated position 7002' of user 7002 (e.g., the viewpoint of user 7002); and simulated position 7100' of display generation component 7100.

In FIG. 7N, user 7002's left hand 7020 performs gesture G1 (e.g., a first type of air gesture, such as a direct manipulation input (also called herein a direct air input), optionally using a first number of fingers such as a single-finger direct air touch, single air tap, or other gesture type) directed to ball 7108 in the three-dimensional environment. Hand 7020 performs gesture G1 at or within a threshold distance of the location of ball 7108 in the three-dimensional environment (e.g., such that hand 7020 at least partially coincides with ball 7108). Although FIG. 7N illustrates multiple different locations in the three-dimensional environment to which user 7002 is optionally directing or shifting attention (e.g., dashed line 7070 representing user 7002 gazing at a location on ball 7108, dashed line 7072 representing user 7002 gazing at a location in application user interface 7010, dashed line 7074 representing user 7002 gazing at a location on representation 7008' of physical floor 7008, and dashed line 7076 representing user 7002 gazing at a location on representation 7014' of physical object 7014), due to gesture G1 being a direct input occurring at a location corresponding to ball 7108, ball 7108 is determined to be the target of gesture G1 (e.g., without regard to which of the locations indicated by dashed lines 7070, 7072, 7074, or 7076 in FIG. 7N is the location to which user 7002 is directing attention). FIG. 7N also indicates that ball 7108, the target object of gesture G1, is associated with behavior parameter 1. In some embodiments, behavior parameters specify the type of hand behavior required for a gesture to activate a target object (e.g., a parameter or value that specifies the type(s) of gesture to which a target object is configured to respond). In some embodiments, behavior parameter 1 indicates that ball 7108 is configured to respond to gesture G1 (e.g., a direct touch). In some embodiments, behavior parameter 1 indicates that ball 7108 is configured to respond to a plurality of gestures including gesture G1 (e.g., the plurality of gestures also including gesture G2 described below (e.g., a direct pinch), gesture G3 described below (e.g., an indirect pinch), and/or other gestures). In some embodiments, behavior parameter 1 indicates that ball 7108 is not configured to respond to another type of gesture, such as gesture G2 and/or gesture G3. Below is an example of function calls for behavior parameters in an API as described herein (e.g., the API described herein with reference to FIG. 7M):

public enum handActivationBehavior which specifies the type of hand behavior to use for a respective user interface object, available behaviors include:
Automatic—meaning that interaction with (e.g., activation of, selection of, and/or movement of) the user interface object is enabled using direct touch, direct pinch, and indirect pinch;
Pinch—meaning that interaction with the user interface object requires a pinched hand (e.g., direct pinch or indirect pinch), and that interaction with the user interface object is not enabled using direct touch or that direct touch is prevented from generating interaction events for the user interface object.

FIG. 7O illustrates that, in response to gesture G1 (FIG. 7N) (e.g., because the input performed by hand 7020 is of the gesture type of gesture G1), and in accordance with ball 7108 being associated with behavior parameter 1, ball 7108 is moved in the three-dimensional environment in accordance with movement of hand 7020, in some embodiments without regard to where user 7002 is directing attention and/or without regard to how user 7002's attention shifts (e.g., as described herein with reference to dashed lines 7070, 7072, 7074, and 7076 in FIG. 7N). For example, as hand 7020 moves toward the right by a respective amount relative to the three-dimensional environment, ball 7108 is moved toward the right in the three-dimensional environment by an amount corresponding to the amount of movement of hand 7020. Top view 7068 in FIG. 7O illustrates that the current position of ball 7108 is different from the prior position of ball 7108, which is indicated using a dashed outline (e.g., which represents the position of ball 7108 in top view 7068 of FIG. 7N). In some embodiments, as illustrated in FIGS. 7N-7Q, gesture G1 is a gesture type (e.g., a direct touch) that requires a target object to be associated with a particular behavior parameter in order for the target object to respond to gesture G1 or more generally for an operation responsive to gesture G1 to be performed.

Figure 7P:
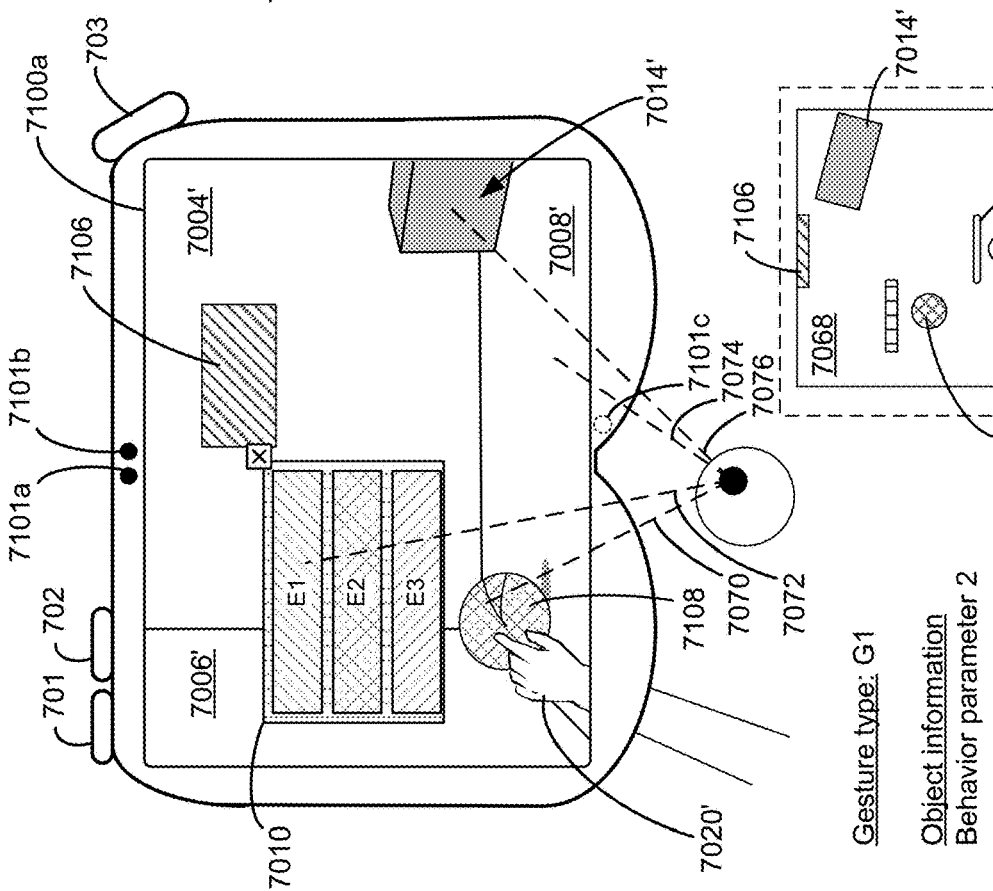
Figure 7U:
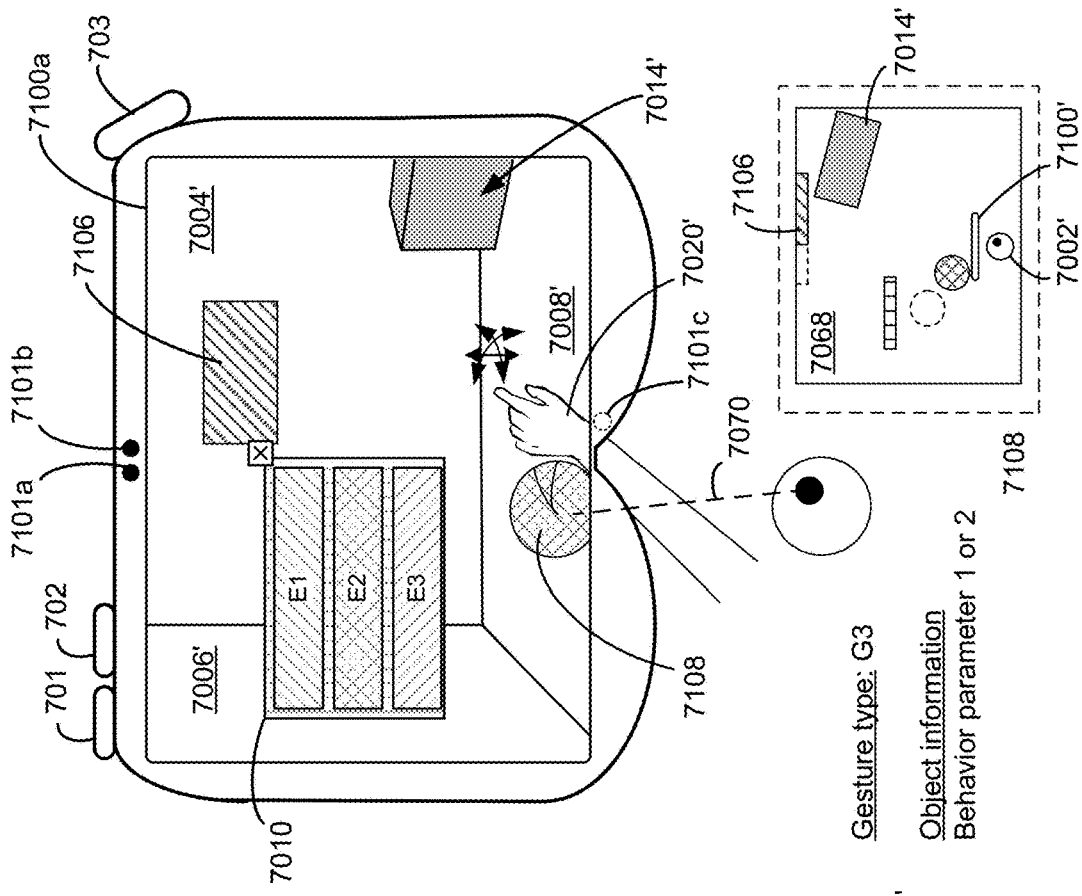

FIG. 7P is the same as FIG. 7N except that ball 7108 in FIG. 7P is not associated with behavior parameter 1. Instead, ball 7108 in FIG. 7P is associated with behavior parameter 2. In some embodiments, behavior parameter 2 indicates that ball 7108 is not configured to respond to gesture G1 (e.g., a direct touch). In some embodiments, behavior parameter 2 indicates that ball 7108 is configured to respond to one or more gestures not including gesture G1 (e.g., the one or more gestures including gesture G2 (e.g., a direct air pinch), gesture G3 (e.g., an indirect air pinch), and/or other gestures).

Accordingly, FIG. 7Q illustrates that, in response to gesture G1 (FIG. 7P) (e.g., because the input performed by hand 7020 is of the gesture type of gesture G1), and in accordance with ball 7108 not being associated with behavior parameter 1 (e.g., and in accordance with ball 7108 being associated with behavior parameter 2), ball 7108 is not moved in the three-dimensional environment (e.g., optionally, without regard to where user 7002 is directing attention, as described herein with reference to dashed lines 7070, 7072, 7074, and 7076, shown in each of FIGS. 7N-7Q). For example, as hand 7020 performs gesture G1, ball 7108 stays at the same place in the three-dimensional environment (e.g., even as hand 7020 moves toward the right by the respective amount relative to the three-dimensional environment, and/or even as user 7002's attention shifts from one gaze location to another).

In some embodiments, a user interface object is associated with behavior parameter 1 to enable gestures of the same type as gesture G1 (e.g., direct touch gestures, air tap gestures, air tap-and-drag gestures, or other gestures) to be used for performing gross adjustments to the user interface object (e.g., scrolling or panning a map user interface or other larger user interface areas). In some embodiments, a user interface object is not associated with behavior parameter 1 to prevent gestures of the same type as gesture G1 from being used to perform such gross adjustments to the user interface object, such as in situations where finer control is required (e.g., for moving smaller objects relative to the three-dimensional environment, such as moving pieces around a chessboard or other more granular operations). For example, in response to detecting gesture G1 directed to a first target object such as application user interface 7010, in accordance with a determination that gesture G1 includes a direct touch gesture and that application user interface 7010 is associated with behavior parameter 1, computer system 101 scrolls application user interface 7010 in the three-dimensional environment in accordance with movement of gesture G1. In contrast, as described herein with reference to FIGS. 7P-7Q, in response to detecting gesture G1 directed to a second target object such as ball 7108, in accordance with a determination that gesture G1 includes a direct touch gesture and that ball 7108 is not associated with behavior parameter 1 (e.g., due to ball 7108 requiring finer control than application user interface 7010), computer system 101 does not move ball 7108 in the three-dimensional environment (e.g., even if gesture G1 includes movement).

FIG. 7R is similar to FIGS. 7N and 7P except that hand 7020 in FIG. 7R performs gesture G2 (e.g., a second type of air gesture, different from the gesture type of gesture G2, such as a direct manipulation input, optionally using a different second number of fingers such as a direct air pinch, or other gesture type) directed to ball 7108 in the three-dimensional environment. Hand 7020 performs gesture G2 at or within a threshold distance of the location of ball 7108 in the three-dimensional environment (e.g., such that hand 7020 at least partially coincides with ball 7108). Although FIG. 7R illustrates multiple different locations in the three-dimensional environment to which user 7002 is optionally directing or shifting attention (e.g., dashed lines 7070, 7072, 7074, and 7076 as described herein with reference to FIG. 7N), due to gesture G2 being a direct input occurring at a location corresponding to ball 7108, ball 7108 is determined to be the target of gesture G2 (e.g., without regard to which of the locations indicated by dashed lines 7070, 7072, 7074, or 7076 in FIG. 7R is the location to which user 7002 is directing attention). In addition, FIG. 7R indicates that ball 7108 may be associated with either behavior parameter 1 or behavior parameter 2 (or in some embodiments another behavior parameter or no behavior parameter).

FIG. 7S illustrates that, in response to gesture G2, ball 7108 is moved in the three-dimensional environment, and that the particular behavior parameter, if any, with which ball 7108 is associated does not change whether ball 7108 is moved in the three-dimensional environment in response to gesture G2 (e.g., gesture G2 is a gesture type that does not require a target object to be associated with a particular behavior parameter in order for the target object to respond to gesture G2 or more generally for an operation responsive to gesture G2 to be performed). In addition, ball 7108 is moved in the three-dimensional environment in accordance with movement of hand 7020 during gesture G2, in some embodiments without regard to where user 7002 is directing attention and/or without regard to how user 7002's attention shifts (e.g., as described herein with reference to dashed lines 7070, 7072, 7074, and 7076 in FIG. 7N). For example, as hand 7020 moves toward the right by a respective amount relative to the three-dimensional environment, ball 7108 is moved toward the right in the three-dimensional environment by an amount corresponding to the amount of movement of hand 7020. Top view 7068 in FIG. 7S illustrates that the current position of ball 7108 is different from the prior position of ball 7108, which is indicated using a dashed outline (e.g., which represents the position of ball 7108 in top view 7068 of FIG. 7R).

Figure 7T:
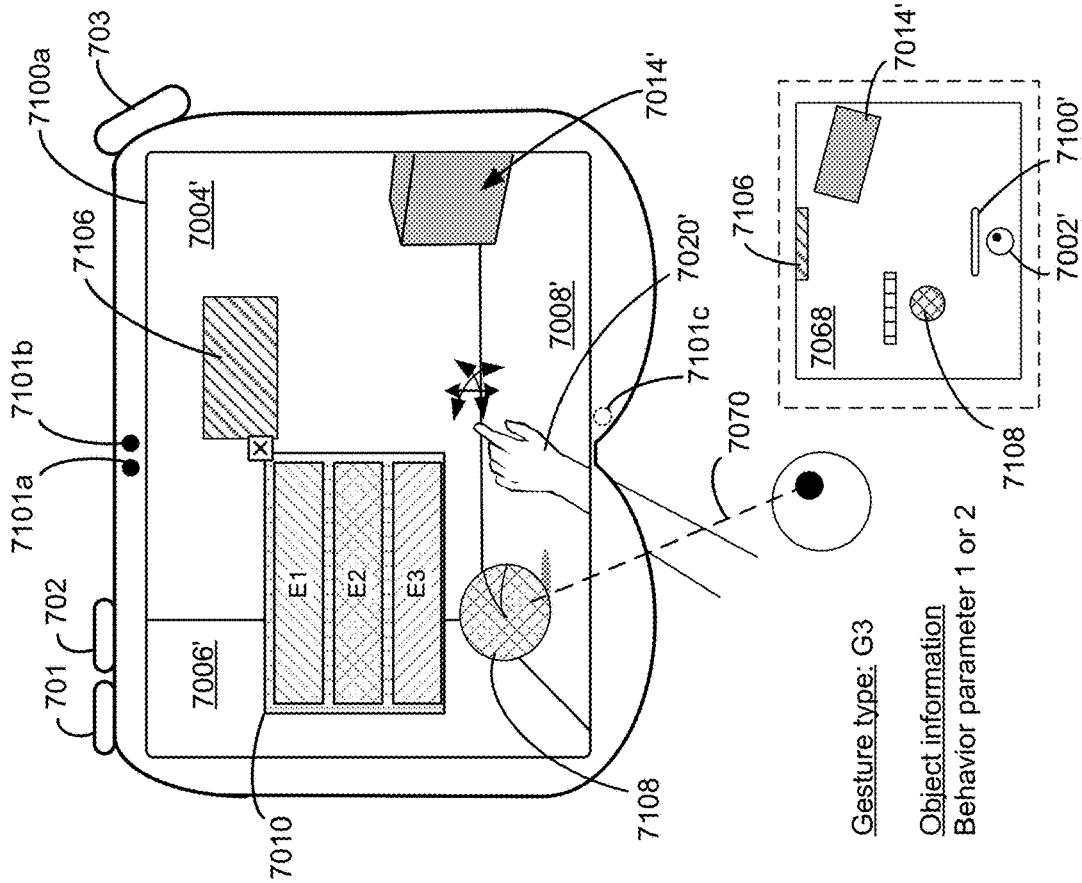
Figure 7W:
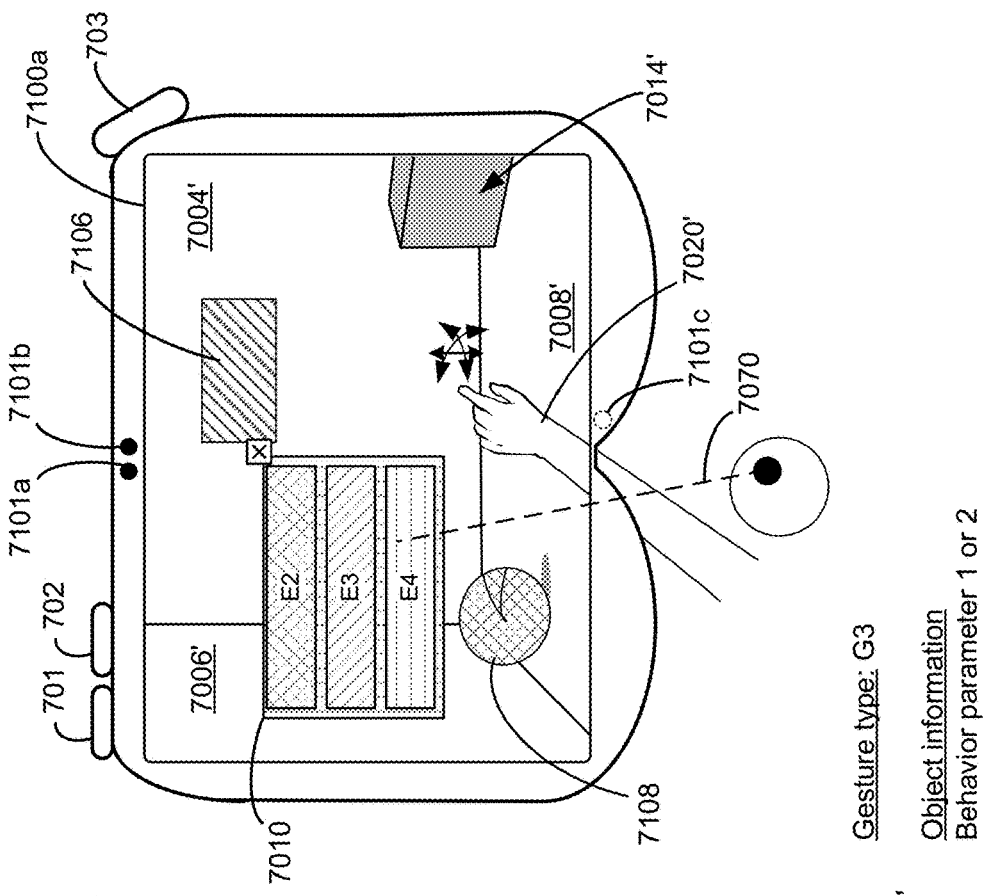

FIG. 7T is similar to FIGS. 7N and 7P except that hand 7020 in FIG. 7R performs gesture G3 (e.g., a third type of air gesture, different from the gesture types of gestures G1 and G2, such as an indirect manipulation input including for example an indirect air pinch, or other gesture type). Gesture G3 is a type of input for which the input target is determined based on where user 7002 is directing their attention while performing gesture G3 (e.g., in contrast to gestures G1 and G2, for which the input targets are determined based on the location of hand 7020). In the example of FIG. 7T, user 7002's gaze (e.g., represented by dashed line 7070), and thus gesture G3, is directed to ball 7108 in the three-dimensional environment. In some circumstances, hand 7020 performs gesture G3 (e.g., an air pinch gesture) at a location in the three-dimensional environment that is beyond a threshold distance of the location of ball 7108 in the three-dimensional environment (e.g., gesture G3 is an indirect manipulation input). FIG. 7T indicates that ball 7108 may be associated with either behavior parameter 1 or behavior parameter 2 (or in some embodiments another behavior parameter or no behavior parameter).

FIG. 7U illustrates that, in response to gesture G3 (FIG. 7T), ball 7108 is moved in the three-dimensional environment, and that the particular behavior parameter, if any, with which ball 7108 is associated does not change whether ball 7108 is moved in the three-dimensional environment in response to gesture G3 (e.g., gesture G3 is a gesture type that does not require a target object to be associated with a particular behavior parameter in order for the target object to respond to gesture G3 or more generally for an operation responsive to gesture G3 to be performed). In addition, ball 7108 is moved in the three-dimensional environment in accordance with movement of hand 7020 during gesture G3 (e.g., an air pinch-and-drag gesture). For example, as hand 7020 moves toward the right and downward by a respective amount relative to the three-dimensional environment, ball 7108 is moved toward the right and closer to simulated position 7002' of user 7002 (e.g., the viewpoint of user 7002) in the three-dimensional environment along representation 7008' of physical floor 7008 by an amount corresponding to the amount of movement of hand 7020. Top view 7068 in FIG. 7U illustrates, as viewed from above, that the current position of ball 7108 is different from the prior position of ball 7108, which is indicated using a dashed outline (e.g., which represents the position of ball 7108 in top view 7068 of FIG. 7T). Optionally (e.g., because gesture G3 is an indirect gesture and/or because ball 7108 is more than a threshold distance from user 7002), the amount by which ball 7108 is moved is accelerated relative to the amount by which hand 7020 moves, as described in more detail herein with reference to FIGS. 7K-7L.

Figure 7V:
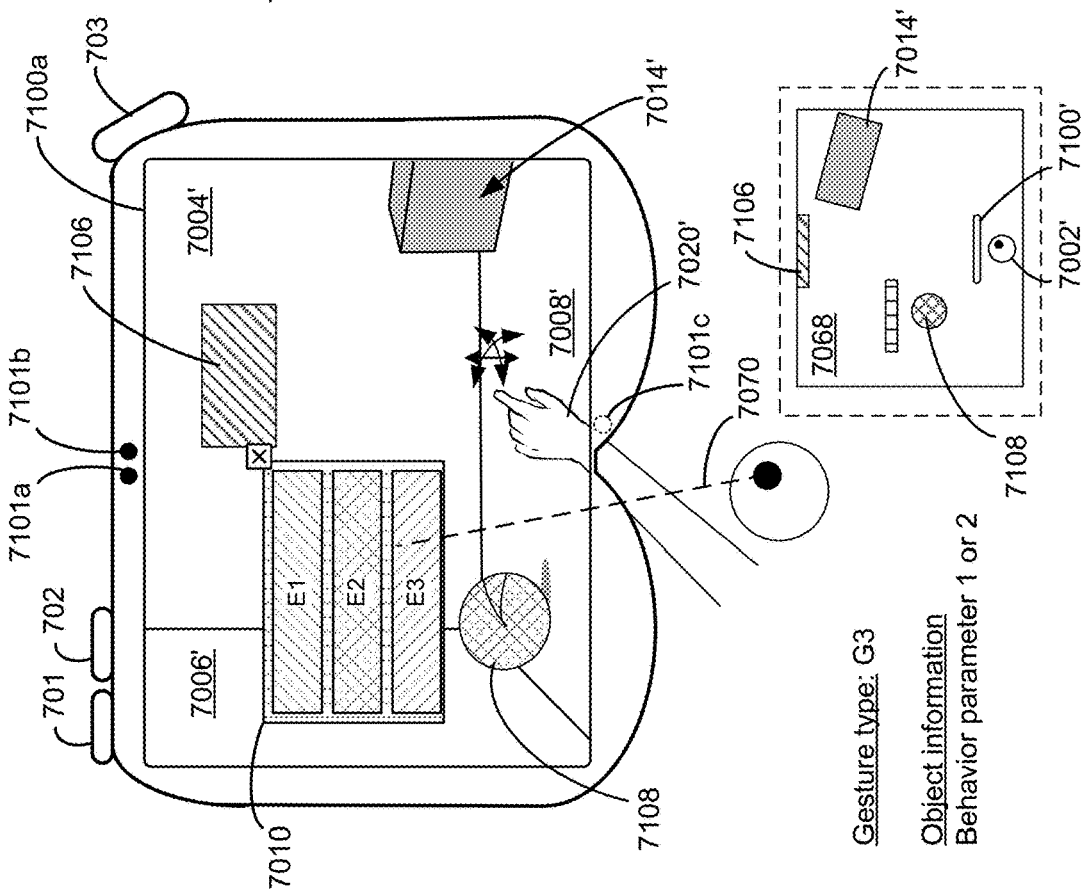
Figure 7X:
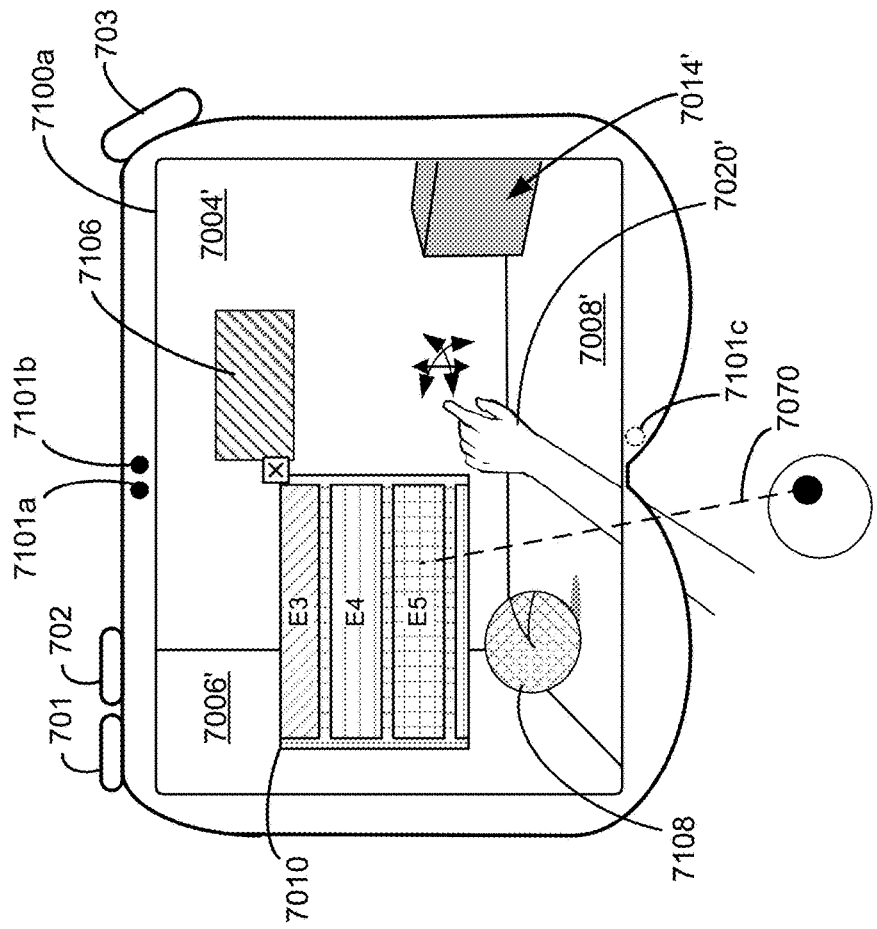

FIG. 7V is similar to FIG. 7T, except that in FIG. 7V, as hand 7020 performs gesture G3 (e.g., the third type of gesture, such as an indirect manipulation input), user 7002's gaze 7070 is directed to application user interface 7010 instead of to ball 7108 in the three-dimensional environment. Accordingly, application user interface 7010 is the target of gesture G3. In some circumstances, hand 7020 performs gesture G3 at a location in the three-dimensional environment that is beyond a threshold distance of the location of application user interface 7010 in the three-dimensional environment (e.g., gesture G3 is an indirect manipulation input). FIG. 7V indicates that application user interface 7010 may be associated with either behavior parameter 1 or behavior parameter 2 (or in some embodiments another behavior parameter or no behavior parameter).

FIGS. 7W-7X illustrate that, in response to gesture G3 (e.g., in FIG. 7V), application user interface 7010 is scrolled, and that the particular behavior parameter, if any, with which application user interface 7010 is associated does not change whether application user interface 7010 is scrolled in response to gesture G3 (e.g., gesture G3 is a gesture type that does not require a target object to be associated with a particular behavior parameter in order for the target object to respond to gesture G3 or more generally for an operation responsive to gesture G3 to be performed). In addition, application user interface 7010 is scrolled in accordance with movement of hand 7020 during gesture G3. For example, as shown in FIG. 7W, hand 7020 has moved upward relative to the three-dimensional environment by a first amount from the position of hand 7020 in FIG. 7V. Accordingly, in FIG. 7W, the scrollable elements of application user interface 7010 have been scrolled in a first direction (e.g., shifted upward) by a first scroll amount, relative to the state of application user interface 7010 in FIG. 7V, corresponding to the first amount of movement of hand 7020. In comparison, as shown in FIG. 7X, hand 7020 has moved further upward relative to the three-dimensional environment, resulting in a second amount of movement of hand 7020 from the position of hand 7020 in FIG. 7V (e.g., different from the first amount of movement of hand 7020). Accordingly, in FIG. 7X, the scrollable elements of application user interface 7010 have been further scrolled in the first direction (e.g., shifted upward) by a second scroll amount (e.g., different from the first scroll amount), relative to the state of application user interface 7010 in FIG. 7V, corresponding to the second amount of movement of hand 7020. One of ordinary skill will readily appreciate that movement of hand 7020 in a different direction, such as downward, would scroll (or correspond to a request to scroll) the scrollable elements of application user interface 7010 in a different scroll direction (e.g., shifting downward).

Additional descriptions regarding FIGS. 7A-7X are provided below in reference to methods 800, 900, 1000, 1100, and 1200 described with respect to FIGS. 7A-7X.

FIG. 8 is a flow diagram of an exemplary method 800 for providing gesture information about an input to elements to which the user's gaze is directed, based on whether a user's hand is in a predefined configuration, in accordance with some embodiments. In some embodiments, method 800 is performed at a computer system (e.g., computer system 101 in FIG. 1A) that is in communication with a display generation component (e.g., display generation component 120 in FIGS. 1A, 3, and 4) (e.g., a heads-up display, a head-mounted device, a display, a touchscreen, a projector, or the like) and one or more input devices (e.g., one or more cameras (e.g., color sensors, infrared sensors, structured light scanners, and/or other depth-sensing cameras) that point downward at a user's hand, forward from the user's head, and/or that faces the user; eye-tracking devices; user-held and/or user-worn controllers; and/or other input hardware). In some embodiments, the method 800 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 800 are, optionally, combined and/or the order of some operations is, optionally, changed.

In some embodiments in which the display generation component is a touchscreen or display held by or positioned in front of the user, content that is visible in the environment is displayed on the touchscreen or display or visible via a transparent or partially transparent portion thereof. In some such embodiments, the computer system is enabled to detect inputs involving the user's gaze (e.g., location and/or movement) using one or more cameras and/or eye-tracking devices facing the user. In some such embodiments, the computer system is also enabled to detect inputs involving the user's hands (e.g., location and/or movement) using the one or more cameras facing the user. In some embodiments in which the display generation component is a head-mounted display worn on the user's head, content that is visible in the environment corresponds to the user's field of view when wearing the head-mounted display, and the computer system is enabled to detect inputs involving the user's gaze using one or more cameras and/or eye-tracking devices facing inward toward the user's face, whereas the computer system is enabled to detect inputs involving the user's hands using one or more cameras facing outward from the user's head.

While a view of an environment is visible via the display generation component (e.g., the environment being a two-dimensional or three-dimensional environment that includes one or more computer-generated portions and optionally one or more passthrough portions), the computer system detects (802) a first gaze input (e.g., a gaze of a user) directed to a first location in the environment. The first location corresponds to a first user interface element. For example, as described herein with reference to FIG. 7B, computer system 101 detects user 7002's gaze directed to element E1 of application user interface 7010.

In response to detecting the first gaze input (804): in accordance with a determination that a hand of a user is in a predefined configuration (e.g., a ready state) during the first gaze input (e.g., during at least a portion of the time that the user's gaze is directed to the first location) (806): The computer system provides (808), to the first user interface element (or to an application associated with the first user interface element), first gesture information that includes first information about the first gaze input. For example, as described herein with reference to FIG. 7C (e.g., FIGS. 7C1-7C3), in response to detecting user 7002's gaze directed to element E1 of application user interface 7010, and in accordance with a determination that user 7002's hand 7020 is in state "S0," computer system 101 provides gesture information about the user input of hand 7020 to software associated with element E1 (e.g., the software application of application user interface 7010). After providing the first gesture information that includes the first information about the first gaze input to the first user interface element, the computer system detects (810) the first gaze input moving to a second location in the environment while the user's hand is maintained in the predefined configuration. The second location is different from the first location. In response to detecting the first gaze input moving to the second location in the environment while the user's hand is maintained in the predefined configuration: the computer system provides (812), to a second user interface element that corresponds to the second location in the environment, second gesture information that includes second information about the first gaze input (e.g., about the first gaze input as directed to the second location). For example, as described herein with reference to FIG. 7D, computer system 101 detects user 7002's gaze moving from element E1 to element E2 of application user interface 7010 while user 7002's hand is maintained in state "S0" and, in response, provides gesture information about the user input of hand 7020 to software associated with element E2 (e.g., the software application of application user interface 7010). In another example, as described herein with reference to FIG. 7E, computer system 101 detects user 7002's gaze moving from application user interface 7010 to speaker 7012 while user 7002's hand is maintained in state "S0" and, in response, provides gesture information about the user input of hand 7020 to software associated with speaker 7012. In some embodiments, the second user interface element is different from the first user interface element. In some embodiments, the second user interface element is the same as the first user interface element (e.g., if the gaze moved to a different location within the same user interface element). In some embodiments, gesture information that is provided to a user interface element (or to an application associated with the user interface element) includes position information, movement, duration, and/or movement path or pattern information about the user's gaze and/or hand.

In response to detecting the first gaze input (804): in accordance with a determination that the hand of the user is not in the predefined configuration during (e.g., any portion of) the first gaze input: the computer system forgoes (814) providing (e.g., any) gesture information to the first user interface element about the first gaze input (e.g., including forgoing providing information about the first gaze input to the first user interface element or to an application associated with the first user interface element). For example, as described herein with reference to FIG. 7F, in response to detecting user 7002's gaze directed to element E2 of application user interface 7010, and in accordance with a determination that hand 7020 is not in state "S0," computer system 101 does not provide gesture information about the user input of hand 7020 to software associated with element E2 (e.g., the software application of application user interface 7010).

Requiring that the user's hand be in a state that indicates readiness to interact in order to provide gesture information about a gaze input, and providing the gesture information to different targets based on where the gaze input is directed provides improved security and privacy by not delivering particular user data, such as information about an input that the user is providing, to software that the user is not indicating intent to interact with and thus does not have a need for the particular user data. In general, reducing the quantity and/or specificity of gaze data provided to applications improves the security and privacy of the device by avoiding providing unnecessarily detailed information to the application that the user is interacting with. In particular, detailed gaze information can be used to determine which portions of the user interface the user is interacting with, interested in, and in some circumstances can be used to help identify the user. Reducing the quantity and/or specificity of gaze data provided to the application reduces the information that is available to the application to determine information about the user unless the user has provided some active indication of intent to interact with the application, at which point gaze information that is necessary to effectively interact with the application is provided to the application to enable the user to interact with the application quickly and efficiently, thereby improving user interaction with the device while improving device privacy and security.

In some embodiments, the computer system detects that the user's hand is no longer in the predefined configuration (e.g., while detecting the first gaze input, and optionally after providing the second gesture information). In some embodiments, the computer system detects that the user's hand is no longer in the predefined configuration after determining that the user's hand is in the predefined configuration during the first gaze input or after providing the first gesture information, and in some such embodiments the computer system does not detect the first gaze input moving to the second location while the user's hand is maintained in the predefined configuration and does not perform the described operations (e.g., operation 812) in response. In some embodiments, in response to detecting that the hand is no longer in the predefined configuration: the computer system ceases to provide gesture information that includes information about the first gaze input to a user interface element that corresponds to a location to which the first gaze input is directed. For example, as described herein with reference to FIG. 7F, computer system 101 ceases to provide gesture information about the user input of hand 7020 to software associated with element E2 (e.g., the software application of application user interface 7010) in accordance with a determination that hand 7020 has transitioned out of state "S0." In some embodiments, the computer system ceases to provide gesture information that includes information about the first gaze input to any user interface element (e.g., regardless of whether a gaze input is currently directed to a user interface element and/or regardless of which user interface element a current gaze input is directed to). Ceasing to provide gesture information about a gaze input if, during the gaze input, the user's hand ceases to be in a state that indicates readiness to interact provides improved security and privacy by not delivering user data, such as information about inputs that the user is providing, to software that the user has ceased to indicate intent to interact with and thus no longer has a need for the user data.

In some embodiments, a failure to detect a hand (e.g., either hand) of the user occurs (e.g., after the providing of the first gesture information and/or the second gesture information). In some embodiments, in response to the failure to detect a hand of the user: the computer system ceases to provide gesture information that includes information about the first gaze input to a user interface element that corresponds to a location to which the first gaze input is directed. For example, as described herein with reference to FIG. 7F, computer system 101 ceases to provide gesture information about the user input of hand 7020 to software associated with element E2 (e.g., the software application of application user interface 7010) in accordance with a determination that computer system 101 has ceased to detect hand 7020. In some embodiments, the computer system fails to detect the user's hand because the user's hand has moved out of range of a sensor (e.g., an optical sensor, a touch-sensitive surface, a proximity sensor, or other sensor), of the one or more input devices, via which the user's hand was being detected. In some embodiments, the computer system fails to detect the user's hand due to a failure, temporary or otherwise, of the sensor. In some embodiments, while the hand is not detected, gesture information that includes information about a current gaze input is not provided. Ceasing to provide gesture information about a gaze input if, during the gaze input, the user's hand ceases to be detected provides improved security and privacy by not delivering particular user data, such as information about an input that the user is providing, to software associated with interaction targets in the environment if the computer system is unable to clearly determine that the user is intending to interact with a particular target, in which case the software does not have a definite need for the particular user data.

In some embodiments, after detecting the first gaze input moving to the second location in the environment while the user's hand is maintained in the predefined configuration (and optionally after providing the second gesture information to the second user interface element): while the first gaze input is directed to the second location (e.g., a target corresponding to the second location is selected for potential further interaction based on the user's gaze being directed to the second location and the user's hand being in the predefined configuration), the computer system detects an input (e.g., an input that corresponds to user interaction with the device, sometimes referred to as an interaction input), wherein a first portion of the input includes a change in configuration of the user's hand from the predefined configuration when the user's hand is at a first position relative to the environment, and a second portion of the input (e.g., that follows the first portion) includes movement of the user's hand to a second position relative to the environment. In some embodiments, the input includes a gesture performed by the user's hand (e.g., an air pinch or air tap gesture). In some embodiments, in response to detecting the input, the computer system provides gesture information based on one or more locations of the user's hand relative to the environment during the input, including: providing, to the second user interface element, gesture information that includes information about the first position of the user's hand relative to the environment; and providing, to a respective user interface element that corresponds to the second position of the user's hand relative to the environment, gesture information that includes information about the second position of the user's hand relative to the environment. For example, as described herein with reference to FIGS. 7G-7I, computer system 101 provides, to the software application of application user interface 7010, gesture information about the interaction input of hand 7020 based on the location and/or movement of hand 7020. In some embodiments, the movement of the user's hand during the input is part of a drag input to move the second user interface element to a different location in the environment. In some embodiments, during the first portion of the input, the gesture information that includes information about the current position of the user's hand relative to the environment is provided to a first application then associated with the second user interface element. In some embodiments, during the second portion of the input, the gesture information that includes information about the current position of the user's hand is provided to a different second application to which the second user interface element is dragged (e.g., over which the second user interface element is then being held). Transitioning from providing gesture information about an input initially based on where the user's gaze is directed, while the user indicates readiness to interact, to providing gesture information based on the position and/or movement of the user's hand, once the user has initiated an interaction, causes the device to automatically determine the target of an interaction with greater precision by using gaze and to locate the interaction faster by using hand position and/or movement, thereby reducing an amount of time needed to perform a particular operation on the device In some embodiments, the hand of the user is a first hand of the user. In some embodiments, while detecting the first gaze input directed to a respective location in the environment, the computer system: detects that a second hand of the user is in the predefined configuration; and, in response to detecting that (and while) the user's second hand is in the predefined configuration: provides, to a respective user interface element that corresponds to the respective location in the environment (e.g., to which the first gaze input is directed when the second hand of the user is detected in the predefined configuration), third gesture information that includes information about the first gaze input. For example, as described herein with reference to FIG. 7I, while user 7002's gaze is directed to close button 7016, and in accordance with a determination that user 7002's hand 7022 is in state "S0," computer system 101 provides gesture information about the user input of hand 7022 to software associated with close button 7016. Providing other gesture information about a gaze input if a user's other hand is in a state that indicates readiness to interact causes the device to automatically support multiple concurrent inputs, thereby providing additional control options without displaying additional controls.

In some embodiments, the first gesture information and the second gesture information are part of a first event stream that is associated with the first hand of the user, and the third gesture information is part of a second event stream that is associated with the second hand of the user. In some embodiments, the first event stream is distinct from the second event stream. For example, as described herein with reference to FIG. 7I, the gesture information for the user input of hand 7020 is optionally delivered in a different input event stream from the gesture information for the user input of hand 7022. Providing gesture information associated with different hands in different event streams causes the device to automatically distinguish between different inputs more easily so as to make input processing and recognition more efficient, thereby reducing an amount of time needed to perform a particular operation on the device.

In some embodiments, while the user's first hand is in the predefined configuration and the user's second hand is in the predefined configuration, the first event stream is provided concurrently with providing the second event stream. In some embodiments, the first event stream and second event stream are provided to the respective user interface element to which the first gaze input is directed, or more generally to the application, concurrently. For example, as described herein with reference to FIG. 7I, the input event stream for the gesture information for the user input of hand 7020 is optionally delivered concurrently with the input event stream for the gesture information for the user input of hand 7022. Providing gesture information associated with different hands in different event streams concurrently causes the device to automatically distinguish between different concurrent inputs more easily so as to make input processing and recognition more efficient, thereby reducing an amount of time needed to perform a particular operation on the device.

In some embodiments, while providing the first event stream concurrently with providing the second event stream: in accordance with a determination that the first hand has ceased to be detected while the second hand continues to be detected in the predefined configuration, the computer system ceases to provide the first event stream, and continues to provide the second event stream; and, in accordance with a determination that the second hand has ceased to be detected while the first hand continues to be detected in the predefined configuration, the computer system ceases to provide the second event stream, and continues to provide the first event stream. For example, as described herein with reference to FIG. 7I, the input event stream corresponding to hand 7020 is stopped if hand 7020 ceases to be detected, and the input event stream corresponding to hand 7022 is stopped if hand 7022 ceases to be detected. While providing gesture information associated with different hands in different event streams, ceasing to provide an event stream for a hand that has ceased to be detected provides improved security and privacy by not delivering particular user data, such as information about an input that the user is providing, to software associated with interaction targets in the environment if the computer system is unable to clearly determine that the user is intending to interact with a particular target, in which case the software does not have a definite need for the particular user data.

In some embodiments, while providing the first event stream concurrently with providing the second event stream: in accordance with a determination that the first hand has changed configuration to initiate an input while the second hand continues to be detected in the predefined configuration, the computer system: provides the first event stream associated with the first hand, including providing gesture information for the first hand based on a current position of the first hand relative to the environment; and provides the second event stream associated with the second hand, including providing gesture information for the first hand based on a current location in the environment to which the first gaze input is directed. In some embodiments, while providing the first event stream concurrently with providing the second event stream: in accordance with a determination that the second hand has changed configuration to initiate an input while the first hand continues to be detected in the predefined configuration, the computer system: provides the first event stream associated with the first hand, including providing gesture information for the first hand based on a current location in the environment to which the first gaze input is directed; and provides the second event stream associated with the second hand, including providing gesture information for the second hand based on a current position of the second hand relative to the environment. For example, as described herein with reference to FIG. 7I, the input event stream for the interaction input performed by hand 7020 is based on the location and/or movement of hand 7020, whereas the input event stream for the user input corresponding to hand 7022 and indicating readiness to interact is based on the location and/or movement of user 7002's gaze. In some embodiments, if both the first hand and the second hand change configuration to initiate respective inputs, the first event stream associated with the first hand provides gesture information for the first hand based on a current position of the first hand relative to the environment, and the second event stream associated with the second hand provides gesture information for the second hand based on a current position of the second hand relative to the environment. While providing different event streams of gesture information associated with different hands, transitioning the event stream for one hand from providing gesture information based on where the user's gaze is directed to providing gesture information based on the position and/or movement of the hand, while continuing to provide the gesture information in the event stream for the other hand based on where the user's gaze is directed, causes the device to automatically support multiple concurrent inputs, thereby providing additional control options without displaying additional controls.

In some embodiments, the first location in the environment is a location within a user interface of a first application executing on the computer system (e.g., the first user interface element is part of the user interface of the first application), and providing the first gesture information to the first user interface element provides the first gesture information to the first application; the second location in the environment is a location within a user interface of a second application executing on the computer system (e.g., the second user interface element is part of the user interface of the second application), and providing the second gesture information to the second user interface element provides the second gesture information to the second application (e.g., instead of the first application). For example, as described herein with reference to FIG. 7E, in response to detecting user 7002's gaze moving from application user interface 7010 to speaker 7012 while hand 7020 is maintained in state "S0," computer system 101 provides gesture input about the user input of hand 7020 to software associated with speaker 7012 instead of to the software application of application user interface 7010, based on the changed location of user 7002's gaze. Changing the target application to which gesture information about a gaze input is delivered, while the user's hand remains in a state that indicates readiness to interact (e.g., whether or not a location of the user's hand has changed), provides improved security and privacy by changing which target receives particular user data, such as information about an input that the user is providing, so as not to deliver the particular user data to software that the user is not indicating intent to interact with and thus does not have a need for the particular user data.

In some embodiments, the first gaze input and the user's hand are detected using one or more input devices (e.g., eye-tracking devices and/or optical sensors) other than a touch-sensitive input device. In some embodiments, providing respective gesture information that includes information about the first gaze input includes providing information about a simulated touch input that corresponds to the first gaze input. In some embodiments, information provided about a simulated touch input is or includes one or more touch events, optionally of a type selected from a plurality of predefined touch event types. In some embodiments, information provided about a simulated touch input that corresponds to the first gaze input represents a hover phase of the simulated touch input (e.g., representing a touch input that is proximate to but not in contact with a touch-sensitive surface) and optionally is or includes a hover event. For example, the first gesture information describes a hover phase of a simulated touch input at the first location in the environment (e.g., based on the first gaze input being directed to the first location while the user's hand is in the predefined configuration, indicating readiness to interact). In another example, the second gesture information describes a hover phase of a simulated touch input at the second location in the environment. In some embodiments, information about an input that is provided as information about a simulated touch input is provided using a software framework configured to provide a plurality of software applications of the computer system with an interface for receiving touch inputs.

In some embodiments, providing respective gesture information that includes information about a respective position of a respective hand of the user includes providing information about a simulated touch input that corresponds to the respective hand of the user. In some embodiments, information provided about a simulated touch input that corresponds to a respective hand of the user, such as the gesture information provided in response to the input, represents one or more phases of a simulated touch input that has made contact with a touch-sensitive surface. Example phases include touch began (e.g., representing initial contact of a touch input), touch changed (e.g., representing movement or another change in the touch input), and touch end (e.g., representing liftoff of the touch input) phases of the simulated touch input. In some embodiments, the information provided about the simulated touch input includes one or more touch events, such as any combination of touch began, touch changed, and/or touch end events as appropriate for describing the corresponding input. For example, the gesture information that is provided in response to the input is provided as a simulated touch input (e.g., for a touch input that has made contact) at the second location in the environment, optionally using a touch began event, followed by movement of the simulated touch input based on the movement of the user's hand from the first position to the second position (e.g., a swipe or drag touch input), optionally using a touch changed event.

For example, as described herein with reference to FIGS. 7C-7F, gesture information about a user input that indicates user 7002's readiness to interact is optionally delivered as a hover phase touch event based on the location of user 7002's gaze (e.g., with a "hover begin" phase value for the initial indication of readiness, a "hover stationary" phase value for an ongoing readiness input for which user 7002's gaze has not moved or a "hover changed" phase value for an ongoing readiness input for which user 7002's gaze has moved, or a "hover end" phase value for a readiness input that has ceased to be detected). In other examples, as described herein with reference to FIGS. 7G-7I, gesture information about an interaction input is optionally delivered as a touch phase touch event based on the location of a hand of user 7002 (e.g., with a "touch begin" phase value for the initiation of an interaction input, a "touch stationary" phase value for an ongoing interaction input for which user 7002's hand has not moved, a "touch changed" phase value for an ongoing interaction input for which user 7002's hand has moved, or a "touch end" phase value for an interaction input that has concluded).

For an input other than a touch-input, including an input that is based on a user's gaze and the user's hand being in a configuration that indicates the user's readiness to interact with the computer system, providing gesture information about the input such that the input simulates a touch input provides consistent information about different types of inputs (e.g., touch or otherwise) to enable a device to seamlessly support multiple different types of inputs so as to make input processing and recognition more efficient, thereby reducing an amount of time needed to perform a particular operation on the device.

In some embodiments, aspects/operations of methods 900, 1000, 1100, and 1200 may be interchanged, substituted, and/or added between these methods. For example, the determination whether the user's hand is in the predefined configuration or not in method 800 is used to determine whether to provide the input information of method 1100 based on gaze or hand movement, as in method 900, and/or whether direct or indirect manipulation is requested, as in method 1000, and/or whether an object responds to an input directed to the object, as in method 1200. For brevity, these details are not repeated here.

FIG. 9 is a flow diagram of an exemplary method 900 for providing gesture information for an input using a consistent identifier for both a portion that is based on the location of the user's gaze and a portion that is based on the movement of the user's hand, in accordance with some embodiments. In some embodiments, method 900 is performed at a computer system (e.g., computer system 101 in FIG. 1A) that is in communication with a display generation component (e.g., display generation component 120 in FIGS. 1, 3, and 4) (e.g., a heads-up display, a head-mounted device, a display, a touchscreen, a projector, or the like) and one or more input devices (e.g., one or more cameras (e.g., color sensors, infrared sensors, structured light scanners, and/or other depth-sensing cameras) that point downward at a user's hand, forward from the user's head, and/or that faces the user; eye-tracking devices; user-held and/or user-worn controllers; and/or other input hardware). In some embodiments, the method 900 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 900 are, optionally, combined and/or the order of some operations is, optionally, changed.

In some embodiments in which the display generation component is a touchscreen or display held by or positioned in front of the user, content that is visible in the environment is displayed on the touchscreen or display or visible via a transparent or partially transparent portion thereof. In some such embodiments, the computer system is enabled to detect inputs involving the user's gaze (e.g., location and/or movement) using one or more cameras and/or eye-tracking devices facing the user. In some such embodiments, the computer system is also enabled to detect inputs involving the user's hands (e.g., location and/or movement) using the one or more cameras facing the user. In some embodiments in which the display generation component is a head-mounted display worn on the user's head, content that is visible in the environment corresponds to the user's field of view when wearing the head-mounted display, and the computer system is enabled to detect inputs involving the user's gaze using one or more cameras and/or eye-tracking devices facing inward toward the user's face, whereas the computer system is enabled to detect inputs involving the user's hands using one or more cameras facing outward from the user's head.

While a view of an environment is visible via the display generation component (e.g., the environment being a two-dimensional or three-dimensional environment that includes one or more computer-generated portions and optionally one or more passthrough portions), the computer system detects (902) a first input (e.g., a first portion of the first input), including detecting that a gaze of a user is directed toward the environment. In some embodiments, detecting the first input includes detecting that the user's hand is in a ready state or detecting the performance of a predefined gesture (e.g., an air pinch gesture or an air tap gesture) to initiate interaction.

In response to detecting the first input (904): the computer system initiates (906) a first interaction with a target of the first input and updates the view of the environment to indicate the initiated first interaction. The target of the first input is determined based on (e.g., is positioned at or otherwise associated with) a first respective location in the environment to which the user's gaze is directed while the first input is detected, and the initiated first interaction is associated with a first input identifier for the first input. In some embodiments, initiating an interaction with the target of an input includes providing information about the input to the target, wherein the provided information includes the input identifier for the input and/or a current location in the environment to which the user's gaze is directed. In some embodiments, updating the view of the environment to indicate the initiated interaction includes displaying a visual indication of which element is the target of the interaction (e.g., by highlighting, outlining, and/or otherwise visually emphasizing the selected target).

For example, as described herein with reference to FIG. 7D, computer system 101 detects an input that includes user 7002's gaze directed to element E2 of application user interface 7010 with hand 7020 in state "S0" (e.g., a ready state) and, in response, initiates an interaction with element E2, determined to be the target of the input based on the location of user 7002's gaze; gesture information delivered about the interaction corresponding to hand 7020 includes and is identified by the input identifier "A."

The computer system detects (908) a continuation of the first input (e.g., a second portion of the first input, beginning while the user's gaze is directed to the first respective location in the environment, and continuing whether or not the user's gaze remains directed to the first respective location in the environment), including detecting movement of a first hand of the user. In some embodiments, detecting the first input includes detecting the user's readiness to interact with the target of the first input, and detecting the continuation of the first input includes detecting an input directed to the target of the first input. In some embodiments, detecting the continuation of the first input (e.g., detecting the input) includes detecting a change in configuration of the first hand from a ready state, such as performance of a predefined gesture starting from the ready state (e.g., the beginning of the input), followed by the movement of the first hand (e.g., a continuation of the input). For example, as described herein with reference to FIG. 7G illustrating an example transition from FIG. 7D, computer system 101 detects an input that includes user 7002 initiating an interaction input by transitioning hand 7020 from state "S0" to a predefined interaction state and/or by performing a predefined interaction gesture while user 7002's gaze is directed to element E2 of application user interface 7010

(FIG. 7G), followed by user 7002 moving hand 7020 as the interaction input continues (FIGS. 7H-7I).

In response to detecting the continuation of the first input (910): the computer system continues (912) the first interaction with the target of the first input and updates the view of the environment to indicate the continued first interaction, based on the movement of the user's first hand (e.g., in physical space) (e.g., without regard to where the user is gazing). The continued first interaction is associated with the first input identifier (e.g., the same first input identifier as when the first interaction was initiated). For example, as described herein with reference to FIGS. 7H-7I, in response to the interaction input corresponding to hand 7020 continuing, application user interface 7010 is progressively scrolled, and gesture information (e.g., one or more additional touch events) that is provided for the continuing portions of the interaction input of hand 7020 includes and is identified by the same input identifier "A" as for the portion of the interaction input described herein with reference to FIG. 7G. In some embodiments, continuing an interaction with a target includes providing additional information about the input to the target, wherein the provided additional information includes the same input identifier for the input as when the interaction was initiated and/or location information based on a current location of the user's hand associated with the input (e.g., a current location in the environment corresponding to a current location of the user's hand in physical space, where an amount of movement of the current location in the environment is optionally accelerated relative to an amount of movement of the hand in physical space). In some embodiments, the location information for the continued interaction is independent of and optionally does not include the location to which the user's gaze is directed.

Transitioning from providing information about an input initially based on where the user's gaze is directed while the user indicates intent to interact to subsequently based on the movement of the user's hand once the user has initiated an interaction causes the device to automatically determine the target of an interaction with greater precision by using gaze and to detect movement of the interaction faster by using hand movement, while using a consistent input identifier for both phases of the input to make input processing and recognition more efficient, thereby reducing an amount of time needed to perform a particular operation on the device.

In some embodiments, while a view (e.g., the same view or a different view) of the environment is visible via the display generation component, the computer system detects a second input (e.g., different from the first input), including detecting that the gaze of the user is directed toward the environment. In some embodiments, in response to detecting the second input, the computer system initiates a second interaction with a target of the second input and updates the view of the environment to indicate the initiated second interaction, wherein the target of the second input is determined based on (e.g., is positioned at or otherwise associated with) a second respective location in the environment to which the user's gaze is directed when the second input is detected, and the initiated second interaction is associated with a second input identifier for the second input, wherein the second input identifier is different from the first input identifier. For example, as described herein with reference to FIG. 7I, computer system 101 detects a second input that includes user 7002's gaze directed to close button 7016 with hand 7022 in state "S0" (e.g., a ready state) and, in response, initiates an interaction with close button 7016, determined to be the target of the second input based on the location of user 7002's gaze; gesture information delivered about the input corresponding to hand 7022 includes and is identified by a different input identifier, "B," from that of the interaction corresponding to hand 7020. Using different input identifiers for different inputs causes the device to automatically distinguish between different inputs more easily so as to make input processing and recognition more efficient, thereby reducing an amount of time needed to perform a particular operation on the device.

In some embodiments, the computer system detects a continuation of the second input (e.g., a second portion of the second input, beginning while the user's gaze is directed to the second respective location in the environment to which the user's gaze is directed when the second input is detected, and continuing whether or not the user's gaze remains directed to the second respective location in the environment), including detecting movement of a second hand of the user (e.g., different from the first hand associated with the first input). In some embodiments, in response to detecting the continuation of the second input: the computer system continues the second interaction with the target of the second input and updates the view of the environment to indicate the continued second interaction, based on the movement of the user's second hand, wherein the continued second interaction is associated with the second input identifier. For example, as described herein with reference to FIG. 7I, in response to user 7002 subsequently performing a continuation of the input corresponding to hand 7022 by moving hand 7022 (e.g., to perform an activation input), close button 7016 would be activated, and application user interface 7010 would be closed; gesture information (e.g., one or more additional touch events) that is provided for the continuing portion of the input of hand 7022 would include and be identified by the same input identifier "B" as for the portion of the input described herein with reference to the scenario shown in FIG. 7I. When using different input identifiers for different inputs, using the same input identifier for different phases of a same input (e.g., an initial phase based on gaze and a subsequent phase based on hand movement) causes the device to automatically identify inputs more consistently while distinguishing between different inputs more easily so as to make input processing and recognition more efficient, thereby reducing an amount of time needed to perform a particular operation on the device.

In some embodiments, in response to detecting the continuation of the first input, the computer system provides, to an application associated with the target of the first input, an input event indicating that the computer system is transitioning from detecting the first input based on a location of the user's gaze to detecting the first input based on a location of the user's first hand (e.g., the touch event with phase value "touch begin" or a separate touch event indicating the transition, as described herein with reference to FIG. 7G). In some embodiments, the computer system transitions from detecting the first input based on the location of the user's gaze to detecting the first input based on the location of the user's first hand in accordance with a determination that the continuation of the first input includes a predefined change in hand configuration, predefined gesture, and/or the beginning of an input directed to the target of the first input. Providing an input event indicating that the input has transitioned from being based on where the user's gaze is directed to being based on the movement of the user's hand provides the receiving software with information that makes input processing and recognition more efficient.

In some embodiments, detecting the continuation of the first input (e.g., which triggers the transition from the first input being gaze-based to the first input being hand location-based and/or hand movement-based) includes detecting a change in configuration of the first hand (e.g., from a first predefined configuration, to a second predefined configuration, and/or via performance of a predefined gesture such as an air pinch or air tap), as described herein with reference to FIGS. 7G and 7I. In some embodiments, the change in configuration is from a ready state to a configuration other than the ready state. In some embodiments, detecting the change in configuration of the first hand includes detecting the first hand performing a predefined gesture. Transitioning from providing information about an input based on where the user's gaze is directed to providing information about the input based on the movement of the user's hand reduces the number and extent of inputs needed to switch between different interaction modes.

In some embodiments, a respective input (or a portion of a respective input) whose target is determined based on a location in the environment to which the user's gaze is directed while the respective input (or the portion of the respective input) is detected corresponds to a hover input that indicates the user's readiness to interact with the target (e.g., as described herein with reference to the hover phase touch events for the readiness input corresponding to hand 7020 in FIGS. 7C-7E and for the readiness input corresponding to hand 7022 in FIG. 7I). During an input that indicates a user's readiness to interact, also called a hover input, selecting the target of the input based on where the user's gaze is directed enables the user to consider different targets in the environment with a form of input that involves less effort than the type of input required to actually initiate an interaction with the target, thereby reducing an amount of time needed to perform a particular operation on the device.

In some embodiments, a continuation of a respective input that continues an interaction with a target based on movement (e.g., changes in location relative to the environment) of a respective hand of the user corresponds to a move input that manipulates the target (e.g., selecting, deselecting, repositioning, resizing, scrolling, and/or rotating the target) (e.g., as described herein with reference to the touch phase touch events for the interaction input corresponding to hand 7020 in FIGS. 7G-7I and for the interaction input corresponding to hand 7022 in an example transition from FIG. 7I). In response to an input during which interaction has been initiated with a target, also called a move input, manipulating the target of the input based on the movement of the user's hand causes the device to automatically require a more deliberate form of input to interact with a target than the type of input required to merely select, without yet interacting with, a target.

In some embodiments, the first input and the continuation of the first input are processed using one or more gesture recognizers, wherein a respective gesture recognizer of the one or more gesture recognizers has a respective state determined by the respective gesture recognizer. In some embodiments, detecting the first input includes transitioning a first gesture recognizer of the one or more gesture recognizers to a state that indicates that the input has been recognized by the first gesture recognizer (e.g., a state indicating that the first gesture recognizer has begun to recognize the first input). In some embodiments, detecting the continuation of the first input includes maintaining the first gesture recognizer in a state that indicates that the input has been recognized by the first gesture recognizer (e.g., maintaining the first gesture recognizer in the same state as when the first input was initially detected, or transitioning the first gesture recognizer to another state that also indicates that the input has been recognized by the first gesture recognizer (e.g., a state indicating that the first input continues to be recognized by the first gesture recognizer)). Using gesture recognizers to recognize inputs, where the gesture recognizers have a plurality of available states that indicate current gesture recognition status, is described in more detail herein with reference to FIG. 7A (and FIGS. 7A-7X more generally). Using gesture recognizers that transition between multiple possible gesture recognition states to process and recognize inputs, including inputs involving gaze and/or hand movement, reduces the computational load imposed on the computer system by inputs, thereby improving device responsiveness and reducing latency.

In some embodiments, detecting the first input includes detecting movement of the user's gaze by a first amount to the first respective location. In some embodiments, the target of the first input is determined based on a second amount of movement of the user's gaze (e.g., to the first respective location). In some embodiments, in response to detecting the first input, information about the first input, including the second amount of movement of the user's gaze, is provided to the target of the first input (e.g., a user interface object corresponding to the first respective location, or an application associated with that user interface object). In some embodiments, the detected movement of the first hand of the user is a third amount of hand movement, and updating the view of the environment to indicate the continued first interaction is performed based on a fourth amount of hand movement. In some embodiments, the fourth amount of hand movement is increased relative to the third amount of hand movement more than the second amount of movement of the user's gaze is increased relative to the first amount of movement of the user's gaze. In some embodiments, in response to detecting the continuation of the first input, information about the continuation of the first input, including the fourth amount of movement of the user's hand, is provided to the target. In some embodiments, updates in the view of the environment that are based on information about the user's hand are based on an amount of hand movement that is more accelerated relative to the amount of physical movement of the user's hand in physical space, whereas updates that are based on information about the user's gaze (e.g., changing which target is selected for interaction) are based on an amount of gaze movement that is less accelerated relative to the amount of physical movement of the user's gaze in physical space. Using accelerated hand-based location and/or movement information is described in more detail herein with reference to FIGS. 7H-7I and 7L. Moving a target input location in a three-dimensional environment more in response to a hand movement input than the actual amount of physical hand movement reduces the extent of inputs needed to interact with different locations in the three-dimensional environment, particularly if the range of available interaction locations in the three-dimensional environments is greater than the extent of the user's reach.

In some embodiments, the second amount of movement of the user's gaze is the same as the first amount of movement of the user's gaze (e.g., information about the user's gaze is directly based on the amount of physical gaze movement, without acceleration or lag applied). Using unaccelerated gaze-based location information is described in more detail herein with reference to FIGS. 7C-7E. Moving a target input location in the three-dimensional environment in response to movement of a user's gaze by an amount that is the same as the amount of gaze movement, including for example by setting the target input location to the current location of the user's gaze, causes the device to automatically select the target of an input with greater precision and accuracy to the user's intent, thereby reducing an amount of time needed to perform a particular operation on the device.

In some embodiments, in response to detecting the continuation of the first input, the computer system provides, to software associated with the target of the first input (e.g., application software, operating system software, or a software module or element thereof), information that includes the fourth amount of hand movement. In some embodiments, the computer system receives, from the software associated with the target of the first input, a request for additional information about the movement of the user's first hand. In some embodiments, the request for the additional information about the movement of the user's first hand is received from the software associated with the target after (e.g., in response to) providing the information that includes the fourth amount of hand movement to the software associated with the target. In some embodiments, the request for the additional information about the movement of the user's first hand is received in accordance with a setting configured by the software associated with the target (e.g., set using an application programming interface between application software and software for the one or more input devices of the computer system) to receive, automatically, unaccelerated hand movement and/or location information instead of or in addition to accelerated hand movement and/or location information. In some embodiments, in response to receiving the request for the additional information about the movement of the user's first hand, the computer system provides, to the software associated with the target of the first input, information that includes the third amount of hand movement (e.g., unaccelerated hand movement). For example, as described herein with reference to FIG. 7L in light of FIGS. 7G-7I, the software application of application user interface 7010 is enabled to request unaccelerated hand movement information about the actual amount of movement of hand 7020, in addition to and/or in response to receiving accelerated hand movement information. Providing, to software associated with the target of an input that includes hand movement, accelerated hand movement information that indicates a greater amount of hand movement than the actual amount of physical hand movement, and allowing the software to request unaccelerated hand movement information that indicates the actual amount of physical hand movement, reduces the extent of inputs needed to interact with different locations in the three-dimensional environments yet provides the software with greater flexibility to provide a user with more precise control.

In some embodiments, the first input is detected using one or more input devices other than a touch-sensitive input device. In some embodiments, in response to detecting the first input, the computer system provides, to the target of the first input, first information about a simulated touch input that corresponds to the first input (e.g., as part of initiating the first interaction with the target of the first input). In some embodiments, in response to detecting the continuation of the first input, the computer system provides, to the target of the first input, second information about the simulated touch input that corresponds to the continuation of the first input (e.g., as part of continuing the first interaction with the target of the first input). In some embodiments, respective information about the simulated touch input is provided using a software framework configured to provide a plurality of software applications of the computer system with an interface for receiving touch inputs, where information about a non-touch input is converted into information that describes touch inputs, to thereby simulate the non-touch input as a touch input. In some embodiments, information provided about a simulated touch input is or includes one or more touch events, optionally of a type selected from a plurality of predefined touch event types (e.g., hover events, touch begin events, touch changed events (such as touch moved events), touch stationary events, touch end events, and/or touch cancel events). For example, the first information includes a hover event and/or a touch begin event describing an initial portion of the first input. In another example, the second information includes touch stationary, touch changed, touch end, or touch cancel events describing a subsequent portion of the first input. Providing gesture information about user inputs that simulate the user inputs as touch inputs, including providing different sets of gesture information for different portions of a continuing input, is described in more detail herein with reference to the inputs of FIGS. 7C-7I. For an input other than a touch-input, including an input that is initially based on a user's gaze and subsequently based on the location and/or movement of the user's hand, providing gesture information about the input such that the input simulates a touch input provides consistent information about different types of inputs (e.g., touch or otherwise) to enable a device to seamlessly support multiple different types of inputs so as to make input processing and recognition more efficient, thereby reducing an amount of time needed to perform a particular operation on the device.

In some embodiments, aspects/operations of methods 800, 1000, 1100, and 1200 may be interchanged, substituted, and/or added between these methods. For example, the use of a same input identifier for information about an input that is based on gaze and for information about a continuation of the input that is based on hand movement, as in method 900, correlates different instances of the input information of method 1100 that are based on the same input. For brevity, these details are not repeated here.

FIG. 10 is a flow diagram of an exemplary method 1000 for selecting a target of an input based on different features of the user depending on the object manipulation input mode being used, in accordance with some embodiments. In some embodiments, method 1000 is performed at a computer system (e.g., computer system 101 in FIG. 1A) that is in communication with a display generation component (e.g., display generation component 120 in FIGS. 1, 3, and 4) (e.g., a heads-up display, a head-mounted device, a display, a touchscreen, a projector, or the like) and one or more input devices (e.g., one or more cameras (e.g., color sensors, infrared sensors, structured light scanners, and/or other depth-sensing cameras) that point downward at a user's hand, forward from the user's head, and/or that faces the user; eye-tracking devices; user-held and/or user-worn controllers; and/or other input hardware). In some embodiments, the method 1000 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 1000 are, optionally, combined and/or the order of some operations is, optionally, changed.

In some embodiments in which the display generation component is a touchscreen or display held by or positioned in front of the user, content that is visible in the environment is displayed on the touchscreen or display or visible via a transparent or partially transparent portion thereof. In some such embodiments, the computer system is enabled to detect inputs involving the user's gaze (e.g., location and/or movement) using one or more cameras and/or eye-tracking devices facing the user. In some such embodiments, the computer system is also enabled to detect inputs involving the user's hands (e.g., location and/or movement) using the one or more cameras facing the user. In some embodiments in which the display generation component is a head-mounted display worn on the user's head, content that is visible in the environment corresponds to the user's field of view when wearing the head-mounted display, and the computer system is enabled to detect inputs involving the user's gaze using one or more cameras and/or eye-tracking devices facing inward toward the user's face, whereas the computer system is enabled to detect inputs involving the user's hands using one or more cameras facing outward from the user's head.

While a view of an environment is visible via the display generation component (e.g., the environment being a two-dimensional or three-dimensional environment that includes one or more computer-generated portions and optionally one or more passthrough portions), the computer system receives (1002), via the one or more input devices, an input that indicates a user's readiness to interact with the view of the environment.

In response to receiving the input that indicates the user's readiness to interact with the view of the environment (1004): in accordance with a determination that the input corresponds to a request for direct manipulation of the view of the environment (e.g., and not for indirect manipulation), the computer system displays (1006) a visual indication that a target user interface object is selected for the direct manipulation (e.g., by highlighting; changing color, opacity, blurring, shadow, and/or other visual property; displaying a selection outline; and/or creating a three-dimensional visual effect, such as of the target user interface object moving forward or backward, changing in thickness, and/or by changing a degree of separation between two or more layers of the target user interface object). The target user interface object that is selected for the direct manipulation corresponds to (e.g., overlaps or coincides with) a location of a portion of a hand of the user (e.g., the location of one or more fingers, a knuckle, the palm, and/or the wrist). For example, as described herein with reference to FIGS. 7K, in response to user 7002 indicating readiness to interact via direct manipulation using hand 7020, ball 7108, which corresponds to the location of hand 7020, is selected for the direct manipulation and is visually indicated by the display of a border or other selection outline around ball 7108.

In response to receiving the input that indicates the user's readiness to interact with the view of the environment (1004): in accordance with a determination that the input corresponds to a request for indirect manipulation of the view of the environment (e.g., and not for direct manipulation), the computer system displays (1008) a visual indication that a target user interface object is selected for the indirect manipulation (e.g., by highlighting; changing color, opacity, blurring, shadow, and/or other visual property; displaying a selection outline; and/or creating a three-dimensional visual effect, such as of the target user interface object moving forward or backward, changing in thickness, and/or by changing a degree of separation between two or more layers of the target user interface object). The target user interface object that is selected for the indirect manipulation corresponds to a location of a gaze of the user (e.g., the user's gaze is directed to the target user interface object). For example, as described herein with reference to FIG. 7J (e.g., FIGS. 7J1-7J2), in response to user 7002 indicating readiness to interact via indirect manipulation by holding hand 7020 in state "S0" (e.g., a ready state), wall hanging 7106, which corresponds to the location of user 7002's gaze in FIGS. 7J, is selected for the indirect manipulation and visually indicated by the display of a border or other selection outline around wall hanging 7106.

In some embodiments, direct manipulation is considered requested when the user's hand is within a threshold distance of a target user interface object, whereas indirect manipulation is considered requested when the user's hand is beyond the threshold distance from the target user interface object. In some embodiments, the user's hand must be in a particular configuration (e.g., a pointing or pre-tap configuration with one or more fingers extended toward a target user interface object) in order for direct manipulation to be considered requested, whereas indirect manipulation is considered requested if the user's hand is not in the particular configuration, and optionally requires a different configuration (e.g., a pre-pinch ready state or pinch configuration). In some embodiments, the target user interface object for a direct manipulation is selected based on the location of the portion of the user's hand (e.g., in accordance with a determination that the target user interface object corresponds to the location of the portion of the user's hand). In some embodiments, the target user interface object of an indirect manipulation is selected based on the location to which the user's gaze is directed (e.g., in accordance with a determination that the user's gaze is directed to the target user interface object).

Selecting the target of a direct manipulation input based on the location of the user's hand or a portion thereof, and selecting the target of an indirect manipulation input based on the location of the user's gaze, causes the device to automatically make direct manipulation target selection more manual and intuitive, and thus faster, while making indirect manipulation target selection more precise by using gaze, thereby reducing an amount of time needed to perform a particular operation on the device.

In some embodiments, the computer system detects a first continuation of the input that indicates the user's readiness to interact with the view of the environment, including detecting movement of the user's gaze (e.g., from a first gaze location that is the location that corresponds to the target user interface object selected for the indirect manipulation) to a second location (e.g., a different gaze location) in the environment without detecting movement of the user's hand (e.g., without detecting more than a negligible, threshold amount of movement of the user's hand, the hand being held substantially still without intentional movement). In some embodiments, detecting an input that indicates a user's readiness to interact with the view of the environment (sometimes called a hover input) includes detecting that the user's hand is in a particular configuration (e.g., a pointing or pre-tap configuration for direct manipulation or a pre-pinch ready state for indirect manipulation).

In some embodiments, in response to detecting the first continuation of the input: in accordance with a determination that the first continuation of the input corresponds to the request for direct manipulation of the view of the environment, the computer system continues to display the visual indication that the target user interface object that corresponds to the location of the portion of the hand is selected for the direct manipulation (e.g., regardless of the fact that the user's gaze has moved, the target of the direct manipulation remains the same based on the user's hand staying in the same place or moving less than a threshold amount so as to remain directed to or engaged with the same target); and, in accordance with a determination that the first continuation of the input corresponds to the request for the indirect manipulation of the view of the environment, the computer system displays a visual indication that a second target user interface object is selected for the indirect manipulation (e.g., by highlighting; changing color, opacity, blurring, shadow, and/or other visual property; displaying a selection outline; and/or creating a three-dimensional visual effect, such as of the second target user interface object moving forward or backward, changing in thickness, and/or by changing a degree of separation between two or more layers of the second target user interface object), wherein the second target user interface object corresponds to the second location of the user's gaze. In some embodiments, the second target user interface object is different from the target user interface object of operation 1008 (e.g., a first target user interface object). In some embodiments, the user's gaze moves from the first target user interface object to the second target user interface object, and in response, in combination with displaying the visual indication that the second target user interface object is selected for the indirect manipulation, the computer system ceases to display the visual indication that the first target user interface object is selected for the indirect manipulation.

For example, as described herein with reference to FIG. 7K (e.g., FIGS. 7K1-7K2), if user 7002 were to hold hand 7020 still relative to ball 7108 while user 7002's gaze moved about the three-dimensional environment, the target of the direct manipulation would not change from ball 7108. In contrast, as described herein with reference to FIG. 7J (e.g., FIGS. 7J1-7J2), if user 7002's gaze was to move away from wall hanging 7106 while hand 7020 were held still, the target of the indirect manipulation would change from wall hanging 7106 based on the movement of user 7002's gaze, for example to the current object of user 7002's gaze. For an input that includes movement of the user's gaze without movement of the user's hand, changing the target of an indirect manipulation input based on the movement of the user's gaze, versus maintaining the same target of a direct manipulation input due to the user's hand not moving, causes the device to automatically make direct manipulation target selection more manual and intuitive, and thus faster, while making indirect manipulation target selection more precise by using gaze, thereby reducing an amount of time needed to perform a particular operation on the device.

In some embodiments, the computer system detects a second continuation of the input that indicates the user's readiness to interact with the view of the environment, including detecting movement of the portion of the hand (e.g., from a first hand location that is the location that corresponds to the target user interface object selected for the direct manipulation) to a third location (e.g., a different hand location) in the environment without detecting (e.g., more than a negligible, threshold amount of) movement of the user's gaze. In some embodiments, in response to detecting the second continuation of the input: in accordance with a determination that the second continuation of the input corresponds to the request for direct manipulation of the view of the environment, the computer system displays a visual indication that a third target user interface object is selected for the direct manipulation (e.g., by highlighting; changing color, opacity, blurring, shadow, and/or other visual property; displaying a selection outline; and/or creating a three-dimensional visual effect, such as of the third target user interface object moving forward or backward, changing in thickness, and/or by changing a degree of separation between two or more layers of the third target user interface object), wherein the third target user interface object corresponds to the third location of the portion of the hand. In some embodiments, the third target user interface object is different from the target user interface object of operation 1006 (e.g., a first target user interface object). In some embodiments, in response to detecting the second continuation of the input: in accordance with a determination that the second continuation of the input corresponds to the request for the indirect manipulation of the view of the environment, the computer system continues to display the visual indication that the target user interface object that corresponds to the location of the user's gaze is selected for the indirect manipulation (e.g., regardless of the fact that the user's hand has moved, the target of the indirect manipulation remains the same based on the user's gaze staying in the same place or moving less than a threshold amount so as to remain directed to the same target). For example, as described herein with reference to FIGS. 7K, if user 7002 were to move hand 7020 away from ball 7108 (e.g., to wall hanging 7106), even if user 7002's gaze stayed directed to ball 7108, the target of the direct manipulation would change from ball 7108 (e.g., to wall hanging 7106) based on the movement of hand 7020. In contrast, as described herein with reference to FIGS. 7J, if user 7002 were to move hand 7020 (e.g., laterally while keeping hand 7020 in a state indicating readiness to interact via indirect manipulation), so long as user 7002's gaze stayed directed to wall hanging 7106, wall hanging 7106 would retain focus as the target of the indirect manipulation. For an input that includes movement of the user's hand without movement of the user's gaze, changing the target of a direct manipulation input based on the movement of the user's hand, versus maintaining the same target of an indirect manipulation input due to the user's gaze not moving, causes the device to automatically make direct manipulation target selection more manual and intuitive, and thus faster, while making indirect manipulation target selection more precise by using gaze, thereby reducing an amount of time needed to perform a particular operation on the device.

In some embodiments, the computer system detects a third continuation of the input that indicates the user's readiness to interact with the view of the environment, including detecting movement of the portion of the hand to a fourth location in the environment and detecting movement of the user's gaze to a fifth location in the environment. In some embodiments, in response to detecting the third continuation of the input: in accordance with a determination that the third continuation of the input corresponds to the request for direct manipulation of the view of the environment, the computer system displays a visual indication that a fourth target user interface object is selected for the direct manipulation (e.g., by highlighting; changing color, opacity, blurring, shadow, and/or other visual property; displaying a selection outline; and/or creating a three-dimensional visual effect, such as of the fourth target user interface object moving forward or backward, changing in thickness, and/or by changing a degree of separation between two or more layers of the fourth target user interface object), wherein the fourth target user interface object corresponds to the fourth location of the portion of the hand; and, in accordance with a determination that the third continuation of the input corresponds to the request for indirect manipulation of the view of the environment, the computer system displays a visual indication that a fifth target user interface object is selected for the indirect manipulation (e.g., by highlighting; changing color, opacity, blurring, shadow, and/or other visual property; displaying a selection outline; and/or creating a three-dimensional visual effect, such as of the fifth target user interface object moving forward or backward, changing in thickness, and/or by changing a degree of separation between two or more layers of the fifth target user interface object), wherein the fifth target user interface object corresponds to the fifth location of the portion of the hand. For example, as described herein with reference to FIG. 7K (e.g., FIGS. 7K1-7K2), movement of hand 7020 away from ball 7108 (e.g., to wall hanging 7106) would change the target of the direct manipulation from ball 7108 (e.g., to wall hanging 7106) based on the movement of hand 7020 (e.g., without regard to whether user 7002's gaze moved). In another example, as described herein with reference to FIG. 7J (e.g., FIGS. 7J1-7J2), movement of user 7002's gaze away from wall hanging 7106 (e.g., to ball 7108) would change the target of the indirect manipulation from wall hanging 7106 (e.g., to ball 7108) based on the movement of user 7002's gaze (e.g., without regard to whether hand 7020 moved). For an input that includes movement of the user's hand and movement of the user's gaze, changing the target of a direct manipulation input based on the movement of the user's hand, as well as changing the target of an indirect manipulation input due to the movement of the user's gaze, causes the device to automatically make direct manipulation target selection more manual and intuitive, and thus faster, while making indirect manipulation target selection more precise by using gaze, thereby reducing an amount of time needed to perform a particular operation on the device.

In some embodiments, the input that indicates the user's readiness to interact with the view of the environment corresponds to the request for direct manipulation of the view of the environment. In some embodiments, while receiving the input that indicates the user's readiness to interact with the view of the environment and that corresponds to the request for direct manipulation of the view of the environment, the computer system detects movement of the portion of the hand. In some embodiments, in response to detecting the movement of the portion of the hand, the computer system displays a visual indication that a target user interface object that corresponds to a location of the moved portion of the hand is selected for the direct manipulation (e.g., by highlighting; changing color, opacity, blurring, shadow, and/or other visual property; displaying a selection outline; and/or creating a three-dimensional visual effect, such as of the target user interface object moving forward or backward, changing in thickness, and/or by changing a degree of separation between two or more layers of the target user interface object).

In some embodiments, after detecting the movement of the portion of the hand, the computer system detects a change in the input that indicates the user's readiness to interact with the view of the environment, wherein the change in the input corresponds to a request for indirect manipulation of the view of the environment (e.g., a request to transition from direct manipulation to indirect manipulation, such as by a change in hand configuration from an initial configuration or ready state for direct manipulation, such as a pre-tap configuration, to an initial configuration or ready state for indirect manipulation, such as a pre-pinch configuration). In some embodiments, in response to detecting the change in the input, the computer system displays a visual indication that a target user interface object that corresponds to a location of the user's gaze (e.g., a current gaze location when the change in the input is detected) is selected for the indirect manipulation (e.g., by highlighting; changing color, opacity, blurring, shadow, and/or other visual property; displaying a selection outline; and/or creating a three-dimensional visual effect, such as of the target user interface object moving forward or backward, changing in thickness, and/or by changing a degree of separation between two or more layers of the target user interface object).

For example, as described herein with reference to FIGS. 7K, user 7002 is enabled to select a current target of the direct manipulation based on the location and/or movement of hand 7020, and user 7002 is also enabled to transition from using direct manipulation to using indirect manipulation, after which a current target of the indirect manipulation is selected based on the location and/or movement of user 7002's gaze.

After selecting the target of a direct manipulation input based on the location and/or movement of the user's hand, in response to a request to use indirect manipulation, transitioning from direct manipulation to indirect manipulation and selecting the target of the indirect manipulation based on the location and/or movement of the user's gaze causes the device to automatically make direct manipulation target selection more manual and intuitive, and thus faster, while making indirect manipulation target selection more precise by using gaze, thereby reducing an amount of time needed to perform a particular operation on the device.

In some embodiments, after detecting the change in the input (which indicates the user's readiness to interact with the view of the environment and corresponds to the request for indirect manipulation), the computer system continues to detect the input that indicates the user's readiness to interact with the view of the environment, including detecting movement of the gaze of the user. In some embodiments, in response to detecting the movement of the gaze of the user, the computer system displays a visual indication that a target user interface object that corresponds to a location of the moved gaze of the user is selected for the indirect manipulation (e.g., by highlighting; changing color, opacity, blurring, shadow, and/or other visual property; displaying a selection outline; and/or creating a three-dimensional visual effect, such as of the target user interface object moving forward or backward, changing in thickness, and/or by changing a degree of separation between two or more layers of the target user interface object). For example, as described herein with reference to FIGS. 7K, after transitioning from using direct manipulation to using indirect manipulation, user 7002 is enabled to select a current target of the indirect manipulation based on the location and/or movement of user 7002's gaze. After transitioning from direct manipulation to indirect manipulation, selecting a current target of the indirect manipulation based on the location and/or movement of the user's gaze causes the device to automatically make indirect manipulation target selection more precise than direct manipulation target selection by using gaze, thereby reducing an amount of time needed to perform a particular operation on the device.

In some embodiments, the input that indicates the user's readiness to interact with the view of the environment corresponds to the request for indirect manipulation of the view of the environment. In some embodiments, while receiving the input that indicates the user's readiness to interact with the view of the environment and that corresponds to the request for indirect manipulation of the view of the environment, the computer system detects movement of the gaze of the user. In some embodiments, in response to detecting the movement of the gaze of the user, the computer system displays a visual indication that a target user interface object that corresponds to a location of the moved gaze of the user is selected for the indirect manipulation (e.g., by highlighting; changing color, opacity, blurring, shadow, and/or other visual property; displaying a selection outline; and/or creating a three-dimensional visual effect, such as of the target user interface object moving forward or backward, changing in thickness, and/or by changing a degree of separation between two or more layers of the target user interface object). In some embodiments, the target user interface object that corresponds to the location of the gaze of the user changes as the user's gaze shifts between different target user interface objects. In some embodiments, accordingly, different target user interface objects are visually indicated over time as being the current target user interface object to which the user's gaze is directed (e.g., by highlighting; changing color, opacity, blurring, shadow, and/or other visual property; displaying a selection outline; and/or creating a three-dimensional visual effect, such as of the current target user interface object moving forward or backward, changing in thickness, and/or by changing a degree of separation between two or more layers of the current target user interface object). Optionally, the computer system displays a cursor that indicates the current location in the view of the environment to which the user's gaze is directed (e.g., instead of or in addition to the visual indication of the current target user interface object).

In some embodiments, after detecting the movement of the gaze, the computer system detects a change in the input that indicates the user's readiness to interact with the view of the environment, wherein the change in the input corresponds to a request for direct manipulation of the view of the environment (e.g., a request to transition from indirect manipulation to direct manipulation, such as by a change in hand configuration from an indirect manipulation ready state to a direct manipulation ready state). In some embodiments, in response to detecting the change in the input, the computer system displays a visual indication that a target user interface object that is determined based on movement of the portion of the hand (e.g., a current location of the portion of the hand when the change in the input is detected) is selected for the direct manipulation (e.g., by highlighting; changing color, opacity, blurring, shadow, and/or other visual property; displaying a selection outline; and/or creating a three-dimensional visual effect, such as of the target user interface object moving forward or backward, changing in thickness, and/or by changing a degree of separation between two or more layers of the target user interface object).

In some embodiments, the target user interface object that corresponds to the movement of the portion of the user's hand changes as the user's hand moves. In some embodiments, accordingly, different target user interface objects are visually indicated over time as being the target user interface object that is currently selected based on the user's hand movement (e.g., by highlighting; changing color, opacity, blurring, shadow, and/or other visual property; displaying a selection outline; and/or creating a three-dimensional visual effect, such as of the current target user interface object moving forward or backward, changing in thickness, and/or by changing a degree of separation between two or more layers of the current target user interface object). Optionally, the computer system displays a cursor that indicates the current location in the view of the environment that is the target of the input and that moves as the user's hand moves (e.g., instead of or in addition to the visual indication of the current target user interface object). In some embodiments, the current target location of the input is based on relative movement of the user's hand; for example, movement of the user's hand to the right moves the current target location of the input to the right but not necessarily to the location of the user's hand; in another example, movement of the user's hand by a first distance corresponds to a change in the current target location of the input by a second distance that is different from the first distance.

For example, as described herein with reference to FIGS. 7J, user 7002 is enabled to select a current target of the indirect manipulation based on the location and/or movement of user 7002's gaze, and user 7002 is also enabled to transition from using indirect manipulation to using direct manipulation, after which a current target of the direct manipulation is selected based on the location and/or movement of user 7002's hand 7020.

After selecting the target of an indirect manipulation input based on the location and/or movement of the user's gaze, in response to a request to use direct manipulation, transitioning from indirect manipulation to direct manipulation and selecting the target of the direct manipulation based on the location and/or movement of the user's hand causes the device to automatically make direct manipulation target selection more manual and intuitive, and thus faster, while making indirect manipulation target selection more precise by using gaze, thereby reducing an amount of time needed to perform a particular operation on the device.

In some embodiments, after detecting the change in the input (which indicates the user's readiness to interact with the view of the environment and corresponds to the request for direct manipulation), the computer system continues to detect the input that indicates the user's readiness to interact with the view of the environment, including detecting movement of the portion of the hand. In some embodiments, in response to detecting the movement of the portion of the hand, the computer system displays a visual indication that a target user interface object that corresponds to a location of the moved portion of the hand is selected for the direct manipulation (e.g., by highlighting; changing color, opacity, blurring, shadow, and/or other visual property; displaying a selection outline; and/or creating a three-dimensional visual effect, such as of the target user interface object moving forward or backward, changing in thickness, and/or by changing a degree of separation between two or more layers of the target user interface object). In some embodiments, the target user interface object that corresponds to the movement of the portion of the user's hand changes as the user's hand moves. In some embodiments, accordingly, different target user interface objects are visually indicated over time as being the target user interface object that is currently selected based on the user's hand movement (e.g., by highlighting; changing color, opacity, blurring, shadow, and/or other visual property; displaying a selection outline; and/or creating a three-dimensional visual effect, such as of the current target user interface object moving forward or backward, changing in thickness, and/or by changing a degree of separation between two or more layers of the current target user interface object). For example, as described herein with reference to FIGS. 7J, after transitioning from using indirect manipulation to using direct manipulation, user 7002 is enabled to select a current target of the direct manipulation based on the location and/or movement of user 7002's hand 7020. After transitioning from indirect manipulation to direct manipulation, selecting a current target of the direct manipulation based on the location and/or movement of the user's hand causes the device to automatically make direct manipulation target selection more manual and intuitive, and thus faster, than indirect manipulation target selection, thereby reducing an amount of time needed to perform a particular operation on the device.

In some embodiments, after receiving the input that indicates the user's readiness to interact with the view of the environment, the computer system detects an input that includes movement of the user's hand relative to the environment. In some embodiments, a first portion of the input includes a specific change in configuration of the user's hand to initiate the input (e.g., a transition to an interaction state or performance of a specific gesture such as an air pinch gesture or air tap gesture), and a second portion of the input includes the movement of the user's hand (e.g., lateral displacement in physical space).

In some embodiments, in response to detecting the input: in accordance with a determination that the input corresponds to the request for direct manipulation of the view of the environment (e.g., the input is detected during or is a continuation of the input that indicated the user's readiness to interact via direct manipulation), the computer system performs an operation with respect to the target user interface object selected (e.g., based on hand location) for the direct manipulation, based on the movement of the user's hand relative to the environment during the input. In some embodiments, an interaction point on the target user interface object of the direct manipulation is based on the location of the user's hand when the input is first received, and the extent of interaction or manipulation (e.g., movement of the interaction point) is based on subsequent locations of the user's hand during the movement of the user's hand. In some embodiments, the operation performed with respect to the target user interface object includes selecting or deselecting, activating or canceling activation of, resizing, or repositioning the target user interface object. For example, as described herein with reference to FIGS. 7K, the locations of direct manipulation inputs are based on the user's hand location and/or movement both for inputs indicating readiness to interact and during initiated interaction inputs.

In some embodiments, in response to detecting the input: in accordance with a determination that the input corresponds to the request for indirect manipulation of the view of the environment (e.g., the input is detected during or is a continuation of the input that indicated the user's readiness to interact via indirect manipulation), the computer system performs an operation with respect to the target user interface object selected (e.g., based on gaze location) for the indirect manipulation, based on the movement of the user's hand relative to the environment during the input. In some embodiments, an interaction point on the target user interface object of the indirect manipulation is selected based on the location of the user's gaze when the input is first received, whereas the extent of interaction or manipulation is based on the location(s) of the user's hand during the input rather than the user's gaze. That is, the movement of the user's hand controls, at least in part, how the target user interface object is manipulated by the input regardless of whether the manipulation is direct or indirect. For example, as described herein with reference to FIGS. 7J, while the locations of inputs indicating readiness to interact using indirect manipulation are based on the user's gaze location and/or movement, initiated interaction inputs using indirect manipulation are based on the user's hand location and/or movement.

Using hand location and/or movement to control at least some portions of indirect manipulation inputs (e.g., after initially selecting a target based on gaze) as well as using hand location and/or movement to control direct manipulation inputs causes the device to automatically make providing inputs more manual and intuitive, and thus faster, thereby reducing an amount of time needed to perform a particular operation on the device.

In some embodiments, performing the operation with respect to the target user interface object selected for the direct manipulation includes displaying a first amount of change to the target user interface object based on the movement of the user's hand relative to the environment during the input. In some embodiments, the first amount of change to the target user interface object that is selected for the direct manipulation corresponds to a first amount of input movement that is based on the movement of the user's hand relative to the environment. In some embodiments, the first amount of input movement is the same as the amount of movement of the user's hand relative to the environment during the input (e.g., is unaccelerated relative to the hand movement) or is greater than the amount of movement of the user's hand (e.g., is accelerated relative to the hand movement). For example, the first amount of change, based on the first amount of input movement, is displayed as a first amount of movement (e.g., repositioning) and/or resizing of the target user interface object selected for direct manipulation.

In some embodiments, performing the operation with respect to the target user interface object selected for the indirect manipulation includes displaying a second amount of change to the target user interface object based on the movement of the user's hand relative to the environment during the input, wherein the second amount of change is greater than the first amount of change. In some embodiments, a given amount of movement of the user's hand changes an indirect manipulation target more than the same amount of movement of the user's hand changes a direct manipulation target (e.g., repositions and/or resizes an indirect manipulation target more than a direct manipulation target). In some embodiments, the second amount of change to the target user interface object that is selected for the indirect manipulation corresponds to a second amount of input movement that is based on the movement of the user's hand relative to the environment. In some embodiments, the second amount of input movement is greater than the amount of movement of the user's hand relative to the environment during the input (e.g., is accelerated relative to the hand movement). In some embodiments, the second amount of input movement is greater than the first amount of input movement (e.g., the second amount of input movement, on which the indirect manipulation is based, is more accelerated relative to the hand movement than is the first amount of input movement, on which the direct manipulation is based). In some embodiments, the second amount of input movement is the same as the amount of movement of the user's hand relative to the environment during the input (e.g., is unaccelerated relative to the hand movement).

For example, as described herein with reference to FIGS. 7K, input point movement is in some embodiments less accelerated relative to hand movement for direct manipulation inputs than for indirect manipulation inputs. If a target is changed in response to an input that includes movement of a user's hand, changing the target more in response to hand movement during an indirect manipulation input than during a direct manipulation input reduces the extent of inputs needed to interact with different locations in the three-dimensional environment during indirect manipulation as compared to direct manipulation, particularly if the range of available interaction locations for indirect manipulation is more extensive than the range of available interaction locations for direct manipulation and/or if indirect manipulation is used for interaction locations in the three-dimensional environment that are beyond the user's reach.

In some embodiments, the input that indicates the user's readiness to interact with the view of the environment corresponds to the request for indirect manipulation of the view of the environment and includes a first amount of movement of the gaze of the user (e.g., where the user's gaze moves from a first location in the environment to a second location in the environment, the first amount of movement is a first distance between the first location and the second location). In some embodiments, in response to the first amount of movement of the user's gaze during the input that indicates the user's readiness to interact with the view of the environment, an interaction point in the environment is moved by a second amount (e.g., between two different locations in the environment separated by a second distance), wherein the target user interface object that is selected for the indirect manipulation is selected based on the moved interaction point. In some embodiments, the interaction point during an input that indicates the user's readiness to interact is the location in the environment to which the user's gaze is directed. In some embodiments, as the user's gaze moves to different locations, different corresponding target user interface objects are selected for the indirect manipulation. In some embodiments, the second amount of movement of the interaction point is the same as the first amount of movement of the user's gaze (e.g., gaze-based interaction point movement is unaccelerated relative to the gaze movement).

In some embodiments, the movement of the user's hand relative to the environment during the input is the first amount of movement (e.g., the user's hand moves by the first distance in physical space). In some embodiments, in response to the first amount of movement of the user's hand during the input, the interaction point in the environment is moved by a third amount (e.g., between two different locations in the environment separated by a third distance) that is greater than the second amount, wherein performing the operation with respect to the target user interface object selected for the indirect manipulation includes displaying a change to the target user interface object based on the third amount of movement of the interaction point (e.g., repositioning and/or resizing the target user interface object based on the third amount of movement of the interaction point). In some embodiments, movement of the user's gaze across a respective distance causes movement of an interaction point by a distance that is less than the amount of movement of the interaction point caused by movement of the user's hand across the same respective distance.

For example, as described herein with reference to FIGS. 7J, input point movement is in some embodiments less accelerated while the input point movement is based on the user's gaze location and/or movement (e.g., during a portion of an input that indicates readiness to interact via indirect manipulation) than while the input point movement is based on the user's hand location and/or movement (e.g., during a subsequent interaction portion of the indirect manipulation input). Moving a target input location in the three-dimensional environment less in response to movement of a user's gaze (e.g., during an indirect manipulation input) than in response to movement of the user's hand (e.g., during the same indirect manipulation input) causes the device to automatically reduce the extent of hand movement needed to interact with different locations in the three-dimensional environment, in accordance with the extent of a user's reach being physically limited, more so than the user's gaze.

In some embodiments, determining that the input corresponds to the request for direct manipulation of the view of the environment includes determining that (e.g., the portion of) the user's hand is less than (e.g., or no more than) a threshold distance from (e.g., a simulated position of) the target user interface object. In some embodiments, the distance between the user's hand (e.g., the portion of the user's hand) and the target user interface object is determined based on a physical position of the user's hand (e.g., the portion of the user's hand) in physical space relative to a physical display (e.g., a touchscreen). In some embodiments, the distance between the user's hand and the target user interface object is determined based on a position of the user's hand, or a representation of the user's hand, in a three-dimensional environment (e.g., a position in simulated space corresponding to a physical position of the user's hand in physical space) relative to a simulated position of the target user interface object in the three-dimensional environment. In some embodiments, determining that the input corresponds to the request for indirect manipulation of the view of the environment includes determining that (e.g., the portion of) the user's hand is at least (e.g., or greater than) the threshold distance from (e.g., the simulated position of) the target user interface object. Determining whether to use direct manipulation or indirect manipulation based on the distance (e.g., simulated distance) between the user's hand and a target user interface object is described in more detail herein with reference to FIGS. 7J-7K. Using direct manipulation when the user's hand is close to the target object, and using indirect manipulation when the user's hand is not close to the target object, causes the device to automatically choose the interaction mode that is more appropriate for the circumstances based on whether the target object is within the user's reach and can reasonably be directly manipulated or whether the target object is too far for the user to directly manipulate, thereby reducing an amount of time needed to perform a particular operation on the device.

In some embodiments, determining that the input corresponds to the request for direct manipulation of the view of the environment includes determining that the user's hand is in a first configuration (e.g., in a pointing configuration, such as with one or more fingers extended toward a target object). In some embodiments, determining that the input corresponds to the request for indirect manipulation of the view of the environment includes determining that the user's hand is in a second configuration that is different from the first configuration (e.g., in a pre-pinch ready state and/or poised to perform an air pinch gesture or air tap gesture). Determining whether to use direct manipulation or indirect manipulation based on the distance (e.g., simulated distance) based on whether the user's hand is in a state or configuration associated with direct manipulation or a state or configuration associated with indirect manipulation is described in more detail herein with reference to FIGS. 7J-7K. Using direct manipulation when the user's hand is in a first configuration versus using indirect manipulation when the user's hand is in a different, second configuration enables switching between different interaction modes quickly and without displaying additional controls.

In some embodiments, the input that indicates the user's readiness to interact with the view of the environment is detected using one or more input devices other than a touch-sensitive input device. In some embodiments, in response to receiving the input that indicates the user's readiness to interact with the view of the environment, the computer system provides, to software associated with the target user interface object (e.g., of the direct manipulation or the indirect manipulation), information about a simulated touch input that corresponds to the input that indicates the user's readiness to interact with the view of the environment. Providing gesture information about user inputs that simulate the user inputs as touch inputs, including for direct manipulation user inputs and indirect manipulation user inputs, is described in more detail herein with reference to the inputs of FIGS. 7J-7K. In some embodiments, displaying the visual indication that the target user interface object is selected (e.g., for the direct manipulation or the indirect manipulation) is performed in accordance with processing of the information about the simulated touch input by the software associated with the target user interface object. For an input other than a touch-input, including an input that includes an indication of a user's readiness to interact with the computer system whether via direct or indirect manipulation, providing gesture information about the input such that the input simulates a touch input provides consistent information about different types of inputs (e.g., touch or otherwise) to enable a device to seamlessly support multiple different types of inputs so as to make input processing and recognition more efficient, thereby reducing an amount of time needed to perform a particular operation on the device.

In some embodiments, aspects/operations of methods 800, 900, 1100, and 1200 may be interchanged, substituted, and/or added between these methods. For example, determining whether indirect manipulation or direct manipulation is requested, as in method 1000, is informed by the determination whether the user's hand is in the predefined configuration or not, as in method 800, and/or impacts whether an object responds to an input directed to the object, as in method 1200. For brevity, these details are not repeated here.

FIG. 11 is a flow diagram of an exemplary method 1100 for indicating whether additional gesture information beyond what is typically provided is available for certain inputs, in accordance with some embodiments. In some embodiments, method 1100 is performed at a computer system (e.g., computer system 101 in FIG. 1A) that is in communication with a display generation component (e.g., display generation component 120 in FIGS. 1, 3, and 4) (e.g., a heads-up display, a head-mounted device, a display, a touchscreen, a projector, or the like) and one or more input devices (e.g., one or more cameras (e.g., color sensors, infrared sensors, structured light scanners, and/or other depth-sensing cameras) that point downward at a user's hand, forward from the user's head, and/or that faces the user; eye-tracking devices; user-held and/or user-worn controllers; and/or other input hardware). In some embodiments, the method 1100 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 1100 are, optionally, combined and/or the order of some operations is, optionally, changed.

In some embodiments in which the display generation component is a touchscreen or display held by or positioned in front of the user, content that is visible in the environment is displayed on the touchscreen or display or visible via a transparent or partially transparent portion thereof. In some such embodiments, the computer system is enabled to detect inputs involving the user's gaze (e.g., location and/or movement) using one or more cameras and/or eye-tracking devices facing the user. In some such embodiments, the computer system is also enabled to detect inputs involving the user's hands (e.g., location and/or movement) using the one or more cameras facing the user. In some embodiments in which the display generation component is a head-mounted display worn on the user's head, content that is visible in the environment corresponds to the user's field of view when wearing the head-mounted display, and the computer system is enabled to detect inputs involving the user's gaze using one or more cameras and/or eye-tracking devices facing inward toward the user's face, whereas the computer system is enabled to detect inputs involving the user's hands using one or more cameras facing outward from the user's head.

While a view of an environment is visible via the display generation component (e.g., the environment being a two-dimensional or three-dimensional environment that includes one or more computer-generated portions and optionally one or more passthrough portions), the computer system detects (1102) a first input directed to a first user interface element in the environment.

In response to detecting the first input: the computer system provides (1104), to the first user interface element (or to an application associated with the first user interface element), first gesture information about the first input. In accordance with a determination that additional gesture information about the first input, other than the first gesture information, is available (e.g., detected by the computer system), the first gesture information is (1106) provided in combination with an indication that the additional gesture information about the first input is available (e.g., the indication is also provided to the first user interface element, or to an application associated with the first user interface element) (e.g., an additional information flag is provided and has a first value, which indicates that additional information is available, such as a value of 1 or other value for when the flag is set). In accordance with a determination that additional gesture information about the first input, other than the first gesture information, is not available, the first gesture information is (1108) provided without the indication that additional gesture information about the first input is available (e.g., no flag indicating availability of additional information is provided, or the additional information flag is provided and has a second value, which indicates that no additional information is available, such as a value of 0 or other value for when the flag is not set). Conversely, in some embodiments a flag is provided that, when set (e.g., has a first value such as a value of 1), indicates that additional information is not available, and, when not set (e.g., has a second value such as a value of 0), indicates that additional information is available (e.g., where the absence of the flag also indicates that additional information is available).

For example, as described herein with reference to FIG. 7M, in addition to standard input data including identifier 7042, target 7044, input location 7046, and/or input movement information 7048, additional information flag 7050 is provided for an input for which additional input data besides the standard input data is available, such as any of the air gesture-related inputs described herein with reference to FIGS. 7A-7K, including the input by hand 7020 in FIGS. 7K, if an air gesture. In contrast, as described herein with reference to FIG. 7M, additional information flag 7050 is not provided for an input for which additional input data (beyond the standard input data) is not available, such as the input by hand 7020 in FIGS. 7K, if a touch input via a touch-sensitive surface.

In some embodiments, the provision of a respective flag indicates that additional information about the first input is available, and the absence of the respective flag indicates that additional information about the first input is not available. In some embodiments, the absence of the respective flag indicates that additional information about the first input is available, whereas the provision of the respective flag indicates that additional information about the first input is not available.

Providing a limited set of gesture information about an input with an indication whether additional gesture information about the input is available upon request provides improved security and privacy by not delivering some user data, such as some of the information about inputs that the user is providing, to software that the user is interacting with, unless explicitly requested by the software.

In some embodiments, determining that the additional gesture information about the first input is available includes determining that the first input includes an air gesture (e.g., an air tap or air pinch gesture). In some embodiments, determining that additional gesture information about the first input is not available includes determining that the first input is a touch input (e.g., a tap or long press via a touch-sensitive surface of the one or more input devices). For example, as described herein with reference to FIG. 7M, additional gesture information is optionally available for air gesture inputs and not for touch inputs. Providing certain gesture information about air gesture inputs and touch inputs, and further providing an indication whether additional gesture information about air gesture inputs is available upon request, provides consistent information about different types of inputs to make input processing and recognition more efficient, thereby reducing an amount of time needed to perform a particular operation on the device, while also providing improved security and privacy for air gesture inputs by not delivering some of the information about the air gesture inputs unless explicitly requested.

In some embodiments, providing the first gesture information about the first input includes providing two-dimensional location information about the first input (e.g., based on a two-coordinate system such as a Cartesian x-y coordinate system or a polar coordinate system). In some embodiments, the first input occurs in three-dimensional physical space yet is treated as a simulated two-dimensional input (e.g., by providing information about the input in just two of the three-dimensions of the physical space, or by otherwise transposing the three-dimensional physical space into a two-dimensional context). In some embodiments, in accordance with the determination that additional gesture information about the first input is available, the additional gesture information includes three-dimensional pose information about the first input (e.g., position and/or orientation information based on a three-coordinate system such as a Cartesian x-y-z coordinate system or a spherical coordinate system). In some embodiments, providing the additional information flag (e.g., when set) indicates to the first user interface element, and/or to an application associated with the first user interface element, that three-dimensional information about the information is available and can be accessed or retrieved by request. For example, as described herein with reference to FIG. 7M, additional gesture information is optionally available for three-dimensional inputs, in addition to standard input information that is provided with respect to two dimensions and that in some circumstances simulates three-dimensional inputs (e.g., air gesture inputs) as two-dimensional inputs (e.g., touch inputs). Providing, about an air gesture input, certain gesture information that simulates a two-dimensional input (e.g., analogous to a touch input), with an indication whether additional gesture information that includes three-dimensional pose information about the air gesture input is available upon request, provides consistent information about different types of inputs to make input processing and recognition more efficient, thereby reducing an amount of time needed to perform a particular operation on the device, while also providing improved security and privacy for air gesture inputs by not delivering some of the information about the air gesture inputs unless explicitly requested.

In some embodiments, providing the first gesture information about the first input includes providing information (which includes the two-dimensional location information about the first input) that represents a simulated touch input that corresponds to the first input. For example, as described herein with reference to FIG. 7M, the standard input information that is provided about an input simulates the input as a two-dimensional input (e.g., even if the input is performed using three dimensions). Providing certain gesture information about an air gesture input such that the air gesture input simulates a touch input (e.g., with an indication whether additional gesture information specific to air gestures is available upon request) provides consistent information about different types of inputs to make input processing and recognition more efficient, thereby reducing an amount of time needed to perform a particular operation on the device.

In some embodiments, the additional gesture information includes pose information about a pose of a hand of a user of the computer system (e.g., a hand that is providing at least one aspect of the first input) (e.g., as described herein with reference to elements 7052, 7054, 7058, and 7060 of FIG. 7M). Providing an indication whether additional gesture information about an air gesture input, such as three-dimensional pose information, is available on request without initially providing such information provides improved security and privacy for air gesture inputs by not delivering some of the information about the air gesture inputs unless needed and explicitly requested (e.g., by software with which the user is interacting).

In some embodiments, the pose information includes absolute pose information (e.g., an absolute pose of the user's hand in the environment, optionally based on a coordinate system of the computer system) (e.g., as described herein with reference to elements 7052 and 7058 of FIG. 7M). Providing an indication whether additional gesture information about an air gesture input, such as absolute pose information, is available on request without initially providing such information provides improved security and privacy for air gesture inputs by not delivering some of the information about the air gesture inputs unless needed and explicitly requested (e.g., by software with which the user is interacting).

In some embodiments, the pose information includes relative pose information about a current pose of the hand of the user relative to a prior pose of the hand of the user (e.g., quantifying an amount of change in the pose of the user's hand since a prior reference point, such as the prior pose of the user's hand at the last instance of pose information being provided to the first user interface element or to an application associated with the first user interface element, or such as the prior pose of the user's hand at the last instance of the user's hand being in one of a plurality of predefined recognized poses) (e.g., as described herein with reference to elements 7054 and 7060 of FIG. 7M). In some embodiments, the relative pose information includes information about a current or prior pose of a first hand of the user relative to the current or prior pose of a different, second hand of the user. Providing an indication whether additional gesture information about an air gesture input, such as relative pose information, is available on request without initially providing such information provides improved security and privacy for air gesture inputs by not delivering some of the information about the air gesture inputs unless needed and explicitly requested (e.g., by software with which the user is interacting).

In some embodiments, the pose information includes an orientation of the user's hand (e.g., as described herein with reference to FIG. 7M, particularly with reference to elements 7052, 7054, 7058, and 7060). Providing an indication whether additional gesture information about an air gesture input, such as hand orientation information, is available on request without initially providing such information provides improved security and privacy for air gesture inputs by not delivering some of the information about the air gesture inputs unless needed and explicitly requested (e.g., by software with which the user is interacting).

In some embodiments, the pose information includes a position of the user's hand in the environment (e.g., as described herein with reference to FIG. 7M, particularly with reference to elements 7052, 7054, 7058, and 7060). In some embodiments, the position of the user's hand in the environment is a simulated position that corresponds to a physical position of the user's hand in physical space. In some embodiments, the position of the user's hand in the environment is specified based on a coordinate system of the computer system. Providing an indication whether additional gesture information about an air gesture input, such as hand position information, is available on request without initially providing such information provides improved security and privacy for air gesture inputs by not delivering some of the information about the air gesture inputs unless needed and explicitly requested (e.g., by software with which the user is interacting).

In some embodiments, the pose information is based on one or more coordinates (e.g., a coordinate system) specified by an application associated with the first user interface element (e.g., as described herein with reference to elements 7054 and 7060 of FIG. 7M). In some embodiments, the pose information is mapped from a coordinate system of the computer system to an application-specified coordinate system and then sent to the first user interface element or the associated application. In some embodiments, the pose information is provided as relative coordinates with respect to a set of coordinates specified by the application. Providing pose information about the user's hand(s) based on application-specified coordinates reduces the computational load imposed on the application to process and respond to inputs, thereby improving device responsiveness and reducing latency.

In some embodiments, in response to detecting the first input, the computer system provides, to the first user interface element (or to an application associated with the first user interface element), a first input event that corresponds to a first portion of the first input, wherein providing the first input event includes providing the first gesture information about the first input in combination with the indication that the additional gesture information about the first input (e.g., and corresponding to the first portion of the first input) is available. In some embodiments, providing an input event provides gesture information for a respective portion of an input. In some embodiments, multiple input events are provided for different portions (e.g., phases) of an input (e.g., a beginning of the input, an end of the input, and/or one or more intermediate phases of the input that in some cases involve a change to the input such as movement of the input). In some embodiments, after providing the first input event, the computer system receives, from an application associated with the first user interface element, a request for the additional gesture information about the first input (e.g., the application sends the request for the additional gesture information about the first input, in response to receiving the indication that additional gesture information is available for the first portion of the first input) (and the computer system optionally provides the additional gesture information corresponding to the second portion of the first input to the application in response). In some embodiments, the computer system provides, to the first user interface element (or to an application associated with the first user interface element), a second input event that corresponds to a second portion of the first input (e.g., the second portion occurs before or after the first portion of the first input), including providing second gesture information about the first input in combination with an indication that additional gesture information about the first input and corresponding to the second portion of the first input is available, wherein the second portion is different from the first portion. In some embodiments, after providing the second input event, the computer system receives, from the application associated with the first user interface element, a request for the additional gesture information corresponding to the second portion of the first input (e.g., the application sends another request for additional gesture information for the second portion of the first input, in response to receiving the indication that additional gesture information is available for the second portion of the first input) (and the computer system optionally provides the additional gesture information corresponding to the second portion of the first input to the application in response). For example, as described herein with reference to FIG. 7M, in some embodiments an application issues separate requests for additional information for each of two or more received input events. While a user is interacting with a respective application using one or more air gesture inputs, requiring the respective application to repeatedly request additional gesture information that is initially withheld about the one or more air gesture inputs (e.g., each time a limited set of gesture information is sent about an air gesture input and the additional gesture information is needed) provides improved security and privacy for air gesture inputs by not delivering some of the information about the air gesture inputs unless needed and explicitly requested by the respective application.

In some embodiments, the additional gesture information includes information that is based on a pose of a first hand of a user of the computer system and a pose of a second hand of the user and that enables recognition of a chorded gesture (e.g., a gesture, such as an air gesture, that involves two or more interaction points, analogous to a multitouch gesture). For example, recognition of an air gesture that is analogous to a touch-based pinch gesture (e.g., two or more contacts moving toward or away from each other on a touch-sensitive surface, such as for zooming or rescaling content, minimizing content, previewing content, switching between different applications, and/or transitioning to or from a system user interface such as an application selection user interface or control panel user interface) is enabled by providing information about the position and/or orientation (absolute and/or relative to each other) of two hands in physical space, information about the absolute and/or relative movement of one or both hands, and/or information about the distance between the two hands. Other examples of chorded gestures include multi-finger swipe gestures (e.g., using two, three, or more fingers to swipe up, down, to the left, and/or to the right) and multi-finger rotation gestures (e.g., pivoting two, three, or more fingers clockwise or counterclockwise about a respective axis). For example, as described herein with reference to FIG. 7M, additional gesture information about user inputs performed using multiple input manipulators (e.g., hands 7020 and 7022) is made available to enable computer system 101 to recognize such user inputs.

In some embodiments, the additional information about the position and/or orientation of the user's hands is available in addition to information about the location to which the user's gaze is directed (e.g., while the user's hands are in the ready state) and/or is provided using multiple event streams (e.g., one event stream per hand), which are described in more detail herein with reference to method 800. In some embodiments, the additional information about the position and/or orientation of the user's hands is available while detecting an input based on the location of the user's gaze and/or after transitioning to detecting a continuation of the same input based on the movement of one or more of the user's hands, which are described in more detail herein with reference to method 900. In some embodiments, the additional information about the position and/or orientation of the user's hand is available for direct manipulation inputs and/or for indirect manipulation inputs, which are described in more detail herein with reference to method 1000. In some embodiments, like with chorded multitouch gestures, configuring the computer system to detect chorded air gestures enables the computer system to recognize more inputs and perform more types of operations in response, thereby reducing the number of inputs needed to perform various operations without displaying additional controls. Providing an indication whether additional gesture information about an air gesture input, such as pose information about multiple hands that can be used to recognize a chorded gesture analogous to a multitouch gesture, is available on request without initially providing such information provides improved security and privacy for air gesture inputs by not delivering some of the information about the air gesture inputs unless needed and explicitly requested (e.g., by software with which the user is interacting).

In some embodiments, the additional gesture information includes a configuration state of a hand of the user of the computer system (e.g., a hand that is providing at least one aspect of the first input), wherein the configuration state is one of a plurality of predefined configuration states (e.g., as described herein with reference to elements 7056 and 7062 of FIG. 7M). In some embodiments, the configuration state indicates which phase of a predefined interaction gesture the current hand configuration represents. For example, if the predefined interaction gesture (e.g., for beginning an input) is an air pinch gesture, the predefined configuration states optionally include a finger extended state (e.g., a finger of the hand, such as the index finger, extended and pointing away from the thumb of the hand, such as for the direct manipulation input of FIGS. 7K), a pre-pinch state (e.g., the finger being close to but not in contact with, nor actively being brought into contact with, the thumb, such as for the ready state for the indirect manipulation inputs by hand 7020 in FIGS. 7C-7E and 7J), and a pinched state (e.g., the finger in contact with or actively being brought into contact with the thumb, such as for the interaction inputs by hand 7020 in FIGS. 7G-7I). In some embodiments, the additional information about the configuration state of a hand is available in addition to information about the location to which the user's gaze is directed (e.g., while the user's hands are in the ready state), which is described in more detail herein with reference to method 800, and indicates progress while transitioning from detecting an input based on the location of the user's gaze to detecting a continuation of the same input based on the movement of one or more of the user's hands, which are described in more detail herein with reference to method 900. In some embodiments, the additional information about the configuration state of a hand is available for direct manipulation inputs and/or for indirect manipulation inputs (e.g., to determine whether direct manipulation or indirect manipulation is requested), which are described in more detail herein with reference to method 1000. Providing an indication whether additional gesture information about an air gesture input, such as which configuration state a user's hand is in, is available on request without initially providing such information provides improved security and privacy for air gesture inputs by not delivering some of the information about the air gesture inputs unless needed and explicitly requested (e.g., by software with which the user is interacting).

In some embodiments, the first input is detected using one or more input devices (e.g., eye-tracking devices and/or optical sensors) other than a touch-sensitive input device, and providing the first gesture information about the first input includes providing information about a simulated touch input that corresponds to the first input (e.g., as described herein with reference to FIG. 7M, particularly with reference to the standard input information). In some embodiments, additional gesture information is available about non-touch inputs detected using one or more non-touch-sensitive input devices, whereas additional gesture information is not available about touch inputs detected using touch-sensitive input devices. In some embodiments, gesture information about a non-touch input is provided so as to simulate the non-touch input as a touch input, as described in more detail herein with reference to other methods described herein (e.g., methods 800, 900, and 1000) (e.g., by describing the non-touch input using touch events such as hover, touch begin, touch moved, and touch end). For an input other than a touch-input, including an input for which a limited set of gesture information is delivered along with an indication whether additional gesture information about the input is available upon request, providing at least the limited set of gesture information about the input such that the input simulates a touch input provides consistent information about different types of inputs (e.g., touch or otherwise), which enables a device to seamlessly support multiple different types of inputs to the extent that the multiple different types of inputs are analogous, yet enables delivery of additional gesture information that is unique to certain types of inputs when available, so as to make input processing and recognition more efficient, thereby reducing an amount of time needed to perform a particular operation on the device.

In some embodiments, aspects/operations of methods 800, 900, 1000, and 1200 may be interchanged, substituted, and/or added between these methods. For example, the gesture information of method 1100 is the gesture information that is provided in one or more input events for the inputs received as part of methods 800, 900, 1000, and/or 1200. For brevity, these details are not repeated here.

FIG. 12 is a flow diagram of an exemplary method 1200 for conditionally performing operations in response to inputs directed to user interface objects based on behavior parameters of the objects, in accordance with some embodiments. In some embodiments, method 1200 is performed at a computer system (e.g., computer system 101 in FIG. 1A) that is in communication with a display generation component (e.g., display generation component 120 in FIGS. 1, 3, and 4) (e.g., a heads-up display, a head-mounted device, a display, a touchscreen, a projector, or the like) and one or more input devices (e.g., one or more cameras (e.g., color sensors, infrared sensors, structured light scanners, and/or other depth-sensing cameras) that point downward at a user's hand, forward from the user's head, and/or that faces the user; eye-tracking devices; user-held and/or user-worn controllers; and/or other input hardware). In some embodiments, the method 1200 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 1200 are, optionally, combined and/or the order of some operations is, optionally, changed.

In some embodiments in which the display generation component is a touchscreen or display held by or positioned in front of the user, content that is visible in the environment is displayed on the touchscreen or display or visible via a transparent or partially transparent portion thereof. In some such embodiments, the computer system is enabled to detect inputs involving the user's gaze (e.g., location and/or movement) using one or more cameras and/or eye-tracking devices facing the user. In some such embodiments, the computer system is also enabled to detect inputs involving the user's hands (e.g., location and/or movement) using the one or more cameras facing the user. In some embodiments in which the display generation component is a head-mounted display worn on the user's head, content that is visible in the environment corresponds to the user's field of view when wearing the head-mounted display, and the computer system is enabled to detect inputs involving the user's gaze using one or more cameras and/or eye-tracking devices facing inward toward the user's face, whereas the computer system is enabled to detect inputs involving the user's hands using one or more cameras facing outward from the user's head.

While a view of an environment is visible via the display generation component (e.g., the environment being a two-dimensional or three-dimensional environment that includes one or more computer-generated portions and optionally one or more passthrough portions), the computer system detects (1202) a first input directed to a respective user interface object in the environment (e.g., gesture G1 directed to ball 7108 (FIGS. 7N-7Q), gesture G2 directed to ball 7108 (FIGS. 7R-7S), gesture G3 directed to ball 7108 (FIGS. 7T-7U), or gesture G3 directed to application user interface 7010 (FIGS. 7V-7X)).

In response to detecting the first input (1204): in accordance with a determination that the first input is a first type of input and that the respective user interface object is associated with a first behavior parameter, the computer system performs (1206) a respective operation corresponding to the first input. In some embodiments, the first behavior parameter specifies that the respective user interface object is responsive to inputs of the first type. In some embodiments, the respective operation corresponding to the first input is performed in accordance with a determination that the first input is the first type of input and that the respective user interface object is not associated with a second behavior parameter that is optionally different from the first behavior parameter (e.g., the second behavior parameter specifies that the respective user interface object is not responsive to inputs of the first type). For example, as described herein with reference to FIGS. 7N-7O, in response to detecting gesture G1 directed to ball 7108, in accordance with a determination that gesture G1 is a direct touch gesture and that ball 7108 is associated with behavior parameter 1, computer system 101 moves ball 7108 in the three-dimensional environment.

In response to detecting the first input (1204): in accordance with a determination that the first input is the first type of input and that the respective user interface object is not associated with the first behavior parameter (e.g., and/or that the respective user interface object is associated with the second behavior parameter), the computer system forgoes (1208) performing the respective operation corresponding to the first input (e.g., forgoing performing the respective operation with respect to the respective user interface object or ignoring the first input altogether). For example, as described herein with reference to FIGS. 7P-7Q, in response to detecting gesture G1 directed to ball 7108, and in accordance with a determination that gesture G1 is a direct touch gesture and that ball 7108 is not associated with behavior parameter 1 (e.g., ball 7108 being associated instead with behavior parameter 2), computer system 101 does not move ball 7108 in the three-dimensional environment.

In response to detecting a particular type of input directed to a user interface object, performing an operation responsive to the particular type of input only if the object is associated with a particular behavior parameter (e.g., indicating that the object is configured to respond to the particular type of input) allows certain types of inputs (e.g., that are less precise and thus more likely to be accidental) to be disabled in situations that require more intentional and/or precise control, while enabling operations to be performed more intuitively and quickly and expanding the available gesture set in situations where precision is less critical, which reduces user mistakes and makes interaction with the computer system more efficient.

In some embodiments, in response to detecting the first input: in accordance with a determination that the first input is a second type of input that is different from the first type of input, the computer system performs an operation corresponding to the first input without regard to whether the respective user interface object is associated with the first behavior parameter (e.g., whether the respective user interface object is associated with the first behavior parameter or not; optionally without determining whether the respective user interface object is associated with the first behavior parameter). For example, as described herein with reference to FIGS. 7R-7S, in response to detecting gesture G2 directed to ball 7108, in accordance with a determination that gesture G2 is a direct pinch gesture (e.g., different from the gesture type of gesture G1 (FIG. 7N)), computer system 101 moves ball 7108 in the three-dimensional environment, whether or not ball 7108 is associated with behavior parameter 1. Performing an operation responsive to a particular type of input, in response to detecting the particular type of input directed to a user interface object, without requiring that the object be associated with a particular behavior parameter (e.g., indicating that the object is configured to respond to the particular type of input) enables operations to be performed more intuitively and quickly in response to inputs that are more intentional and/or precise, and increases flexibility within user interfaces by allowing restrictions to be placed on certain types of inputs and objects and not others.

In some embodiments, the first type of input is a first type of direct manipulation input (e.g., an input that occurs at a location corresponding to the object that is being manipulated) (e.g., gesture G1 (FIG. 7N) is a first type of direct manipulation input, such as a direct touch gesture), and the second type of input is a second type of direct manipulation input that is different from the first type of direct manipulation input (e.g., gesture G2 (FIG. 7R) is a second type of direct manipulation input, such as a direct pinch gesture). Requiring that an object be associated with a particular behavior parameter in order for an operation to be performed in response to certain types of direct inputs directed to the object, and not requiring the associated behavior parameter in order for an operation to be performed in response to other types of direct inputs directed to the object, reduces user mistakes in situations that require more intentional and/or precise control while also enabling operations to be performed more intuitively and quickly in situations where precision is less critical or in response to inputs that are more intentional and/or precise, and increases flexibility within user interfaces by allowing restrictions to be placed on certain types of inputs and objects and not others.

In some embodiments, the first type of input is an input performed using a first number of fingers (e.g., a single finger input) (e.g., gesture G1 (FIG. 7N) is a direct touch gesture performed using one finger), and the second type of input is an input performed using a second number of fingers (e.g., a two-finger input, such as a pinch gesture or other chorded gesture) (e.g., gesture G2 (FIG. 7R) is a direct pinch gesture performed using two fingers (e.g., by bringing the two fingers into contact with each other)), wherein the second number is different from the first number. Requiring that an object be associated with a particular behavior parameter in order for an operation to be performed in response to inputs using a particular number of fingers directed to the object, such as single finger inputs, and not requiring the associated behavior parameter in order for an operation to be performed in response to inputs using a different number of fingers directed to the object, such as multiple-finger inputs, allows inputs that are less complex and/or precise (and thus more likely to be accidental) to be disabled in situations that require more intentional and/or precise control, without placing the same restriction on inputs that are more complex and/or precise (and thus more likely to be intentional).

In some embodiments, in response to detecting the first input: in accordance with a determination that the first input is a third type of input that is different from the first type of input, the computer system performs an operation corresponding to the first input without regard to whether the respective user interface object is associated with the first behavior parameter (e.g., whether the respective user interface object is associated with the first behavior parameter or not; optionally without determining whether the respective user interface object is associated with the first behavior parameter). For example, as described herein with reference to FIGS. 7T-7U, in response to detecting gesture G3 directed to ball 7108, in accordance with a determination that gesture G3 is an indirect gesture (e.g., different from the gesture type of gesture G1 (FIG. 7N) and/or from the gesture type of gesture G2 (FIG. 7R)), computer system 101 moves ball 7108 in the three-dimensional environment, whether or not ball 7108 is associated with behavior parameter 1. Performing an operation responsive to a particular type of input, in response to detecting the particular type of input directed to a user interface object, without requiring that the object be associated with a particular behavior parameter (e.g., indicating that the object is configured to respond to the particular type of input) enables operations to be performed more intuitively and quickly in response to inputs that are more intentional and/or precise (and thus less likely to be accidental), and increases flexibility within user interfaces by allowing restrictions to be placed on certain types of inputs and objects and not others.

In some embodiments, the first type of input is a direct manipulation input (e.g., gesture G1 (FIG. 7N) is a direct manipulation input), and the third type of input is an indirect manipulation input (e.g., an input that occurs at a location that is spaced apart from or not located at a location corresponding to the object that is being manipulated, where the indirect input is targeted at the object that is being manipulated using a different targeting mechanism that indicates a location to which attention and/or focus of the user is directed, such as a cursor or gaze) (e.g., gesture G3 (FIGS. 7T and 7V) is an indirect manipulation input). Requiring that an object be associated with a particular behavior parameter in order for an operation to be performed in response to direct inputs (or certain types of direct inputs) directed to the object, and not requiring the associated behavior parameter in order for an operation to be performed in response to indirect inputs directed to the object, reduces user mistakes in situations that require more intentional and/or precise control while also enabling operations to be performed more intuitively and quickly in response to inputs that are more intentional and/or precise (and thus less likely to be accidental), and increases flexibility within user interfaces by allowing restrictions to be placed on certain types of inputs and objects and not others.

In some embodiments, in accordance with a determination that the first input is the first type of input (e.g., a direct input), the respective user interface object is determined in accordance with a location of an input manipulator performing the first input without regard to a location to which attention of a user is directed (e.g., the respective user interface object corresponds to the location at which the first input is performed by the input manipulator, whether the user's attention is directed to the respective user interface object or not (e.g., even if the user's attention is directed to a different user interface object)). For example, as described herein with reference to FIGS. 7N-7Q, gesture G1 is a direct manipulation gesture performed at or within a threshold distance of target object ball 7108, independent of where user 7002's attention is directed. In some embodiments, in accordance with a determination that the first input is the third type of input (e.g., an indirect input), the respective user interface object is determined in accordance with a location to which the attention of the user is directed (e.g., based on the user directing attention to, such as by gazing at, the respective user interface object). For example, as described herein with reference to FIGS. 7T-7X, gesture G3 is an indirect manipulation gesture whose target object is determined based on where user 7002's attention is directed (e.g., in FIGS. 7T-7U, gesture G3 is directed to ball 7108 because user 7002's gaze is directed to ball 7108, whereas in FIGS. 7V-7X, gesture G3 is directed to application user interface 7010 instead of to ball 7108 because user 7002's gaze is directed to application user interface 7010 instead of to ball 7108). In some embodiments, in accordance with the determination that the first input is the third type of input, the respective user interface object is determined without regard to a location of an input manipulator performing the first input. In some embodiments, in accordance with the determination that the first input is the third type of input, the respective user interface object is determined in accordance with the location to which the user's attention is directed and in accordance with the location of the input manipulator performing the first input. Selecting the target of particular types of inputs (e.g., direct manipulation inputs) based on the location of an input manipulator, such as a user's hand or portion thereof, makes target selection for the particular types of inputs more manual and intuitive and thus faster, and selecting the target of other types of inputs (e.g., indirect manipulation inputs) based on where the user is directing their attention (e.g., gazing) makes target selection for the other types of inputs more precise, which reduces user mistakes and makes interaction with the computer system more efficient.

In some embodiments, the first input includes an air gesture (e.g., gesture G1 (FIGS. 7N-7Q), gesture G2 (FIGS. 7R-7S), and/or gesture G3 (FIGS. 7T-7X) are air gestures). Performing an operation responsive to an air gesture directed to a user interface object only if the object is associated with a particular behavior parameter (e.g., indicating that the object is configured to respond to air gestures or the particular type of air gesture) allows certain types of inputs, including air gestures that are more likely to be accidental, to be disabled in situations that require more intentional and/or precise control, while enabling operations to be performed more intuitively and quickly in situations where precision is less critical, which reduces user mistakes and makes interaction with the computer system more efficient.

In some embodiments, performing the respective operation includes: in accordance with a determination that the first input includes a first input magnitude (e.g., a first movement magnitude), performing the respective operation with a first operation magnitude; and, in accordance with a determination that the first input includes a second input magnitude that is different from the first input magnitude (e.g., a second movement magnitude that is different from the first movement magnitude), performing the respective operation with a second operation magnitude that is different from the first operation magnitude. For example, if the respective operation is a drag operation, rotation, or resizing, and the first input includes a first magnitude of movement (e.g., hand movement, touch input movement, gaze movement, and/or other input movement), the respective user interface object is dragged, rotated, or resized respectively by a first amount, whereas if the first input includes a different, second magnitude of movement, the respective user interface object is dragged, rotated, or resized by a different, second amount. For example, as described herein with reference to FIGS. 7N-7O, 7R-7S, and 7T-7U, ball 7108 is moved by an amount in the three-dimensional environment that is based on the amount of movement of hand 7020 while performing gesture G1, gesture G2, and gesture G3, respectively. In another example, as described herein with reference to FIGS. 7V-7X, application user interface 7010 is scrolled by different amounts in a respective scrolling direction in accordance with different amounts of movement of hand 7020 in a respective movement direction while performing gesture G3 (e.g., with a first amount of scrolling in FIG. 7W in response to a first amount of movement of hand 7020, and a different, second amount of scrolling in FIG. 7X in response to a different, second amount of movement of hand 7020). When performing an operation responsive to detecting an input directed to a user interface object, performing the operation with a magnitude that is based on a magnitude of the input (e.g., the operation having different magnitudes for different magnitudes of the input) enables a user to manipulate objects and perform operations in a user interface faster and with better and more intuitive control.

In some embodiments, performing the respective operation includes: in accordance with a determination that the first input includes movement in a first input direction, performing the respective operation in a first operation direction; and, in accordance with a determination that the first input includes movement in a second input direction that is different from the first input direction, performing the respective operation in a second operation direction that is different from the first operation direction. For example, if the respective operation is a drag operation, rotation, or resizing, and the first input includes movement to the left (e.g., of a user's hand in space, of a touch input via a touch-sensitive surface, of a user's gaze, and/or other input movement), the respective user interface object is dragged to the left, rotated in one direction (e.g., clockwise or counterclockwise about a respective axis), or resized in one manner (e.g., increased or decreased in size) respectively, whereas if the first input includes movement to the right, the respective user interface object is dragged to the right, rotated in an opposite direction, or resized in an opposite manner. For example, as described herein with reference to FIGS. 7N-7O, 7R-7S, and 7T-7U, ball 7108 is moved in a direction in the three-dimensional environment in accordance with the direction of movement of hand 7020 while performing gesture G1, gesture G2, and gesture G3, respectively. In another example, as described herein with reference to FIGS. 7V-7X, application user interface 7010 is scrolled in a respective scrolling direction in accordance with movement of hand 7020 in a respective movement direction while performing gesture G3 (e.g., and in a different scrolling direction in accordance with movement of hand 7020 in a different movement direction). When performing an operation responsive to detecting an input directed to a user interface object, performing the operation with a direction that is based on a direction of the input (e.g., the operation being performed in different directions for different directions of the input) enables a user to manipulate objects and perform operations in a user interface faster and with better and more intuitive control.

In some embodiments, the environment includes one or more first user interface objects that are associated with the first behavior parameter and one or more second user interface objects that are not associated with the first behavior parameter. For example, in FIGS. 7N-7X, one or more of wall hanging 7106, ball 7108, and application user interface 7010 are associated with behavior parameter 1, and one or more are not. In some embodiments, the computer system detects a second input, and, in response to detecting the second input: in accordance with a determination that the second input is the first type of input and that the second input is directed to a first object of the one or more first user interface objects that are associated with the first behavior parameter, the computer system performs a respective operation corresponding to the second input; and, in accordance with a determination that the second input is the first type of input and that the second input is directed to a second object of the one or more second user interface objects that are not associated with the first behavior parameter, the computer system forgoes performing a respective operation corresponding to the second input (e.g., forgoing performing an operation with respect to the second object or ignoring the second input altogether). For example, as described herein with reference to FIGS. 7N-7O, in response to detecting gesture G1 directed to a first target object such as application user interface 7010, in accordance with a determination that gesture G1 is a direct touch gesture and that application user interface 7010 is associated with behavior parameter 1, computer system 101 scrolls application user interface 7010 in the three-dimensional environment. In contrast, as described herein with reference to FIGS. 7P-7Q, in response to detecting gesture G1 directed to a second target object such as ball 7108, in accordance with a determination that gesture G1 is a direct touch gesture and that ball 7108 is not associated with behavior parameter 1, computer system 101 does not move ball 7108 in the three-dimensional environment. In an environment that includes both user interface objects that are associated with a particular behavior parameter (e.g., indicating that the objects are configured to respond a particular type of input) and user interface objects that are not associated with the particular behavior parameter, conditionally performing an operation responsive to the particular type of input, based on whether the input is directed to an object that is associated with the particular behavior parameter or not, allows certain types of inputs (e.g., that are less precise and thus more likely to be accidental) to be disabled for objects and situations that require more intentional and/or precise control, while enabling operations to be performed more intuitively and quickly for objects and situations where precision is less critical, which increases flexibility within user interfaces by allowing restrictions to be placed on certain types of objects and not others, and reduces user mistakes and makes interaction with the computer system more efficient.

In some embodiments, aspects/operations of methods 800, 900, 1000, and 1100 may be interchanged, substituted, and/or added between these methods. For example, the gesture types and behavior parameters of method 1200 are used to determine whether the gesture information of method 1100 is delivered to targets of the inputs received as part of methods 800, 900, and/or 1000. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve input processing during XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve input processing during an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of input processing during XR experiences, the present technology can be configured to allow users to select to "opt in" or "opt out" of participation in the collection of personal information data during registration for services or anytime thereafter. In another example, certain data about a user, such as detailed information about the locations of features of the user that are providing user input, are initially not provided to software that is receiving the user input, unless the software has a need for and explicitly requests the data. In addition, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, input processing during an XR experience can performed by inferring preferences based on non-personal information data or a bare minimum amount of personal information, such as the content being requested by the device associated with a user, other non-personal information available to the service, or publicly available information.

What is claimed is:

1. A method, comprising:
at a computer system that is in communication with a display generation component and one or more input devices:
while a view of an environment is visible via the display generation component, detecting a first gaze input; and
in response to detecting the first gaze input:
in accordance with a determination that a hand of a user is in a predefined configuration during the first gaze input while the first gaze input is directed to a first location in the environment that corresponds to a first user interface element, providing respective gesture information that includes information about the first gaze input, wherein providing respective gesture information that includes information about the first gaze input includes:
providing, to the first user interface element, first gesture information that includes first information about the first gaze input;
after providing the first gesture information that includes the first information about the first gaze input to the first user interface element, detecting the first gaze input moving to a second location in the environment while the user's hand is maintained in the predefined configuration, wherein the second location is different from the first location;
in response to detecting the first gaze input moving to the second location in the environment while the user's hand is maintained in the predefined configuration:
providing, to a second user interface element that corresponds to the second location in the environment, second gesture information that includes second information about the first gaze input; and
in accordance with a determination that the hand of the user is not in the predefined configuration during the first gaze input:
forgoing providing the respective gesture information to the first user interface element about the first gaze input.

2. The method of claim 1, including:
detecting that the user's hand is no longer in the predefined configuration; and
in response to detecting that the hand is no longer in the predefined configuration:
ceasing to provide the respective gesture information that includes information about the first gaze input to a respective user interface element that corresponds to a location to which the first gaze input is directed.

3. The method of claim 1, wherein a failure to detect a hand of the user occurs, and the method includes:
in response to the failure to detect a hand of the user:
ceasing to provide the respective gesture information that includes information about the first gaze input to a respective user interface element that corresponds to a location to which the first gaze input is directed.

4. The method of claim 1, including, after detecting the first gaze input moving to the second location in the environment while the user's hand is maintained in the predefined configuration:
while the first gaze input is directed to the second location, detecting an input, wherein a first portion of the input includes a change in configuration of the user's hand from the predefined configuration when the user's hand is at a first position relative to the environment, and a second portion of the input includes movement of the user's hand to a second position relative to the environment; and
in response to detecting the input, providing gesture information based on one or more locations of the user's hand relative to the environment during the input, including:
providing, to the second user interface element, third gesture information that includes information about the first position of the user's hand relative to the environment; and
providing, to a respective user interface element that corresponds to the second position of the user's hand relative to the environment, fourth gesture information that includes information about the second position of the user's hand relative to the environment.

5. The method of claim 1, wherein the hand of the user is a first hand of the user, and the method includes, while detecting the first gaze input directed to a respective location in the environment:
detecting that a second hand of the user is in the predefined configuration; and
in response to detecting that the user's second hand is in the predefined configuration:
providing, to a respective user interface element that corresponds to the respective location in the environment, third gesture information that includes information about the first gaze input.

6. The method of claim 5, wherein the first gesture information and the second gesture information are part of a first event stream that is associated with the first hand of the user, and the third gesture information is part of a second event stream that is associated with the second hand of the user.

7. The method of claim 6, wherein, while the user's first hand is in the predefined configuration and the user's second hand is in the predefined configuration, the first event stream is provided concurrently with providing the second event stream.

8. The method of claim 6, including, while providing the first event stream concurrently with providing the second event stream:
in accordance with a determination that the first hand has ceased to be detected while the second hand continues to be detected in the predefined configuration:
ceasing to provide the first event stream, and continuing to provide the second event stream; and
in accordance with a determination that the second hand has ceased to be detected while the first hand continues to be detected in the predefined configuration:
ceasing to provide the second event stream, and continuing to provide the first event stream.

9. The method of claim 6, including, while providing the first event stream concurrently with providing the second event stream:
  in accordance with a determination that the first hand has changed configuration to initiate an input while the second hand continues to be detected in the predefined configuration:
    providing the first event stream associated with the first hand, including providing fourth gesture information for the first hand based on a current position of the first hand relative to the environment; and
    providing the second event stream associated with the second hand, including providing fifth gesture information for the first second hand based on a current location in the environment to which the first gaze input is directed; and
  in accordance with a determination that the second hand has changed configuration to initiate an input while the first hand continues to be detected in the predefined configuration:
    providing the first event stream associated with the first hand, including providing sixth gesture information for the first hand based on a current location in the environment to which the first gaze input is directed; and
    providing the second event stream associated with the second hand, including providing seventh gesture information for the second hand based on a current position of the second hand relative to the environment.

10. The method of claim 1, wherein:
  the first location in the environment is a location within a user interface of a first application executing on the computer system, and providing the first gesture information to the first user interface element provides the first gesture information to the first application; and
  the second location in the environment is a location within a user interface of a second application executing on the computer system, and providing the second gesture information to the second user interface element provides the second gesture information to the second application.

11. The method of claim 1, wherein:
  the first gaze input and the user's hand are detected using one or more input devices other than a touch-sensitive input device;
  providing respective gesture information that includes information about the first gaze input includes providing information about a simulated touch input that corresponds to the first gaze input; and
  providing respective gesture information that includes information about a respective position of a respective hand of the user includes providing information about a simulated touch input that corresponds to the respective hand of the user.

12. A non-transitory computer-readable storage medium storing one or more programs configured to be executed by one or more processors of a computer system that is in communication with a display generation component and one or more input devices, the one or more programs including instructions for:
  while a view of an environment is visible via the display generation component, detecting a first gaze input; and
  in response to detecting the first gaze input:
    in accordance with a determination that a hand of a user is in a predefined configuration during the first gaze input while the first gaze input is directed to a first location in the environment that corresponds to a first user interface element, providing respective gesture information that includes information about the first gaze input, wherein providing respective gesture information that includes information about the first gaze input includes:
      providing, to the first user interface element, first gesture information that includes first information about the first gaze input;
    after providing the first gesture information that includes the first information about the first gaze input to the first user interface element, detecting the first gaze input moving to a second location in the environment while the user's hand is maintained in the predefined configuration, wherein the second location is different from the first location;
    in response to detecting the first gaze input moving to the second location in the environment while the user's hand is maintained in the predefined configuration:
      providing, to a second user interface element that corresponds to the second location in the environment, second gesture information that includes second information about the first gaze input; and
    in accordance with a determination that the hand of the user is not in the predefined configuration during the first gaze input:
      forgoing providing the respective gesture information to the first user interface element about the first gaze input.

13. The non-transitory computer-readable storage medium of claim 12, wherein the one or more programs include instructions for:
  detecting that the user's hand is no longer in the predefined configuration; and
  in response to detecting that the hand is no longer in the predefined configuration:
    ceasing to provide the respective gesture information that includes information about the first gaze input to a respective user interface element that corresponds to a location to which the first gaze input is directed.

14. The non-transitory computer-readable storage medium of claim 12, wherein a failure to detect a hand of the user occurs, and the one or more programs include instructions for:
  in response to the failure to detect a hand of the user:
    ceasing to provide the respective gesture information that includes information about the first gaze input to a respective user interface element that corresponds to a location to which the first gaze input is directed.

15. The non-transitory computer-readable storage medium of claim 12, wherein the one or more programs include instructions for, after detecting the first gaze input moving to the second location in the environment while the user's hand is maintained in the predefined configuration:
  while the first gaze input is directed to the second location, detecting an input, wherein a first portion of the input includes a change in configuration of the user's hand from the predefined configuration when the user's hand is at a first position relative to the environment, and a second portion of the input includes movement of the user's hand to a second position relative to the environment; and
  in response to detecting the input, providing gesture information based on one or more locations of the user's hand relative to the environment during the input, including:

providing, to the second user interface element, third gesture information that includes information about the first position of the user's hand relative to the environment; and providing, to a respective user interface element that corresponds to the second position of the user's hand relative to the environment, fourth gesture information that includes information about the second position of the user's hand relative to the environment.

16. The non-transitory computer-readable storage medium of claim 12, wherein the hand of the user is a first hand of the user, and the one or more programs include instructions for, while detecting the first gaze input directed to a respective location in the environment:

detecting that a second hand of the user is in the predefined configuration; and in response to detecting that the user's second hand is in the predefined configuration:

providing, to a respective user interface element that corresponds to the respective location in the environment, third gesture information that includes information about the first gaze input.

17. The non-transitory computer-readable storage medium of claim 16, wherein the first gesture information and the second gesture information are part of a first event stream that is associated with the first hand of the user, and the third gesture information is part of a second event stream that is associated with the second hand of the user.

18. The non-transitory computer-readable storage medium of claim 17, wherein, while the user's first hand is in the predefined configuration and the user's second hand is in the predefined configuration, the first event stream is provided concurrently with providing the second event stream.

19. The non-transitory computer-readable storage medium of claim 17, wherein the one or more programs include instructions for, while providing the first event stream concurrently with providing the second event stream:

in accordance with a determination that the first hand has ceased to be detected while the second hand continues to be detected in the predefined configuration:

ceasing to provide the first event stream, and continuing to provide the second event stream; and in accordance with a determination that the second hand has ceased to be detected while the first hand continues to be detected in the predefined configuration:

ceasing to provide the second event stream, and continuing to provide the first event stream.

20. The non-transitory computer-readable storage medium of claim 17, wherein the one or more programs include instructions for, while providing the first event stream concurrently with providing the second event stream:

in accordance with a determination that the first hand has changed configuration to initiate an input while the second hand continues to be detected in the predefined configuration:

providing the first event stream associated with the first hand, including providing fourth gesture information for the first hand based on a current position of the first hand relative to the environment; and providing the second event stream associated with the second hand, including providing fifth gesture information for the second hand based on a current location in the environment to which the first gaze input is directed; and in accordance with a determination that the second hand has changed configuration to initiate an input while the first hand continues to be detected in the predefined configuration:

providing the first event stream associated with the first hand, including providing sixth gesture information for the first hand based on a current location in the environment to which the first gaze input is directed; and providing the second event stream associated with the second hand, including providing seventh gesture information for the second hand based on a current position of the second hand relative to the environment.

21. The non-transitory computer-readable storage medium of claim 12, wherein:

the first location in the environment is a location within a user interface of a first application executing on the computer system, and providing the first gesture information to the first user interface element provides the first gesture information to the first application; and the second location in the environment is a location within a user interface of a second application executing on the computer system, and providing the second gesture information to the second user interface element provides the second gesture information to the second application.

22. The non-transitory computer-readable storage medium of claim 12, wherein:

the first gaze input and the user's hand are detected using one or more input devices other than a touch-sensitive input device;

providing respective gesture information that includes information about the first gaze input includes providing information about a simulated touch input that corresponds to the first gaze input; and providing respective gesture information that includes information about a respective position of a respective hand of the user includes providing information about a simulated touch input that corresponds to the respective hand of the user.

23. A computer system that is in communication with a display generation component and one or more input devices, the computer system comprising:

one or more processors; and memory storing one or more programs configured to be executed by the one or more processors, the one or more programs including instructions for:

while a view of an environment is visible via the display generation component, detecting a first gaze input; and in response to detecting the first gaze input:

in accordance with a determination that a hand of a user is in a predefined configuration during the first gaze input while the first gaze input is directed to a first location in the environment that corresponds to a first user interface element, providing respective gesture information that includes information about the first gaze input, wherein providing respective gesture information that includes information about the first gaze input includes:

providing, to the first user interface element, first gesture information that includes first information about the first gaze input;

after providing the first gesture information that includes the first information about the first gaze input to the first user interface element, detecting the first gaze input moving to a second location in the environment while the user's hand is maintained in the predefined configuration, wherein the second location is different from the first location;

in response to detecting the first gaze input moving to the second location in the environment while the user's hand is maintained in the predefined configuration:

providing, to a second user interface element that corresponds to the second location in the environment, second gesture information that includes second information about the first gaze input; and in accordance with a determination that the hand of the user is not in the predefined configuration during the first gaze input:

forgoing providing the respective gesture information to the first user interface element about the first gaze input.

24. The computer system of claim 23, wherein the one or more programs include instructions for:

detecting that the user's hand is no longer in the predefined configuration; and in response to detecting that the hand is no longer in the predefined configuration:

ceasing to provide the respective gesture information that includes information about the first gaze input to a respective user interface element that corresponds to a location to which the first gaze input is directed.

25. The computer system of claim 23, wherein a failure to detect a hand of the user occurs, and the one or more programs include instructions for:

in response to the failure to detect a hand of the user:

ceasing to provide the respective gesture information that includes information about the first gaze input to a respective user interface element that corresponds to a location to which the first gaze input is directed.

26. The computer system of claim 23, wherein the one or more programs include instructions for, after detecting the first gaze input moving to the second location in the environment while the user's hand is maintained in the predefined configuration:

while the first gaze input is directed to the second location, detecting an input, wherein a first portion of the input includes a change in configuration of the user's hand from the predefined configuration when the user's hand is at a first position relative to the environment, and a second portion of the input includes movement of the user's hand to a second position relative to the environment; and in response to detecting the input, providing gesture information based on one or more locations of the user's hand relative to the environment during the input, including:

providing, to the second user interface element, third gesture information that includes information about the first position of the user's hand relative to the environment; and providing, to a respective user interface element that corresponds to the second position of the user's hand relative to the environment, fourth gesture information that includes information about the second position of the user's hand relative to the environment.

27. The computer system of claim 23, wherein the hand of the user is a first hand of the user, and the one or more programs include instructions for, while detecting the first gaze input directed to a respective location in the environment:

detecting that a second hand of the user is in the predefined configuration; and in response to detecting that the user's second hand is in the predefined configuration:

providing, to a respective user interface element that corresponds to the respective location in the environment, third gesture information that includes information about the first gaze input.

28. The computer system of claim 27, wherein the first gesture information and the second gesture information are part of a first event stream that is associated with the first hand of the user, and the third gesture information is part of a second event stream that is associated with the second hand of the user.

29. The computer system of claim 28, wherein, while the user's first hand is in the predefined configuration and the user's second hand is in the predefined configuration, the first event stream is provided concurrently with providing the second event stream.

30. The computer system of claim 28, wherein the one or more programs include instructions for, while providing the first event stream concurrently with providing the second event stream:

in accordance with a determination that the first hand has ceased to be detected while the second hand continues to be detected in the predefined configuration:

ceasing to provide the first event stream, and continuing to provide the second event stream; and in accordance with a determination that the second hand has ceased to be detected while the first hand continues to be detected in the predefined configuration:

ceasing to provide the second event stream, and continuing to provide the first event stream.

31. The computer system of claim 28, wherein the one or more programs include instructions for, while providing the first event stream concurrently with providing the second event stream:

in accordance with a determination that the first hand has changed configuration to initiate an input while the second hand continues to be detected in the predefined configuration:

providing the first event stream associated with the first hand, including providing fourth gesture information for the first hand based on a current position of the first hand relative to the environment; and providing the second event stream associated with the second hand, including providing fifth gesture information for the second hand based on a current location in the environment to which the first gaze input is directed; and in accordance with a determination that the second hand has changed configuration to initiate an input while the first hand continues to be detected in the predefined configuration:

providing the first event stream associated with the first hand, including providing sixth gesture information for the first hand based on a current location in the environment to which the first gaze input is directed; and providing the second event stream associated with the second hand, including providing seventh gesture information for the second hand based on a current position of the second hand relative to the environment.

32. The computer system of claim 23, wherein:

the first location in the environment is a location within a user interface of a first application executing on the computer system, and providing the first gesture information to the first user interface element provides the first gesture information to the first application; and the second location in the environment is a location within a user interface of a second application executing on the computer system, and providing the second gesture information to the second user interface element provides the second gesture information to the second application.

33. The computer system of claim 23, wherein:

the first gaze input and the user's hand are detected using one or more input devices other than a touch-sensitive input device;

providing respective gesture information that includes information about the first gaze input includes providing information about a simulated touch input that corresponds to the first gaze input; and providing respective gesture information that includes information about a respective position of a respective hand of the user includes providing information about a simulated touch input that corresponds to the respective hand of the user.

* * * * *